US011944927B2

United States Patent
Tate et al.

(10) Patent No.: US 11,944,927 B2
(45) Date of Patent: Apr. 2, 2024

(54) FILTER MEDIA PACKS, METHODS OF MAKING AND FILTER MEDIA PRESSES

(71) Applicants: Jason L Tate, Thompsons Station, TN (US); Farrell F. Calcaterra, Kearney, NE (US); Thomas B. Green, College Grove, TN (US); Charles R. Wick, Pleasanton, NE (US); Ryan M. Pastrana, Franklin, TN (US); John Michlitsch, Summertown, TN (US)

(72) Inventors: Jason L Tate, Thompsons Station, TN (US); Farrell F. Calcaterra, Kearney, NE (US); Thomas B. Green, College Grove, TN (US); Charles R. Wick, Pleasanton, NE (US); Ryan M. Pastrana, Franklin, TN (US); John Michlitsch, Summertown, TN (US)

(73) Assignee: PARKER INTANGIBLES LLC, Cleveland, OH (US)

( * ) Notice: Subject to any disclaimer, the term of this patent is extended or adjusted under 35 U.S.C. 154(b) by 126 days.

(21) Appl. No.: 17/546,264

(22) Filed: Dec. 9, 2021

(65) Prior Publication Data

US 2022/0096985 A1 Mar. 31, 2022

Related U.S. Application Data

(63) Continuation of application No. 15/896,589, filed on Feb. 14, 2018, now Pat. No. 11,235,270, which is a (Continued)

(51) Int. Cl.
*B01D 46/00* (2022.01)
*B01D 46/52* (2006.01)

(52) U.S. Cl.
CPC ....... *B01D 46/0001* (2013.01); *B01D 46/522* (2013.01)

(58) Field of Classification Search
CPC ............. B01D 46/0001; B01D 46/522; B01D 46/003; B01D 46/523; B01D 46/526;
(Continued)

(56) References Cited

U.S. PATENT DOCUMENTS 1,838,414 A 12/1931 Langbein
2,690,802 A 10/1954 Russell
(Continued)

FOREIGN PATENT DOCUMENTS

CN 1240402 A 1/2000
CN 1679994 A 10/2005
(Continued)

OTHER PUBLICATIONS

Troughton, "Handbook of Plastics Joining: A Practical Guide", 2nd ed., Chapter 2, Ultrasonic Welding, pp. 15-35, 2008, (Year: 2008).
(Continued)

*Primary Examiner* — Christopher W Raimund
(74) *Attorney, Agent, or Firm* — Reinhart Boerner Van Deuren P.C.

(57) ABSTRACT

The disclosure is directed toward presses which may comprise planar or curved press plates that can be driven toward and away from each other such as via linear reciprocating movement to press filter media sheets as opposed to using rolls. The press plates can create such features as embossments that may have the ridges and grooves, brands, creases or other such features. The press can create pleated packs or individual panels for non-pleated packs. Additionally, a variety of embossed pleat packs, unique shapes, structural components and other pleat packs that may be formed by presses or other methodology are disclosed as well as filter cartridges using such pleat packs.

23 Claims, 38 Drawing Sheets

Related U.S. Application Data continuation of application No. PCT/US2016/047283, filed on Aug. 17, 2016.

(60) Provisional application No. 62/243,740, filed on Oct. 20, 2015, provisional application No. 62/206,100, filed on Aug. 17, 2015.

(58) Field of Classification Search
CPC .......... B01D 2275/206; B01D 39/1623; B01D 46/521; B01D 46/525
See application file for complete search history.

(56) References Cited

U.S. PATENT DOCUMENTS

| | | | |
|---|---|---|---|
| 2,720,937 A | 10/1955 | Root, Jr. | |
| 2,884,091 A | 4/1959 | Baldwin | |
| 2,908,350 A | 10/1959 | Buckman | |
| 2,936,855 A | 5/1960 | Allen et al. | |
| 2,950,656 A | 8/1960 | Gewiss | |
| 2,968,361 A | 1/1961 | Buckman | |
| 2,980,208 A | 4/1961 | Neumann | |
| 3,169,899 A | 2/1965 | Steuber | |
| 3,293,833 A | 12/1966 | Barany | |
| 3,400,519 A | 9/1968 | Korn et al. | |
| 3,531,920 A | 10/1970 | Hart | |
| 3,635,001 A | 1/1972 | Komroff et al. | |
| 3,792,952 A | 2/1974 | Hamon | |
| 3,963,813 A | 6/1976 | Keith | |
| 4,268,290 A | 5/1981 | Barrington | |
| 4,452,619 A | 6/1984 | Wright et al. | |
| 4,512,892 A | 4/1985 | Ganzi et al. | |
| 4,610,706 A | 9/1986 | Nesher | |
| 4,615,804 A | 10/1986 | Wright | |
| 4,980,936 A | 1/1991 | Frickland et al. | |
| 5,028,331 A | 7/1991 | Lippold | |
| 5,053,131 A | 10/1991 | Lippold | |
| 5,064,598 A | 11/1991 | Seiler | |
| 5,066,319 A | 11/1991 | Lippold | |
| 5,066,400 A | 11/1991 | Rocklitz et al. | |
| 5,089,202 A | 2/1992 | Lippold | |
| 5,167,740 A | 12/1992 | Michaelis et al. | |
| 5,290,447 A | 3/1994 | Lippold | |
| 5,306,321 A | 4/1994 | Osendorf | |
| 5,346,519 A | 9/1994 | Williams | |
| 5,427,597 A | 6/1995 | Osendorf | |
| 5,472,463 A | 12/1995 | Herman et al. | |
| 5,804,014 A | 9/1998 | Kähler | |
| 5,820,646 A | 10/1998 | Gillingham et al. | |
| 5,888,262 A | 3/1999 | Kähler | |
| 5,900,032 A | 5/1999 | Wang | |
| 5,971,731 A | 10/1999 | Marin | |
| 6,165,241 A | 12/2000 | Choi | |
| 6,165,242 A | 12/2000 | Choi | |
| 6,210,469 B1 | 4/2001 | Tokar | |
| 6,235,195 B1 | 5/2001 | Tokar | |
| 6,290,635 B1 | 9/2001 | Demmel et al. | |
| 6,293,984 B1 | 9/2001 | Oda et al. | |
| 6,375,700 B1 | 4/2002 | Jaroszczyk et al. | |
| 6,402,800 B1 | 6/2002 | Rey | |
| 6,428,594 B1 | 8/2002 | Hintenlang et al. | |
| 6,482,247 B2 | 11/2002 | Jaroszczyk et al. | |
| 6,524,479 B2 | 2/2003 | Schwinghammer | |
| 6,568,540 B1 | 5/2003 | Holzmann et al. | |
| 6,685,833 B2 | 2/2004 | Lippold | |
| 6,780,217 B1 | 8/2004 | Palmer | |
| 6,824,581 B1 | 11/2004 | Tate et al. | |
| 6,932,850 B1 | 8/2005 | Welch et al. | |
| 6,997,969 B1 | 2/2006 | Horst et al. | |
| 7,122,068 B2 | 10/2006 | Tate et al. | |
| 7,318,851 B2 | 1/2008 | Brown et al. | |
| 7,323,105 B1 | 1/2008 | Janikowski et al. | |
| 7,425,227 B1 | 9/2008 | Hutchinson et al. | |
| 7,588,619 B2 | 9/2009 | Chilton et al. | |
| 7,597,773 B2 | 10/2009 | Kume et al. | |
| 7,625,418 B1 | 12/2009 | Choi | |
| 7,625,419 B2 | 12/2009 | Nelson et al. | |
| 7,967,888 B2 | 6/2011 | Felder | |
| 8,034,145 B2 | 10/2011 | Boehrs et al. | |
| 8,062,399 B2 | 11/2011 | Nelson et al. | |
| 8,142,534 B2 | 3/2012 | Whang et al. | |
| 8,263,506 B2 | 9/2012 | Luo | |
| 8,268,053 B2 | 9/2012 | Wagner et al. | |
| 8,277,532 B2 | 10/2012 | Reichter et al. | |
| 8,292,983 B2 | 10/2012 | Reichter et al. | |
| 8,328,897 B2 | 12/2012 | Nelson et al. | |
| 8,491,684 B2 | 7/2013 | Raether et al. | |
| 8,491,691 B2 | 7/2013 | Raether | |
| 8,506,669 B2 | 8/2013 | Fox et al. | |
| 8,545,589 B2 | 10/2013 | Rocklitz et al. | |
| 8,545,658 B2 | 10/2013 | Spearin et al. | |
| 8,662,316 B2 | 3/2014 | Sakadume et al. | |
| 8,685,130 B2 | 4/2014 | Nelson et al. | |
| 8,741,017 B2 | 6/2014 | Nelson | |
| 8,920,528 B2 | 12/2014 | Dewit et al. | |
| 9,108,394 B2 | 8/2015 | Moe et al. | |
| 2005/0204714 A1 | 9/2005 | Sundet et al. | |
| 2005/0218057 A1 | 10/2005 | Ngee | |
| 2005/0284116 A1 | 12/2005 | Duffy | |
| 2005/0284117 A1 | 12/2005 | Swars | |
| 2006/0065592 A1 | 3/2006 | Terres et al. | |
| 2006/0151383 A1 | 7/2006 | Choi | |
| 2006/0272305 A1 | 12/2006 | Morgan | |
| 2008/0014410 A1 | 1/2008 | Johnston et al. | |
| 2008/0066437 A1 | 3/2008 | Solberg, Jr. et al. | |
| 2008/0156712 A1 | 7/2008 | Rhodes et al. | |
| 2010/0078379 A1 | 4/2010 | Rocklitz | |
| 2010/0147466 A1 | 6/2010 | Sans Marimon | |
| 2010/0187171 A1 | 7/2010 | Gupta | |
| 2011/0126713 A1 | 6/2011 | Legare et al. | |
| 2011/0186504 A1 | 8/2011 | Rocklitz | |
| 2011/0297611 A1 | 12/2011 | Golden et al. | |
| 2013/0139691 A1 | 6/2013 | Goldbach et al. | |
| 2013/0240153 A1 | 9/2013 | Hull | |
| 2014/0033653 A1 | 2/2014 | Cham et al. | |
| 2014/0137524 A1 | 5/2014 | Jarrier | |
| 2014/0165517 A1 | 6/2014 | Hara et al. | |
| 2014/0166572 A1 | 6/2014 | Snyder | |
| 2014/0202123 A1 | 7/2014 | Walz et al. | |
| 2014/0223872 A1 | 8/2014 | Bao et al. | |
| 2014/0235419 A1 | 8/2014 | Lise et al. | |
| 2014/0260088 A1 | 9/2014 | Brolli | |
| 2014/0260139 A1 | 9/2014 | Merritt et al. | |
| 2014/0263037 A1 | 9/2014 | Schouweiler et al. | |
| 2015/0047508 A1 | 2/2015 | Sanocki et al. | |
| 2015/0053606 A1 | 2/2015 | Sakamoto et al. | |
| 2015/0114191 A1 | 4/2015 | Roehrig | |
| 2015/0367273 A1 | 12/2015 | Boehrs et al. | |
| 2016/0045848 A1 | 2/2016 | Campbell et al. | |
| 2016/0214053 A1 | 7/2016 | Schwartz | |
| 2016/0236132 A1 | 8/2016 | Hara et al. | |
| 2017/0182443 A1 | 6/2017 | Reichter et al. | |

FOREIGN PATENT DOCUMENTS

| | | |
|---|---|---|
| CN | 102575396 A | 7/2012 |
| DE | 8808632 U1 | 9/1988 |
| DE | 102012022769 A1 | 5/2014 |
| EP | 1681087 A2 | 7/2006 |
| EP | 2752230 A1 | 7/2014 |
| GB | 2315704 A | 2/1998 |
| JP | 3001408 B2 | 1/2000 |
| JP | 2004113959 A | 4/2004 |
| JP | 2008264625 A | 11/2008 |
| WO | WO 2000/000270 A1 | 1/2000 |
| WO | WO 2002/055179 A1 | 7/2002 |
| WO | WO 2003/049838 A1 | 6/2003 |
| WO | WO 2005/082484 A1 | 9/2005 |
| WO | WO 2006/015329 A1 | 2/2006 |
| WO | WO 2012/048545 A1 | 4/2012 |
| WO | WO 2014/076417 A2 | 5/2014 |
| WO | WO 2014/173709 A1 | 10/2014 |

(56) References Cited

FOREIGN PATENT DOCUMENTS

| WO | WO 2014/194275 A2 | 12/2014 |
| WO | WO 2016/177553 A1 | 11/2016 |
| WO | WO 2017/031168 A1 | 2/2017 |

OTHER PUBLICATIONS

Reddy, "Ultrasonic Seaming of PET, PET/cotton blend, and Spectra Fabrics", Master's Thesis, Eastern Michigan Univ. Nov. 13, 2007 (Year 2007).
Prior use and sale information and/or other information in relation to "Maddock's Pleater"; 14 pages.
Textile Learner, Properties of Polyester Fiber (https://textilelearner.blogspot.com/2011/07/polyester-fiber-pet-physical-properties9005.html). (Year: 2011).
U.S. Appl. No. 11/235,270, filed Feb. 1, 2022, Tate et al.

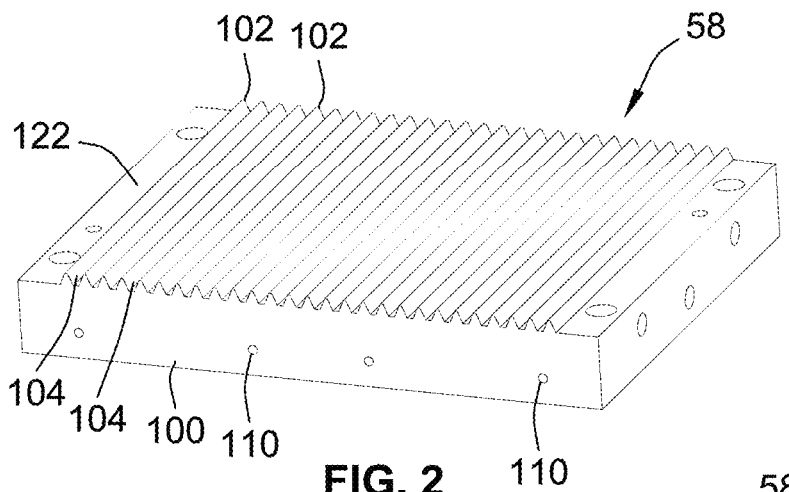
FIG. 2
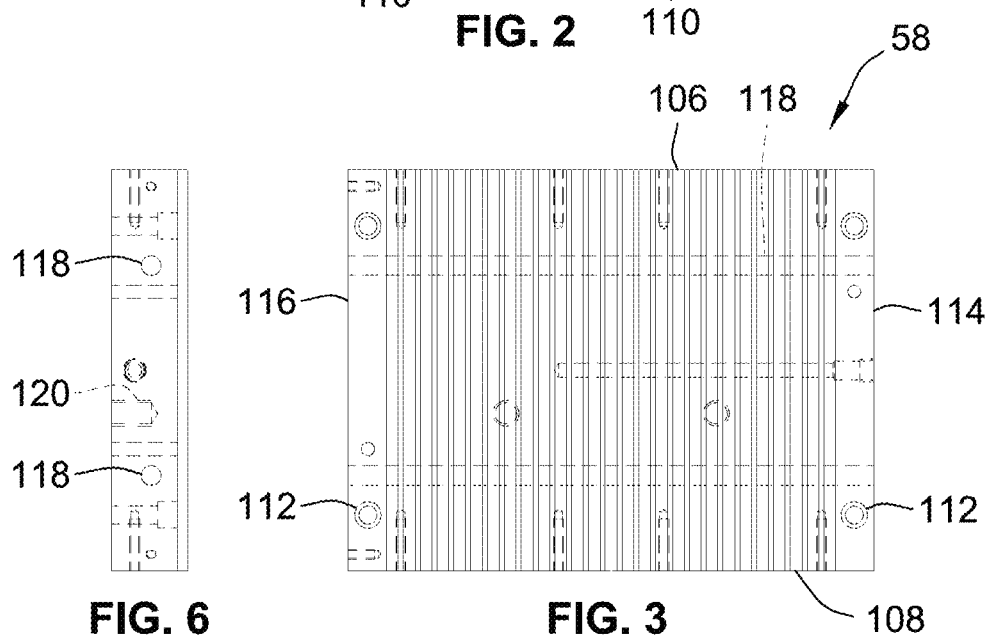
FIG. 6  FIG. 3
FIG. 4
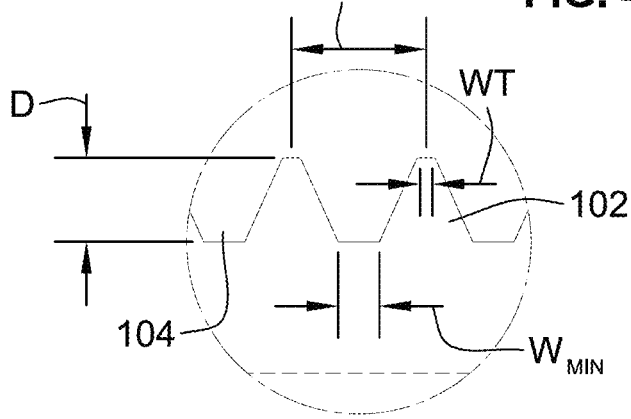
FIG. 5

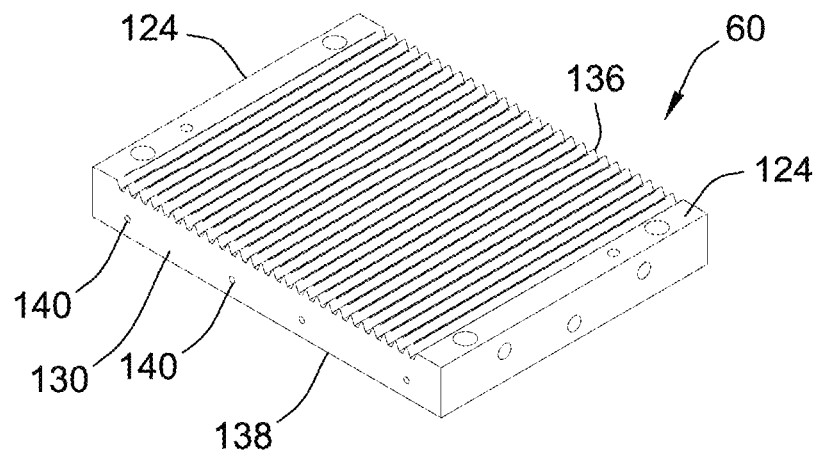
FIG. 7
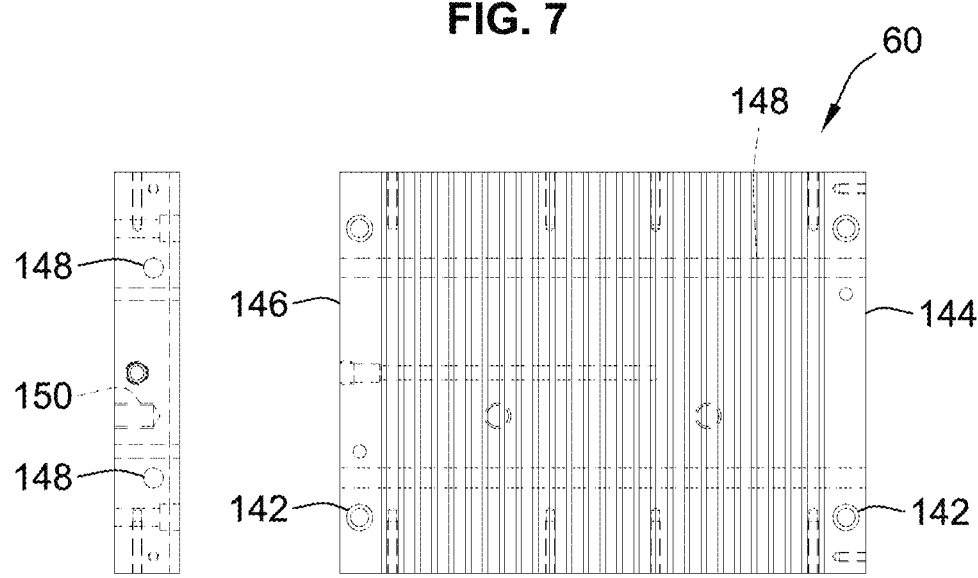
FIG. 11  FIG. 8
FIG. 9
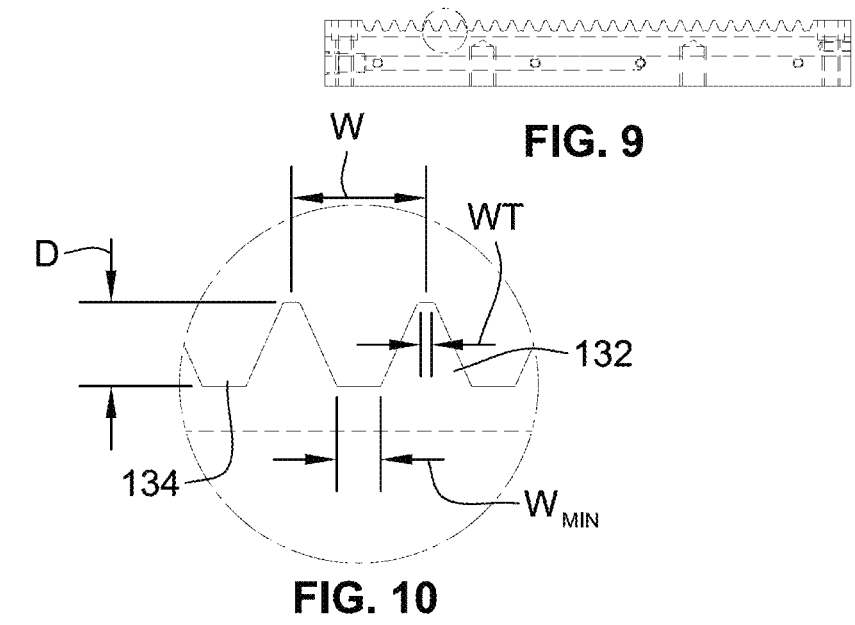
FIG. 10

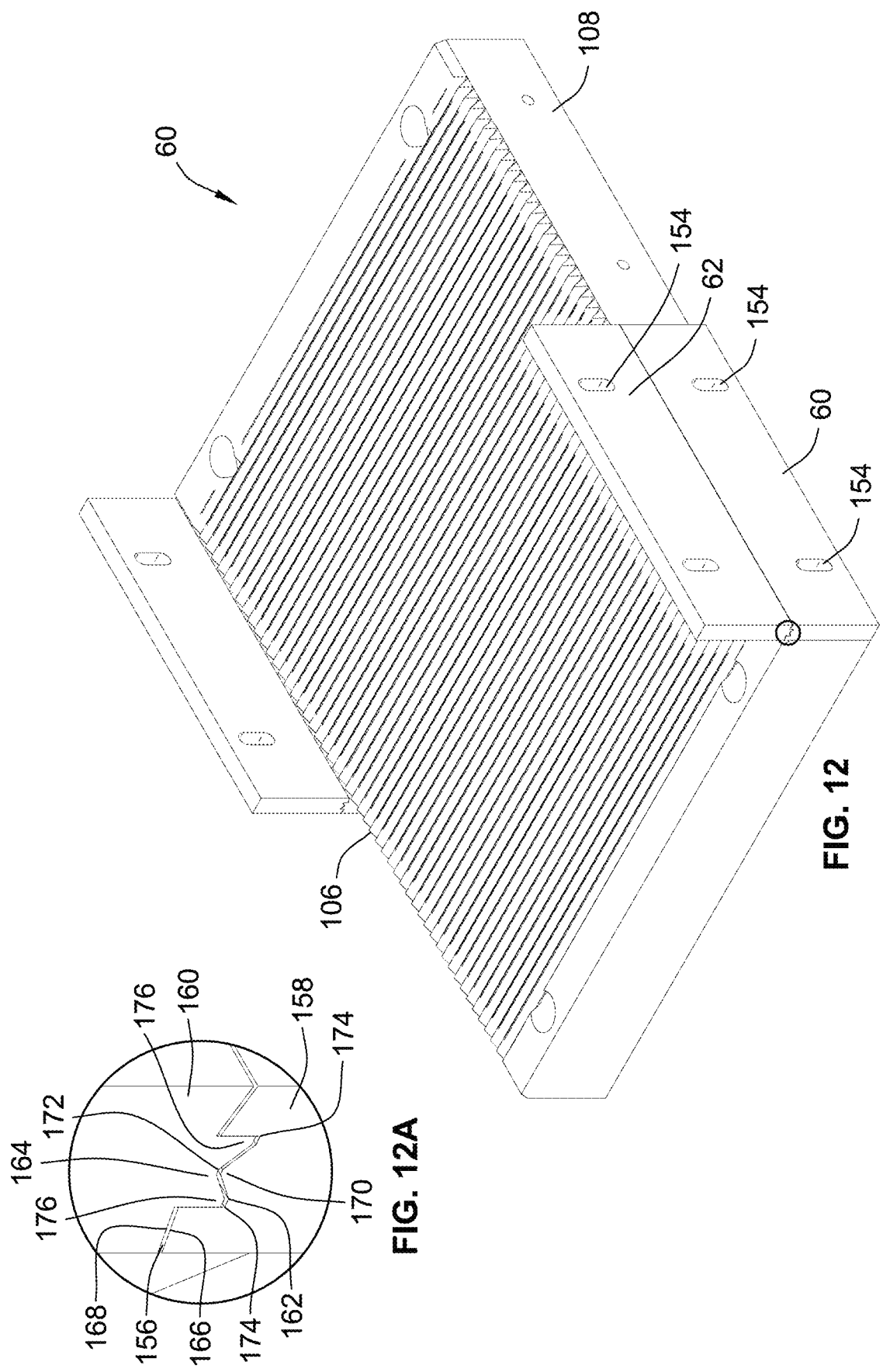

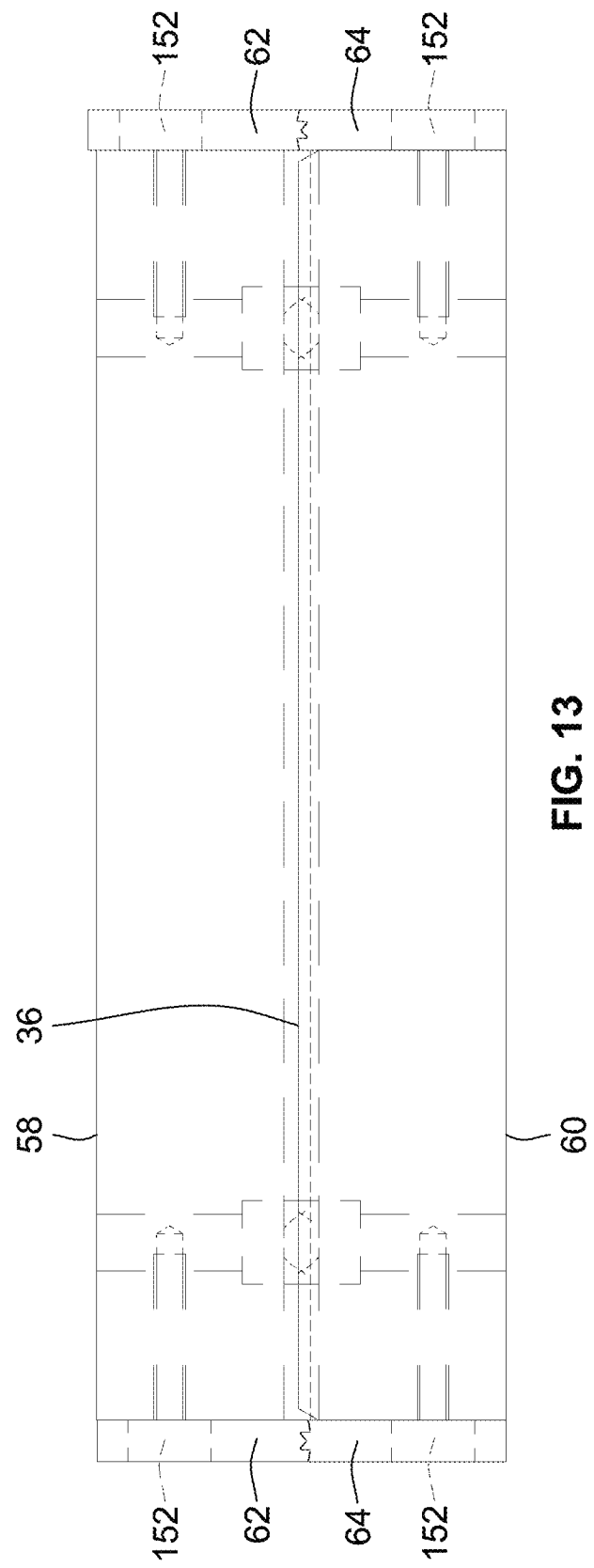

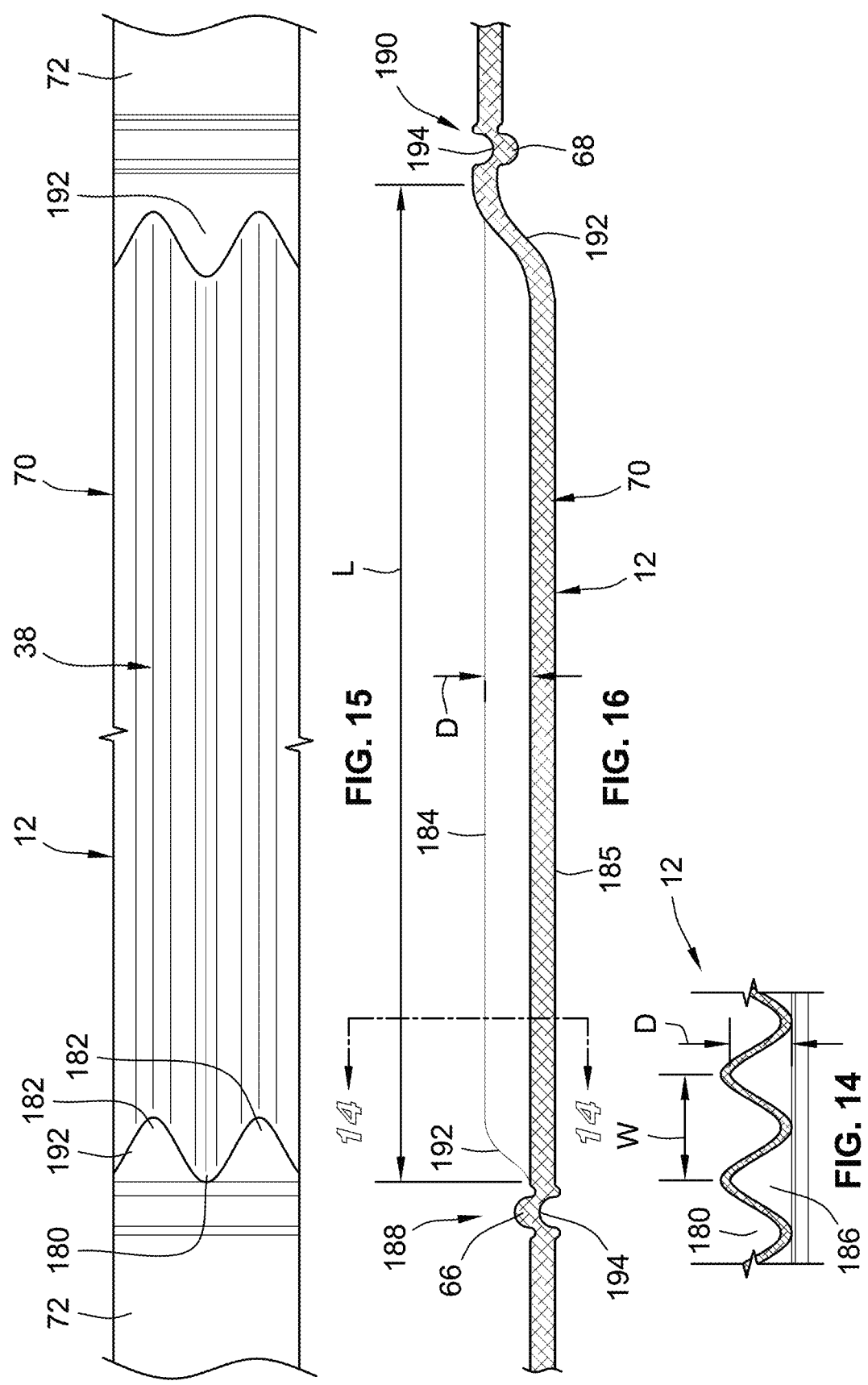

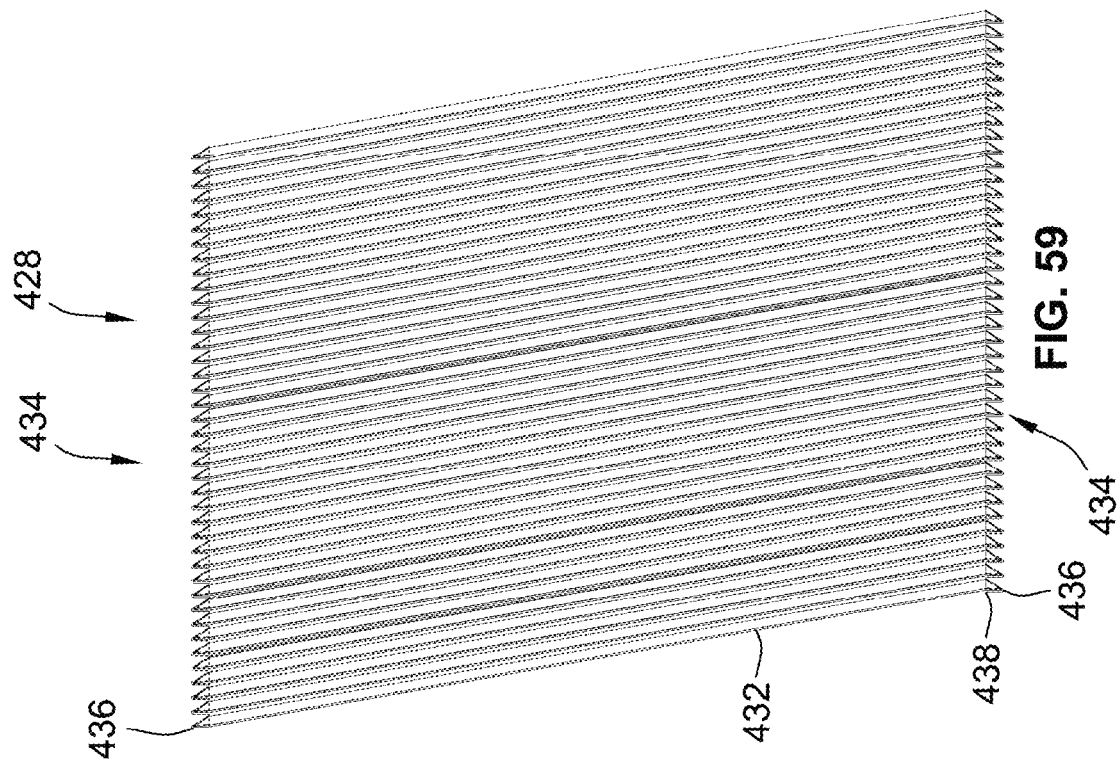
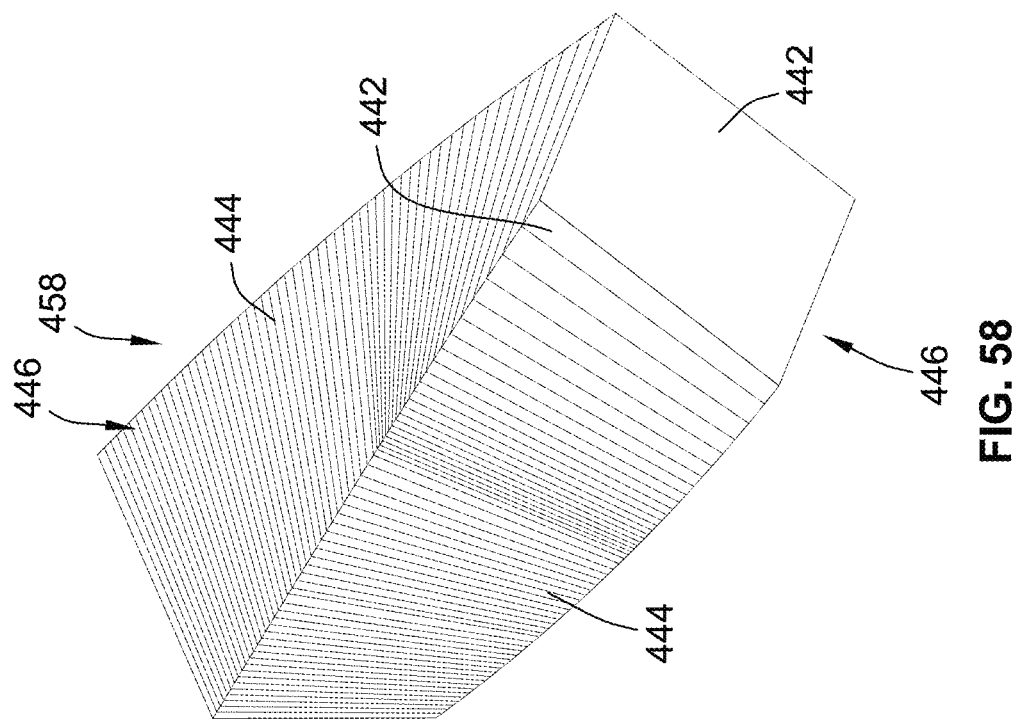

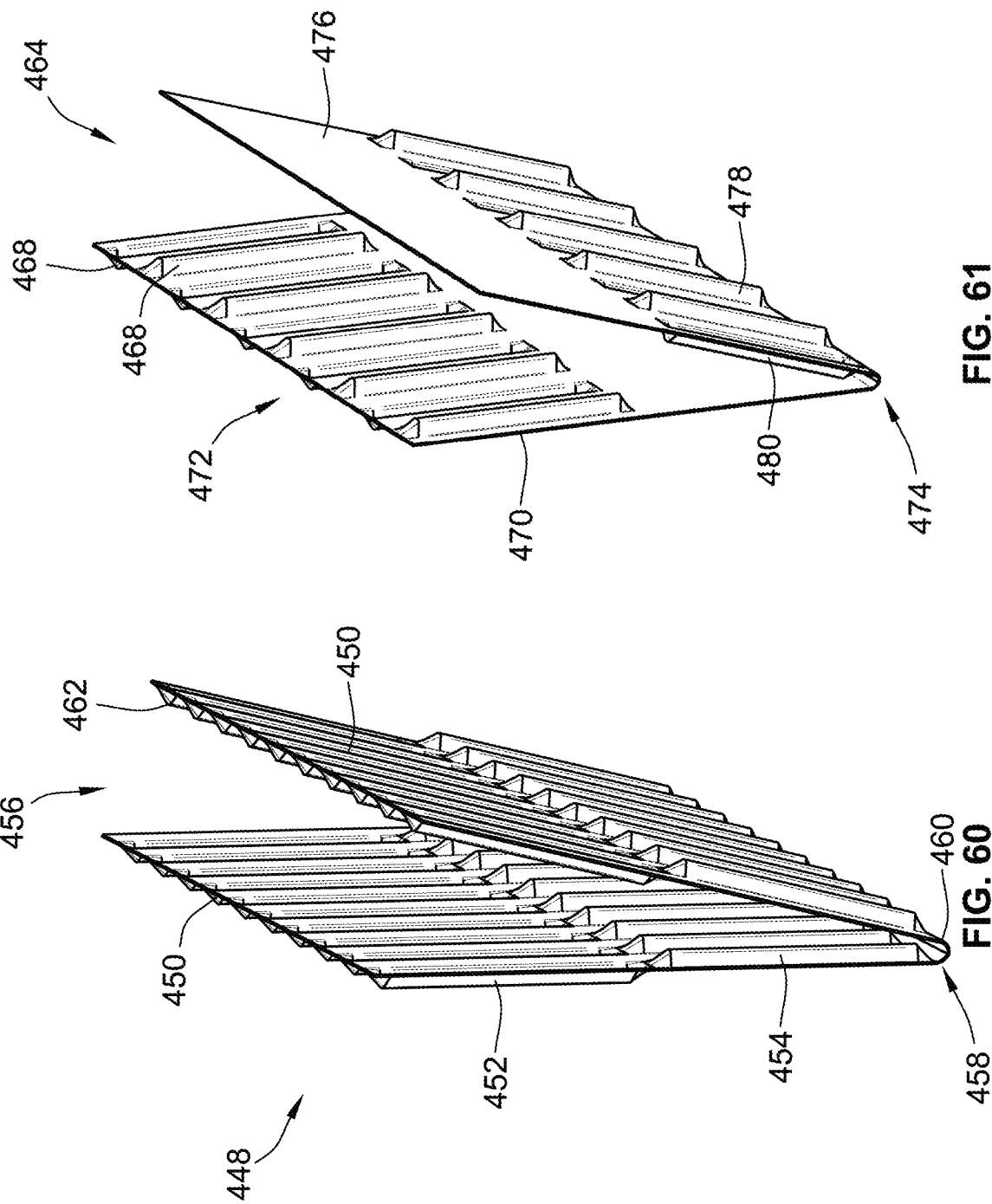

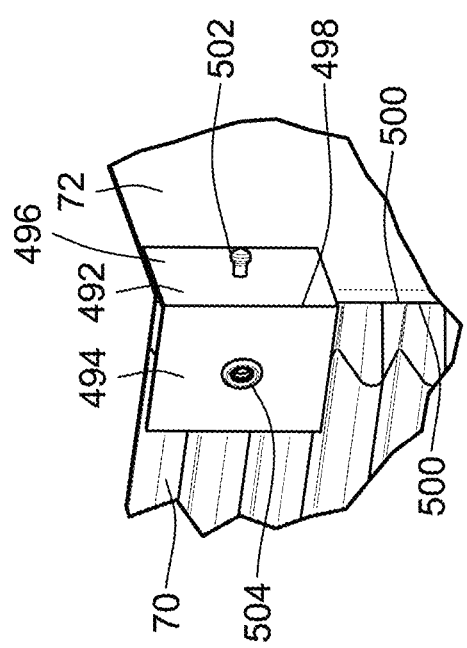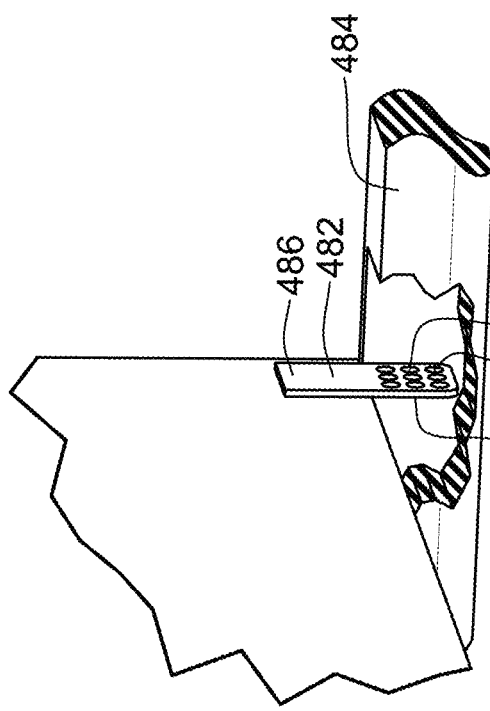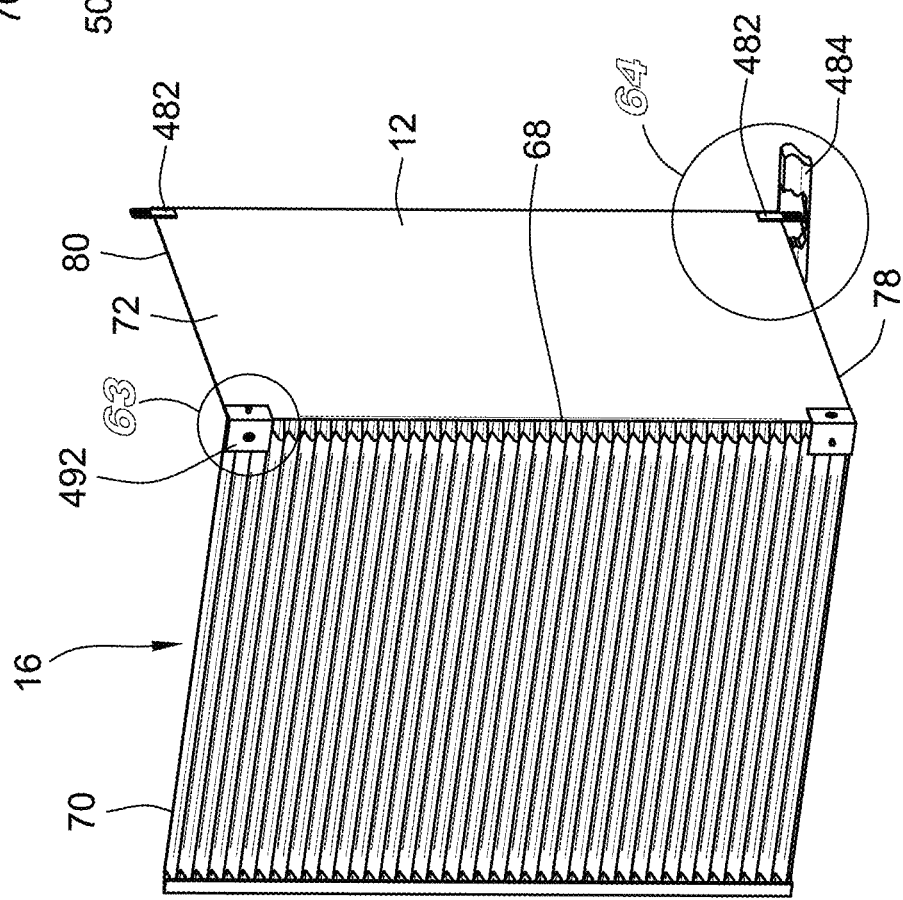

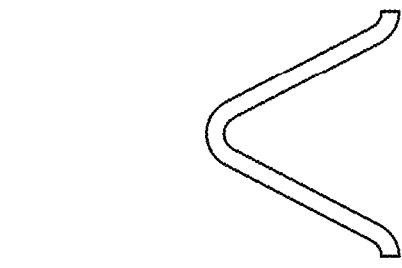
FIG. 78
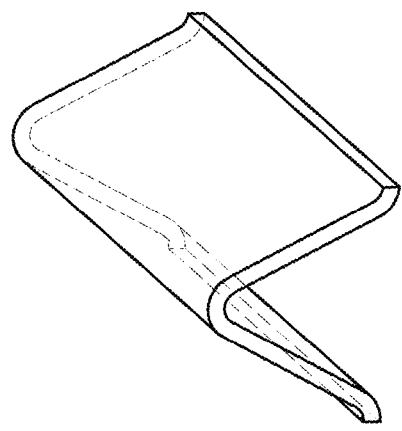
FIG. 77
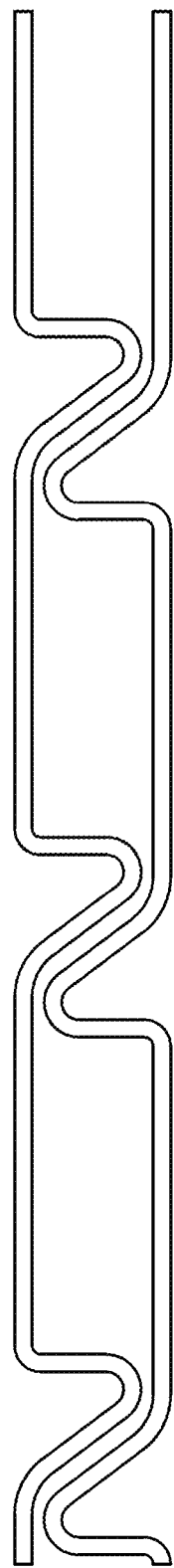
FIG. 79
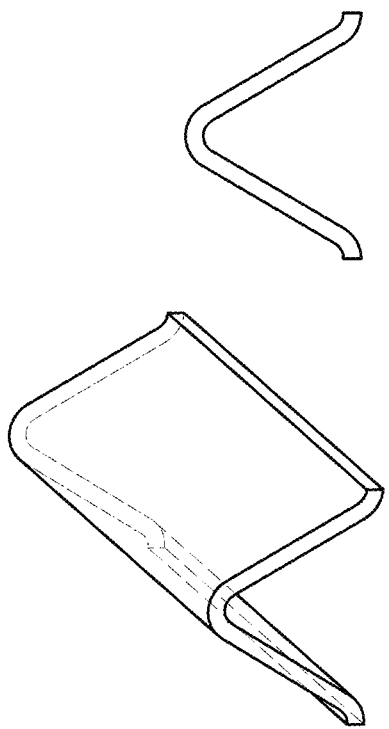
FIG. 76
FIG. 75

FILTER MEDIA PACKS, METHODS OF MAKING AND FILTER MEDIA PRESSES

CROSS-REFERENCE TO RELATED PATENT APPLICATIONS

This patent application is a continuation of U.S. patent application Ser. No. 15/896,589, filed Feb. 14, 2018, which is a continuation of U.S. Patent Application No. PCT/US2016/047283, filed Aug. 17, 2016; this patent application also claims the benefit of U.S. Provisional Patent Application No. 62/206,100, filed Aug. 17, 2015; and U.S. Provisional Patent Application No. 62/243,740, filed Oct. 20, 2015. The entire disclosures of each one of these patent applications are incorporated herein by reference thereto.

FIELD OF THE INVENTION

This invention generally relates to filters, and more particularly relates to methods and machinery for forming features such as embossments (that may define grooves), creases, graphics, or other features into filter media packs and such filter media packs formed thereby.

BACKGROUND OF THE INVENTION

A variety of filter packs are known in the prior art, for example U.S. Pat. No. 6,780,217 to Palmer; U.S. Pat. No. 7,122,068 to Tate et al.; U.S. Pub. No. 2006/0151383 to Choi; U.S. Pat. No. 4,268,290 to Barrington. Each of the aforementioned patents and publications generally relate to pleated filter media elements.

There is also other filter media packs such as fluted media packs described and shown for example in U.S. Pub. No. 2014/0260139 entitled Rectangular Stacked Fluted Filter Cartridge to Merritt; and U.S. Pat. No. 7,318,851 entitled Filter Element to Brown et al.

Generally, the process for processing the filter media to be used in such filter media packs employed by the above examples requires the use of rolls that have projecting features that rotate around a central axis in order to form embossments or other features into the filter media pack such as shown for example in Choi, U.S. Pub. No. 2006/0151383 entitled Pleated Corrugated Media and Method of Making. The advantage of the roll forming process is the ability for continuous processing in that the rolls rotate and operate continuously on a continuous filter media sheet that is unwound from a filter media roll in a typical process.

Various aspects of the present invention are directed towards improvements in the methods of making such features on media packs, improved media pack structures, and/or improved pleated embossed media packs as will be understood from the disclosure below.

BRIEF SUMMARY OF THE INVENTION

Some of the inventive aspects as defined by some of the independent claims relate to pressing embossments, creases or other such filter features into a filter media sheet with stamping dies that are in a non-rolled form.

For example, stamping dies may be reciprocated and preferably linearly reciprocated back and forth by a hydraulic or electrically driven rant to press such features into the filter media sheet.

Various advantages and additional inventive features may flow from this pressing methodology. This methodology is particularly advantageous for a pleated filter media pack that is formed with grooves that can be defined by (in other words formed by) embossments (e.g. the underside of embossments and/or between embossments). Stated another way, the formed embossments in projecting as a raised structure from the typical plane of a filter media sheet may in preferred embodiments therefore take the form of grooves along the underside of the embossments and/or between embossments.

Additional and separate inventive aspects and independent claims are directed toward inventive filter media packs. For example, in some embodiments of the invention, pleated filtering media packs may have differing strength per filtering region; different shapes due to pleat depth variation; stretched embossments as opposed to compressed embossments; a variety of new inventive shapes and/or nesting of embossments; and/or new embossment patterns. All of these may be created via a press operation according to other inventive aspects.

Additional inventive aspects according to other independent claims are also directed to other features such as the use of tabs that may be separate structures or integrally formed in the media for purposes of seal support and attachment; or tabs that may be in the form of clips that secure folds of individual pleats together to provide for additional support.

In greater detail, some of the inventive features disclosed herein include the following in the paragraphs below, each of which may be used independently or in combination with another inventive aspect or feature.

According to one inventive aspect, a method of forming a filter media pack with a filter media sheet comprises: pressing at least one feature into the filter media sheet repeatedly with stamping dies, the stamping dies being in a non-roll form; and assembling multiple pressed sections into the filter media pack.

At least one pressed feature in the filter media sheet may be at least one of score lines, embossments and graphics.

In a preferred embodiment, the stamping dies are successively pressed and released, during the pressing the stamping dies engaging for a dwell time and then released.

In some embodiments, the dwell time for pressing may be between 0.2 seconds and 300 seconds.

The dwell time may be at least 1 second in some embodiments.

In some embodiments, the assembling of multiple pressed sections into the filter media pack can comprise gathering the multiple pressed sections by moving the pressed sections into overlaying relationship. The multiple pressed sections may be attached to each other by folds and/or may be cut and otherwise separated and reassembled via a weld tool or seal bead attachment.

Although alternative packs are possible such as described in the background section above, preferred pleated embodiments are provided where the multiple pressed sections are attached that can avoid leak paths or the need to seal. To provide, the method may further include creasing the filter media sheet at spaced intervals to form a plurality of pleat tips, the filter media sheet being a continuous sheet extending through the pleat tips that is gathered subsequent to said creased to form a pleated filter media pack.

The method may yet further comprise conducting the creasing by the same stamping dies that perform other pressing. For example, the stamping dies can comprise mating female and male embossment features that form embossments and a crease feature comprising a male score extension interacting with a female score extension and forming the creasing.

The method may further comprise advancing the filter media sheet along a travel path, and extending the creasing in a direction that is perpendicular to the travel path and extending the embossments between adjacent creases.

According to a method of making dissimilar pleat panels, the method further comprises advancing the filter media sheet along a travel path, extending the creasing in a direction that is perpendicular to the travel path and pressing said embossments into a first panel of the filter media sheet and skipping the pressing on a second panel that is connected to the first panel by the creasing, such that the first and second panel mismatch, and successively repeating pressing of the first and second panels.

This method may m and panel that is flat and free of embossments.

Alternatively, different embossments can be pressed into a filter media sheet with downstream stamping dies, the downstream stamping dies being in a non-roll form, the second embossments being different than said embossments and being, formed on the second panel.

The method may also comprise intermittently and successively advancing and stopping the filter media sheet along a travel path, wherein while the filter media sheet is stopped said pressing is conducted and wherein while the filter media sheet is advancing the filter media sheet passes freely through the stamping dies.

Advantageous operations can optionally be performed during said stopping. For example, the method can additionally conduct at least one of the following operations downstream of the pressing dies: (a) bonding of adjacent pleats formed by a pleating operation; (b) trimming edges of adjacent pleats, the edges extending in the direction of the travel path; (c) cinching pleat tips at at least one of an inlet face and an outlet face of the filter media pack to increase air flow entrances or exits at the at least one of the inlet face and outlet face; and (d) structurally coupling components to adjacent panels formed by said pleating.

A more advanced methodology may also be practiced with multiple stamping dies while advancing the filter media sheet along a travel path. The method may also advance a plurality of sets of stamping dies along an endless path and over the filter media sheet along the travel path; and during said pressing advance at least one of said sets of the stamping dies along the travel path at the same speed as the filter media sheet along the travel path.

According to an embodiment, the stamping dies comprises a first die and a second die that together include a pair of plates movable toward and away from each other. The plates including mating female and male features that form the features for pressing. The method may further comprise linearly reciprocating the pair of plates toward and away from each other during said pressing with the mating female and male features received into each other with the filter media sheet therebetween.

According to an embodiment, each plate can comprise variable dimension extending grooves and extending ribs to provides for mating female and male embossment features, the variable dimension extending grooves and extending ribs extending having a varying dimension extending over at 6 centimeters of length of the embossment with at least one width of at least 2 millimeter, and at least one depth of at least 2 millimeter.

According to an embodiment the features comprise embossments pressed over a length of at least 6 centimeters of length of the embossment (preferably at least 10 centimeters for deeper packs) with at least one width of at least 2 millimeter, and at least one depth of at least 2 millimeter.

While the presses are not progressive in many embodiments, certain advantages can also be realized with a progressive stamping die arrangement, wherein two or more of the stamping dies engage the filter media sheet at different locations along the filter media sheet at different times.

For example, when advancing the filter media sheet along a travel path, and with the progressive stamping die arrangement extending transverse to the travel path with dies extending in side by side relation, during pressing the progressive stamping die arrangement can narrow a width of the filter media sheet extending transverse to the travel path at embossments formed by the pressing. This may be used to limit stretching of the media and may gather the media towards the center of the travel direction.

The method preferably comprises heating the media for the pressing to a temperature below a glass transition point of fibers of the media such that fibers are not bonded together due to said heating the media.

The heating preferably comprises elevating the temperature of the media to between: 65 and 125 degrees Celsius for medias that comprise at least 50% cellulose fibers by weight; and 65 and 205 degrees Celsius for medias that comprise at least 50% synthetic fibers by weight including at least one of polypropylene, polyester or nylon fibers.

Such heating may further comprise pre-heating the filter media sheet before entering the stamping dies.

When heating is used, the method may further comprise active cooling of the filter media sheet after said pressing.

In an embodiment, the pressing forms embossments with a length of greater than 5 centimeters, and width of at least 2 millimeters and a depth of a least 2 millimeter, and further comprises stretching the filter media sheet at said embossments to provide for an increase in air flow permeability in a pressed region of the filter media sheet.

In an embodiment, the pressing forms embossments having a depth of between 2 millimeters and 8 millimeter, wherein the filter media pack comprises the pressed region of the filter media sheet with the remainder comprising a un-pressed region that is five of the pressing, the pressed region comprising between 20% and 80% of the filter media pack, thereby creating different filter characteristic regions in the pleated filter media pack.

When the stretching feature is used, the filter media sheet can comprise a un-pressed air flow permeability prior to pressing with the pressed region of the filter media sheet comprising a pressed air flow permeability. Due to the stretching the pressed air flow permeability can be at least 110% greater than the un-pressed air flow permeability measured by TAPPI T251 air flow permeability test.

For most filtration applications, the filter media sheet prior to pressing has an air flow permeability of between 2 and 400 CFM (measured by ASTM D737-04(2012) standard); and an initial gravimetric efficiency of between 50% and 100% for ISO 12103-1, A2 Fine Test Dust measured by ISO 5011 standard, and a caliper thickness of between .2 and 7 millimeters.

In an curved plate embodiment, the stamping dies comprises a first die and a second die that together include a pair of plates movable toward and away from each other, the plates including mating female and male embossment features that form the embossments. The method further comprises linearly reciprocating the pair of plates toward and away from each other during said pressing with the mating female and male embossment features received into each other with the filter media sheet therebetween, and wherein the pair of plates includes first plate having a convex press surface that nests within a second plate having a concave press surface.

In many of the preferred embodiments, the pressing operation forms embossments having a depth of between 2 millimeters and 8 millimeters and a width of between 2 and 16 millimeters, over a length of at least 2.5 centimeters.

For many pressed media filtration applications, the filter media sheet comprises at least 10% polymer fibers by weight and stretching the polymer fibers during said pressing, wherein the polymer fibers comprise at least one of a fluorinated polymer. PVDF, polypropylene, polyester and nylon, the media fibers include fibers having a diameter size of less than 100 micron.

Another feature that can be used in conjunction with pressing is welding. The feature can comprise folding a plurality of sections of the filter media sheet into a pleated filter media pack with the sections extending adjacent each other between an inlet flow face and an outlet flow face, and welding portions of adjacent sections together subsequent to the folding.

In many of the more preferred embodiments, the method further comprises advancing the filter media sheet along a travel direction and pressing pleat creases into the filter media sheet upstream and downstream from the at least one feature at upstream and downstream creases that extend transversely relative to the travel direction and that form a plurality of sections. For example, at least some of the sections can be embossed sections, with the at least one pressed feature including grooves that extend in the embossed sections between upstream and downstream pleat creases.

In grooved media, the filter media sheet can define a thickness between a bottom surface and a top surface, with the grooves extending into the top and bottom surfaces to define peaks and valley that defining a height greater than a thickness of the filter media sheet. To facilitate better folding for pleating, pleat creases at an upstream end can located at a different elevation location than the pleat creases at a downstream end.

According to some embodiments that allow for adjustment of creasing, the pressing is conducted by a reciprocating ram that reciprocates a pair of plate assemblies relative to each other into and out of mating engagement with the filter media sheet pressed therebetween, each plate assembly comprising an emboss plate defining a plurality of male or female emboss features that engaging mate with male or female emboss features of the other plate assembly to press the grooves into the filter media sheet, each plate assembly further including upstream and downstream score bars adjustably mounted to opposed upstream and downstream of the emboss plate, the score bars being adjustable to adjust the location of the pleat creases relative to the height of the grooves.

In some embodiments, the grooves comprise tapering grooves that widen or narrow in a width that extends transverse to the travel direction as the grooves extend between the upstream and downstream creases.

Different arrangements can be realized when not all embossments are the same. For example, a first set of downstream grooves can start and extend from proximate the downstream crease toward the upstream crease but terminate at least 15% short of the upstream crease, and a second set of upstream grooves can start and extend from proximate the upstream crease toward the downstream crease but terminate at least 15% short of the downstream crease. With this arrangement the upstream and downstream grooves can be offset laterally but have overlapping portions such that at any plane perpendicular to the travel direction the plane extends through at least one of the upstream and downstream grooves to provide continuous bridge strength through a middle region of the embossed sections.

Laminating can also optionally be conducted. A method may further comprise unwinding the filter media sheet from a first media roll and unwinding a laminate sheet from a second media roll, and advancing the filter media sheet and the laminate sheet toward the pressing and subsequently overlapping the filter media sheet and the laminate sheet prior to pressing, wherein the pressing forms the at least one feature simultaneously into laminate sheet and the filter media sheet.

For some commercially practical pleated embodiments, the method can further comprise: unwinding the filter media sheet from a filter media sheet roll; moving the filter media sheet through a press station having first and second die assemblies to provide said pressing; reciprocating first and second die assemblies toward and away from each other and into and out of engagement with the filter media sheet to provide embossed sections of the filter media sheet and wherein the at least one feature to include grooves between peaks in the filter media sheet; and forming creases and gathering the filter media sheet via folds at the creases to form a pleated filter media pack.

The pressing allows for other a variety of embossment options. For example, the filter media sheet has opposed side edges traveling parallel to the travel path, and the creases extend transverse to the travel path and through the opposed side edges, and at least some of the grooves can extend in a curved path.

In some curved embossments in pleated embodiments, the pleated filter media pack defines an inlet face along a first set of the crease and an outlet face along a second set of the creases, wherein at least some of the grooves that extend in a curved path also extend from proximate at least one of the inlet face or outlet face toward at least one of the opposed side edges.

At least some of the grooves can extend from proximate the inlet face to proximate the outlet face.

Some embodiments may also incorporate pocket pleats. The pleated filter media pack can comprise pleat panels that form pocket pleats wherein opposed side edges are joined together at select adjacent pleat panels to form the pocket pleats. If curved embossments are used, the curved path of such embossments are arranged to direct fluid flow from at least one of the inlet face and outlet face toward at least one of the opposed side edges to provide increased reachability.

Different shapes may also be realized and accomplished readily with such pressing in some embodiments. For example, the method may move the filter media sheet through a press station having first and second die assemblies to provide said pressing wherein reciprocating first and second die assemblies toward and away from each other and into and out of engagement with the filter media sheet to provide embossed sections of the filter media sheet and wherein the at least one press feature includes grooves between peaks in the filter media sheet. The method may also form creases and gather the filter media sheet via folds at the creases to form a pleated filter media pack comprising a plurality of pleat panels. To provide a different shape, a first set of pleat panels can have a different span between the creases than a second set of pleat to provide the pleated filter media pack with a stepped inlet face and a stepped outlet face.

Curved packs can also be accomplished. Such method can comprise moving the filter media sheet along a travel path through a press station having first and second die assemblies to provide said pressing wherein reciprocating first and second die assemblies toward and away from each other and into and out of engagement with the filter media sheet to provide embossed sections of the filter media sheet and wherein the at least one feature to include grooves between peaks in the filter media sheet; forming creases, wherein filter media sheet has opposed side edges traveling parallel to the travel path, the creases extend transverse to the travel path and through the opposed side edges, cutting a plurality of curves into at least one of the opposed side edges; such that the pleated filter media pack defines a first flow face along the creases and a second face non-parallel to the first flow face with the curves extending and connecting therebetween; and gathering the filter media sheet via folds at the creases and securing the adjacent panels together at the second face to form a pleated filter media pack comprising a plurality of pleat panels.

When curved packs are cut, the curve cutting can cut curves into both of the opposed side edges of the filter media sheet and can displace the flow faces such that the first flow face can be displaced as may be desired, which can be by at least 30 degrees relative to the second face.

The method may form other curved shapes as well in other embodiments that can be accomplished without cutting. The method can move the filter media sheet through a press station having first and second die assemblies to provide said pressing wherein reciprocating first and second die assemblies toward and away from each other and into and out of engagement with the filter media sheet to provide embossed sections of the filter media sheet and wherein the at least one feature to include grooves between peaks in the filter media sheet; and form creases and gather the filter media sheet via folds at the creases to form a pleated filter media pack comprising a plurality of pleat panels; and displace pleat panels from adjacent pleat panels to provide a portion with a curved shape or a corkscrew shape to the pleated filter media pack, wherein the curved shape or corkscrew shape is formed without cutting.

The method affords the opportunity to use additional structures such as tabs. The method may also secure tabs to at least some oldie pleat panels, the tabs being formed of a material more rigid than the filter media sheet.

In one embodiment, the tabs serve a pleat securement function comprising securing two adjacent pleat panels together with each of the tabs, each tab having a first portion secured a first of the adjacent pleat panels and another portion secured to a second of the adjacent pleat panels.

In another embodiment, the tabs project outward from an end face or a side face of the pleated filter media pack, and wherein an elastomeric seal adapted for forming a seal with a housing is provided with the tabs embedded in the elastomeric seal and supporting the seal.

Integral tabs in the filter media sheet can also be pressed or cut. For example, the method can form integral tabs into the filter media sheet that extend outward from at least some of the pleat panels; and use those to secure a seal by embedding the tabs within the seal.

According to more specific inventive aspect directed at embossed pleated filter media packs, a method of forming a pleated filter media pack with a filter media sheet, comprises: pressing embossments into the filter media sheet repeatedly with stamping dies, the stamping dies being in a non-roll form; pleating the filter media sheet; and gathering the pleated filter media sheet to provide the pleated filter media pack.

The filter media sheet can be creased at spaced intervals to form a plurality of pleat tips, the embossments disposed at least partially between pleat tips.

Preferably, the creasing is conducted the creasing by said stamping dies, the stamping dies comprising mating female and male embossment features that form the embossments and a crease feature comprising a male score extension interacting with a female score extension and forming the creasing.

In some embodiments, the creased intervals are uniformly spaced and wherein the pleats extend between pleat tips at an inlet face and pleat tips at an outlet face, and the distance between the pleat tips at the inlet face and the pleat tips at the outlet face remain constant.

In other embodiments, at least some of the intervals are non-uniformly spaced and wherein the pleats extend between pleat tips at an inlet face and pleat tips at an outlet face, the distance between the pleat tips at the inlet face and the pleat tips at the outlet face varying and creating the pleated filter media pack that is irregularly shaped with a region of the inlet face and the outlet face extending obliquely.

Preferably, the creasing comprises scoring the filter media sheet.

In many on the more preferred embodiments, the method further comprises advancing the filter media sheet along a travel path, extending the creasing in a direction that is perpendicular to the travel path and extending the embossments between adjacent creases.

Further, the method may advance the filter media sheet along a travel path, extend the creasing in a direction that is perpendicular to the travel path and press said embossments into a first panel of the filter media sheet and skip the pressing on a second panel that is connected to the first panel by the creasing, such that the first and second panel mismatch, and successively repeating pressing of the first and second panels.

This can result in an arrangement wherein the second panel is flat and free of embossments.

The method may comprise use of multiple die sets. The method may press different embossments into a filter media sheet with downstream stamping dies, the downstream stamping dies being in a non-roll form, the second embossments being different than said embossments and being formed on the second panel.

When used, the crease feature can comprises an upstream crease feature and a downstream crease feature formed on the stamping dies, the embossment features extending between the upstream crease feature and the downstream crease feature, wherein during pressing, upstream and downstream creases are formed by the stamping dies.

While continuous media advancement can be done with a loop of dies or indexable dies, the pressing methodology allows for and may advantageously use an intermittent process that comprises intermittently and successively advancing and stopping the filter media sheet along a travel path, wherein while the filter media sheet is stopped said pressing is conducted and wherein while the filter media sheet is advancing the filter media sheet passes freely through the stamping dies.

For example, during intermittent stoppage, the method additionally conduct at least one of the following operations downstream of the pressing dies: (a) bonding of adjacent pleats formed by said pleating; (b) trimming edges of adjacent pleats, the edges extending in the direction of the travel path; (c) cinching pleat tips at at least one of an inlet face and an outlet face of the pleated filter media pack to increase air flow entrances or exits at the at least one of the inlet face and outlet face; and (d) structurally coupling components to adjacent panels formed by said pleating.

The method can further comprise an optional continuous operation of: advancing the filter media sheet along a travel path; advancing a plurality of sets of stamping dies along an endless path and over the filter media sheet along the travel path; and during said pressing advancing at least one of said sets of the stamping dies along the travel path at the same speed as the filter media sheet along the travel path.

The stamping dies can comprise a first die and a second die that together include a pair of plates movable toward and away from each other, the plates including mating female and male embossment features that form the embossments. The method may then further comprise linearly reciprocating the pair of plates toward and away from each other during said pressing with the mating female and male embossment features received into each other with the filter media sheet therebetween.

In some preferred embodiments and while alternatives are possible, the plates extend in parallel planes and each plate comprises linearly extending grooves and linearly extending ribs to provides for the mating female and male embossment features, the linearly extending grooves and linearly extending ribs maintaining a consistent depth and height for at least 90% of the length of central portions of the embossments extending between pleat tips that is formed during said pressing and pleating.

The method may further comprise pressing tapered end portions into opposed ends of the central portions of the embossments adjacent the pleat tips, the tapered end portions extending toward the pleat tips.

In some alternative embodiments, each plate can comprise variable dimension extending grooves and extending ribs to provides for the mating female and male embossment features, the variable dimension extending grooves and extending ribs extending having a varying dimension extending over at 6 centimeters of length of the embossment with at least one width of at least 2 millimeter, and at least one depth of at least 2 millimeter.

According to a feature and advantage with some embodiments, the embossments form a pattern that is incapable of duplication by rolls. Pressing utilizing plates opens up options previously not available.

For deeper packs, preferably the method presses each embossment over a length of at least 10 centimeters.

While non-progressive stamping can be done as according to many of the embodiments, the stamping dies can also comprise a progressive stamping die arrangement, wherein two or more of the stamping dies engage the filter media sheet at different locations along the filter media sheet at different times.

In progressive stamping, the method can advance the filter media sheet along a travel path, and wherein the progressive stamping die arrangement extends transverse to the travel path with dies extending in side by side relation, and wherein during pressing the progressive stamping die arrangement narrows a width of the filter media sheet extending transverse to the travel path at the embossment.

In many of the embodiments, the pleating creates pleats having a pleat depth of greater than 6 centimeters, and said pressing forms embossments with a length of greater than 5 centimeters, and width of at least 2 millimeters and a depth of a least 2 millimeter.

Preferably, the embossments extend at least 90% of the span of the pleat depth.

To better set the pressed embossments, the method can further comprise heating the media for the pressing to a temperature below a glass transition point of fibers of the media such that fibers are not bonded together due to said heating the media.

The heating can comprise elevating the temperature of the media to between: 65 and 125 degrees Celsius for medias that comprise at least 50% cellulose fibers by weight; 65 and 205 degrees Celsius for medias that comprise at least 50% synthetic fibers by weight including at least one of polypropylene, polyester or nylon fibers.

Heating may also comprise pre-heating the filter media sheet before entering the stamping dies and/or active cooling of the filter media sheet after said pressing.

With a press, an advantageous dwell time to set pressed embossments can be done comprising engaging the filter media sheet with the stamping dies during each pressing for a dwell time of between 0.2 and 300 seconds.

The pleated filter media pack can comprise upstream pleat tips at an upstream face and downstream pleat tips at a downstream face with pleat panels extending between upstream pleat tips and downstream pleat tips, the pleat tips extending transversely between opposed side edges, with the method further comprising sealing side edges and bonding adjacent pleat panels together at locations between side edges in some embodiments.

According to some embodiments, said bonding comprises welding the filter media sheet to itself at various locations between opposed side edges.

Such welding can conducted on at least one of the upstream pleat tips and the downstream pleat tips at a plurality of spaced locations along each of said at least one of the upstream pleat tips and the downstream pleat tips.

Such welding can be conducted in an array between adjacent panels at a plurality of spaced locations extending transversely between opposed side edges and at a plurality of spaced locations extending transversely between upstream pleat tips and downstream pleat tips.

Such bonding can alternatively comprise adhesively attaching the embossments a first panel to an adjacent second panel.

The pleated filter media pack can comprise upstream pleat tips at an upstream face and downstream pleat tips at a downstream face with pleat panels extending between upstream pleat tips and downstream pleat tips, the pleat tips extending transversely between opposed side edges, with the method further comprising welding opposed side edges of alternating adjacent pleat panels together to form pocket pleats in some embodiments.

The pressing can optionally provide a further advantage of stretching the filter media sheet at the embossments to provide for an increase in air flow permeability in a pressed region of the filter media sheet.

Stretching may appreciably affect filtration parameters. For example, the filter media sheet comprises a un-pressed air flow permeability prior to pressing and the pressed region of the filter media sheet comprises a pressed air flow permeability, wherein due to the stretching the pressed air flow permeability being at least 110% greater than the un-pressed air flow permeability measured by TAPPI T251 air flow permeability test.

In some embodiments, the pressed air flow permeability is between 125% and 500% greater the un-pressed air flow permeability.

This may be used to create different filtering regions. The pleated filter media pack can comprise the pressed region of the filter media sheet with the remainder comprising a un-pressed region that is free of the pressing, the pressed region comprising between 20% and 80% of the pleated lifter media pack, thereby creating different filter characteristic regions in the pleated filter media pack.

In some embodiments, at least one efficiency layer is arranged along an upstream inlet face of the pleated filter media pack relative to a predetermined direction of airflow while configuring the filter for use in a reverse pulsing application; or alternatively the support layer is arranged along an upstream inlet face of the pleated filter media pack relative to a predetermined direction of airflow while configuring the filter for use in a single use disposable filter application.

The method is particularly useful in deep pleat packs and may extend the pleats between pleat tips at an inlet face and pleat tips at an outlet face with a rectangular periphery extending between the inlet face and the outlet face, and extending a sealing system around the rectangular periphery, and wherein said pleating creates pleats having a pleat depth of greater than 6 centimeters, and preferably a pleat depth of at least 15 centimeters, and much deeper if desired.

For most filtration applications, the filter media sheet prior to pressing has an air flow permeability of between 10 and 150 CFM (measured by ASTM D737-04(2012) standard); and an initial gravimetric efficiency of between 50% and 100% for ISO 12103-1, A2 Fine Test Dust (measured by ISO 5011 standard), and a caliper thickness of between .2 and 1 millimeters.

The pressing can also create graphics. The method may further comprise forming at least some of the embossments on an external visible surface of the pleated filter media pack in the form of a brand that provides at least one of brand identification, flow direction, installation information, filter media parameters, and part number.

Different types of embossments may be used. The method may further comprise forming a second set of embossments of a different form that are separate from said at least some of the embossments on an external visible surface.

According to a curved die arrangement, the stamping dies comprises a first die and a second die that together include a pair of plates movable toward and away from each other, the plates including mating female and male embossment features that form the embossments, further comprising linearly reciprocating the pair of plates toward and away from each other during said pressing with the mating female and male embossment features received into each other with the filter media sheet therebetween, and wherein the pair of plates includes first plate having a convex press surface that nests within a second plate having a concave press surface.

Preferably, such pressing forms embossments having a depth of between 2 millimeters and 8 millimeters and a width or between 2 and 16 millimeters.

For better pressing, the filter media sheet comprises at least 10% polymer fibers by weight (more preferably at least 20%) and can involve stretching the polymer fibers during said pressing.

Such polymer fibers comprise at least one of a fluorinated polymer, PVDF, polypropylene, polyester and nylon, as commonly used in filtration or other such polymers.

The pressed filter media sheet can comprise at least one of the following media fibers: wet laid micro-fiberglass, nylon, polypropylene, polyester, wet laid cellulose and wet laid polymer, the media fibers include fibers having a diameter sire of less than 100 micron.

According to another inventive aspect that can employ an assembly line machine, a method of forming a filter media pack with a filter media sheet, comprises: unwinding the filter media sheet from a filter media sheet roll; moving along a travel path the filter media sheet through a press station comprising a cooperating pair of first and second stamping dies: pressing at least one feature into panels of a the filter media sheet with the pair of stamping dies; reciprocating the first and second stamping dies toward and away from each other during said pressing; and assembling multiple pressed sections into the filter media pack.

Preferably, said reciprocating comprises linear reciprocating movement.

According to many embodiments, the method reciprocates first and second die assemblies toward and away from each other and into and out of engagement with the filter media sheet provides embossed sections of the filter media sheet and wherein the at least one feature to include grooves between peaks in the filter media sheet; and forms creases and gathering the filter media sheet via folds at the creases to form a pleated filter media pack comprising a plurality of pleat panels.

In many of the preferred embodiments, the at least one press feature comprises embossments, wherein the stamping dies are successively pressed and released, during the pressing the stamping dies engaging for a dwell time and then released.

Such dwell time can be between 0.2 seconds and 300 seconds to hold embossment shape.

The method can further involve heating the filter media sheet for the pressing to a temperature below a glass transition point of fibers of the media such that fibers are not bonded together due to said heating the filter media sheet.

Such heating can comprise heating at least one of the first and second dies to a temperature above 65 degrees Celsius to heat press the filter media sheet during the dwell time.

Such heating can also comprise pre-heating the filter media sheet to above ambient.

Such heating may elevate the temperature of the media to between: 65 and 125 degrees Celsius for medias that comprise at least 50% cellulose fibers by weight; or 65 and 205 degrees Celsius for medias that comprise at least 50% synthetic fibers by weight including at least one of polypropylene, polyester or nylon fibers comprising active cooling of the filter media sheet after said pressing.

Such method may also comprise active cooling of the filter media sheet after said pressing.

The method can further comprise folding the filter media sheet having embossments after the heat pressing to create pleat panels and pleats having a pleat depth of greater than 6 centimeters, and said pressing forms embossments with a length of greater than 5 centimeters, and width of at least 2 millimeters and a depth of a least 2 millimeter.

In some embodiments, the pleats comprise first pleat panels having embossments and second pleat panels free of embossments.

The method can further comprise after said heat pressing: bonding of adjacent pleats formed by a pleating operation.

The method can also comprise after said heat pressing: trimming edges of adjacent pleats, the edges extending in the direction of the travel path.

The method can also comprise after said heat pressing: cinching pleat tips at at least one of an inlet face and an outlet face of the filter media pack to increase air flow entrances or exits at the at least one of the inlet face and outlet face.

The method can further comprise pressing the at least one feature to be a plurality of embossments over a length of at least 10 centimeters, and preferably over a length of at least 20 centimeters.

According to another inventive aspect, a method of forming a filter media pack with a filter media sheet, comprises: pressing embossments into the filter media sheet; and stretching the filter media sheet at the embossments through said pressing to provide the filter media sheet with decreased initial filtration efficiency, an increased porosity and an increased air flow permeability relative to the filter media sheet prior to pressing.

Such pressing can form stretched embossments having a length of at least 5 centimeters, a depth of between 2 millimeters and 8 millimeter, and a width of between 2 millimeters and 16 millimeters.

The filter media pack can comprise the pressed region of the filter media sheet with the remainder comprising a un-pressed region that is free of the pressing, the pressed region comprising between 20% and 80% of the filter media pack, thereby creating different filter characteristic regions in the pleated filter media pack In some embodiments, the filter media sheet comprises a un-pressed air flow permeability prior to pressing and the pressed region of the filter media sheet comprises a pressed air flow permeability, wherein due to the stretching the pressed air flow permeability being at least 110% greater than the un-pressed air flow permeability measured by TAPPI T251 air flow permeability test.

The filter media sheet prior to pressing can have an air flow permeability of between 2 and 400 CFM (measured by ASTM D737-04(2012) standard); and an initial gravimetric efficiency of between 50% and 100% for ISO 12103-1, A2 Fine Test Dust measured by ISO 5011 standard, and a caliper thickness of between .2 and 7 millimeters.

To facilitate pressing, said pressing can comprise linearly reciprocating stamping dies comprises a first die and a second die that together include a pair of plates movable toward and away from each other, the plates including mating female and male embossment features that form the embossments, during linearly reciprocating the mating female and male embossment features are received into each other with the filter media sheet pressed therebetween.

Such press plates can extend in parallel planes and each plate comprises linearly extending grooves and linearly extending ribs to provides for the mating female and male embossment features, the linearly extending grooves and linearly extending ribs maintaining a consistent depth and height for at least 90% of the length of central portions of the embossments extending between pleat tips that is formed during said pressing and pleating.

In a preferred operation, the stamping dies are successively pressed and released, during the pressing the stamping dies engaging for a dwell time and then released, wherein the dwell time is at least 0.2 seconds.

Also preferably, the filter media sheet is heated for the pressing to a temperature below a glass transition point of fibers of the media such that fibers are not bonded together due to said heating the filter media sheet.

Such heating can comprise heating at least one of the first and second dies to a temperature above 65 degrees Celsius to heat press the filter media sheet during the dwell time.

Another inventive aspect is directed toward an apparatus for processing a filter media sheet that is unwound from a filter media roll, and that may be used to perform any of the methods above or herein. The apparatus comprises: a media unwind region adapted for receiving the filter media roll; a press comprising a pair of cooperating stamping dies disposed downstream from the media unwind region, the press including a ram driving the stamping dies into and out of engagement, the stamping dies comprising mating female and male embossment features that are adapted to form embossments in the filter media sheet; and a media conveying mechanism arranged for advancing the fitter media sheet through the press along a travel path.

The ram can comprise an electric or fluid powered linear actuator in communication with a control that is configured to successively drive the ram to reciprocate the stamping dies into and out of engagement.

Such a control can be configured to press the stamping dies in engagement for a dwell time of at least 0.2 seconds.

The apparatus may optionally include a heater acting upon the stamping dies and having an operative condition that heats the stamping dies to at least 65 degrees Celsius.

Such control can also be in communication with the media conveying mechanism, with the control configured to stop the conveying mechanism when the stamping dies are engaged and drive the conveying mechanism when the stamping dies are disengaged.

In the apparatus, the female embossment features can comprise grooves having a length of at least 5 centimeters, a depth of between 2 millimeters and 8 millimeter, and a width of between 2 millimeters and 16 millimeters.

Preferably, in an engaged position, a gap between the stamping dies is provided that measures no less than 50% of a thickness of the filter media sheet.

The stamping dies comprise a pair of plate assemblies, the pair of plate assemblies moving into and out of mating engagement for pressing the fitter media sheet therebetween, each plate assembly comprising an emboss plate defining the male or female emboss features that engaging mate with male or female emboss features of the other plate assembly, each plate assembly further including upstream or downstream score bars adjustably mounted to opposed upstream and downstream of the emboss plate, the score bars being adjustable to adjust the location and having a pleat score line for forming pleat creases in the filter media sheet.

For pleated packs, the apparatus may include a pleater downstream of the press configured to fold the filter media sheet along the creases.

Optionally, the apparatus includes a trimmer arranged on one or both sides of the travel path, the trimmer being arranged upstream or downstream from the press and adapted to trim one or both of opposed side edges of the filter media sheet.

Optionally, the apparatus comprises an adhesive applicator arranged to apply adhesive above or below the filter media sheet along the travel path.

Optionally, the apparatus comprises a plunge welder and an anvil downstream from the press, the plunge welder arranged along the travel path and movable toward and away from an anvil, the plunge welder and anvil having weld contact features adapted to form at least one of pocket welds, stitches, cinches, or sealed seams into the filter media sheet.

Optionally, the apparatus further comprises a cutter cutting transverse relative to the travel path for cutting through the media to spans that define media packs.

In some embodiments of the apparatus, the stamping dies comprise a pair of plate assemblies, the pair of plate assemblies moving into and out of mating engagement for pressing the filter media sheet therebetween, each plate assembly comprising an emboss plate defining the male or female emboss features that engaging mate with male or female emboss features of the other plate assembly, each plate assembly including upstream and downstream score bars mounted to upstream and downstream ends of the emboss plate.

Optionally, the pair of stamping dies can comprise a progressive stamping die arrangement.

The press may comprise a plurality of stamping dies are provided moveable along an endless path with a portion of the endless path along the travel path with a speed matched to that of the media conveying mechanism. The path may be a loop or linear indexing as shown in embodiments herein.

In alternative embodiment of the apparatus, the stamping dies may have a planar extending section including the mating female and male embossment features for forming embossments, and lobed regions on one or both ends for creating creases for forming pleats in the filter media sheets, the die being rotatable in addition to being driven in reciprocating movement.

The embossment features may further comprise mating taper regions formed into the stamping dies at upstream and downstream ends of the grooves.

Such mating tapering regions can extend from bottoms of grooves toward ridges formed on either of each groove.

In such an apparatus, the embossment features can advantageously extend at least 90% full span of the emboss plate between upstream and downstream score bars.

Another inventive aspect is directed toward a pleated filter media pack, comprising: a filter media sheet that includes a plurality of folds that form a plurality of pleat panels extending between first pleat tips along a first face of the filter media and second pleat tips along a second face of the filter media, the pleat tips and the pleat panels extending between opposed side edges of the pleated filter media pack, the plurality of pleat panels including first pleat panels and second pleat panels; and wherein the first pleat panels of are formed with a different strength or filtering characteristic defined by the filer media sheet than the second pleat panels.

In the pleated filter media pack, the first pleat panels may comprise first embossments formed therein that are not formed on the second pleat panels.

For example, the second pleat panels can flat or may have other features.

In the pleated filter media pack, the first embossments can comprise grooves extending at least 90% of a distance between first pleat tips and second pleat tips.

In the pleated filter media pack, the first pleat panels can be pressed to include stretched regions and wherein the second pleat panels are unpressed.

In the pleated filter media pack, the pleat panels can extend at least 5 centimeters between creases, and wherein the embossments can have a length of at least 5 centimeters, a depth of between 2 millimeters and 8 millimeter, and a width of between 2 millimeters and 16 millimeters, and wherein at least 3 pleat panels per centimeter across the first face or second face of the filter media can be provided.

Preferably, the pleat panels extend at least 10 centimeters between creases and the embossments extend a length at least 10 centimeters.

The filter media pack can comprise a pressed region of the filter media sheet with the remainder comprising a unpressed region that is free of the pressed region, the pressed region comprising between 20% and 80% of the filter media pack, thereby creating different filter characteristic regions in the pleated filter media pack Such unpressed region can comprise an un-pressed air flow permeability and the pressed region of the filter media sheet can comprise a pressed air flow permeability, wherein due to the stretching the pressed air flow permeability being at least 110% greater than the un-pressed air flow permeability measured by TAPPI T251 air flow permeability test.

For most applications, in the pleated filter media pack, the filter media sheet prior to pressing (e.g. any unpressed region) has an air flow permeability of between 2 and 400 CFM (measured by ASTM D737-04(2012) standard); and an initial gravimetric efficiency of between 50% and 100% for ISO 12103-1, A2 Fine Test Dust measured by ISO 5011 standard, and a caliper thickness of between .2 and 7 millimeters.

According to another inventive aspect, some embodiments are non-cuboid. For example, the filter media sheet can include a plurality of folds that form a plurality of pleat panels extending between first pleat tips along an inlet face of the filter media and second pleat tips along an outlet face of the filter media, the pleat tips and the pleat panels extending between opposed side edges of the pleated filter media pack. The plurality of pleat panels can include first pleat panels and second pleat panels; and wherein the first pleat panels extend at a different depth than second pleat panels as between the first pleat tips and the second pleat tips to fora a pleated filter media pack configuration that is other than a rectangular cuboid.

Such folds can be formed at creases, with a first set of pleat panels having a different span between the creases than a second set of pleat to provide the pleated filter media pack with at least one of a stepped inlet face and a stepped outlet face.

Such a pleated filter media pack can have both of a stepped inlet face and a stepped outlet face in certain embodiments shown herein.

In the pleated filter media pack, the first pleat panels can comprise first embossments formed therein, wherein the pleat panels extend at least 5 centimeters between creases, and wherein the embossments having a length of at least 5 centimeters, a depth of between 2 millimeters and g millimeter, and a width of between 2 millimeters and 16 millimeters, and wherein at least 3 pleat panels per centimeter across the first face or second face of the filter media are provided.

Preferably, the pleat panels extend at least 10 centimeters between creases and the embossments extend a length at least 10 centimeters.

In the pleated filter media pack, the filter media pack can comprises a pressed region of the filter media sheet with the remainder comprising a un-pressed region that is free of the pressed region, the pressed region comprising between 20% and 80% of the filter media pack, thereby creating different filter characteristic regions in the pleated filter media pack. The filter media sheet prior to pressing (e.g. unpressed regions) can have an air flow permeability of between 2 and 400 CFM (measured by ASTM D737-04(2012) standard); and an initial gravimetric efficiency of between 50% and 100% for ISO 12103-1, A2 Fine Test Dust measured by ISO 5011 standard, and a caliper thickness of between .2 and 7 millimeters.

In some preferred embodiments, the second pleat panels are flat.

In some preferred embodiments of the pleated filter media pack, the first embossments comprise grooves extending at least 90% of a distance between first pleat tips and second pleat tips.

In some embodiments, one of the inlet and outlet faces extends perpendicularly to a surrounding outer rectangular periphery, wherein only one of the inlet and outlet faces is stepped.

In some embodiments, sets of the panels progressively get longer or shorter as the panels extend from one side to another side of the pleated filter media pack, wherein at least 3 distinct panel spans are provided, not including end panels.

According to another inventive aspect, a filter media pack, comprises: a filter media sheet that includes a plurality of embossments that are stretched and formed into the filter media sheet wherein the filter media sheet has a free area free of the embossments and an embossed area, the embossed area having a decreased initial filtration efficiency, an increased porosity and an increased air flow permeability relative to the free area.

In such a filter media pack, filter media pack includes first panels comprising first embossments formed therein that are not formed on second panels.

Preferably, the second panels are flat and overlay in contact the first panels.

More preferably, the first and second panels are connected at folds and form a pleated filter media pack.

The embossments can comprise grooves extending at least 90% of a distance ends of the first panels.

The embossed area can be pressed to include stretched regions and wherein the free area is unpressed.

Typically in such stretched embossments in a filter media pack, the embossments extend a length at least 5 centimeters, and wherein the embossments having a length of at least 5 centimeters, a depth of between 2 millimeters and 8 millimeter, and a width of between 2 millimeters and 16 millimeters, and wherein the free area has an air flow permeability of between 2 and 400 CFM (measured by ASTM D737-04(2012) standard); and an initial gravimetric efficiency of between 50% and 100% for ISO 12103-1, A2 Fine Test. Dust measured by ISO 5011 standard, and a caliper thickness of between .2 and 7 millimeters.

Another inventive aspect is directed toward a filter media pack, comprising: a plurality of filter media panels formed from a filter media, the plurality of filter media panels in overlaying relation to provide the filter media pack and extending between an outlet face and an inlet face, with a flow path running through the filter media from the inlet face to the outlet face; a plurality of tabs directly and separately connected to at least some of the panels, the tabs extending outwardly from a side or the inlet or outlet face of the filter media pack; and a seal of elastomeric material having a continuous annular sealing surface, the tabs being embedded in the seal.

The seal material may additionally be embedded within a peripheral portion of the filter media of the filter media pack.

The tabs may comprise integrally formed tabs of the filter media extending from an edge of the filter media panels.

Alternatively, the tabs are formed of a material more rigid than the filter media sheet.

When non-integral tabs are used, the tabs may have a first portion overlaying and bonded to the filter media, and a second portion having apertures, the seal material extending through the apertures.

The elastomeric material of the seal is typically molded to the tabs, and the elastomeric material is preferably molded in surrounding relation of the media pack, but may be offset from a flow face as well Another inventive aspect of the present invention is directed toward filter media pack, comprising: a plurality of filter media panels formed from a filter media, the plurality of filter media panels in overlaying relation to provide the filter media pack and extending between an outlet face and an inlet face, with a flow path running through the filter media from the inlet face to the outlet face; a plurality of tabs directly and separately connected to at least some of the panels, each tab securing at least two of the panels together.

Preferably, the tabs are formed of a material more rigid than the filter media sheet.

Each tab can have a hinge and wings extending from the hinge. The filter media pack may further comprise a fastener securing the wings together.

When employed on a pleated filter media pack, the panels and filter media comprises a filter media sheet that includes a plurality of folds that form a plurality of pleat panels extending between first pleat tips along an inlet face of the filter media and second pleat tips along an outlet face of the filter media, the pleat tips and the pleat panels extending between opposed side edges of the pleated filter media pack, the plurality of pleat panels including first pleat panels and second pleat panels; and the tabs pinch and securing pleats together.

Such tabs can be advantageously used with embossments on at least some of the pleat panels that extend between the inlet face and the outlet face, with the tabs being in overlapping relation with creases forming the folds at at least one of the inlet and outlet faces and in overlapping relation with the embossments.

The first pleat panels can comprise first embossments formed therein that are not formed on the second pleat panels, and/or the embossments can comprise grooves extending at least 90% of a distance between first pleat tips and second pleat tips.

Another inventive aspect of the present invention is directed toward a pleated filter media pack, comprising: a filter media sheet that includes a plurality of folds that form a plurality of pleat panels extending between first pleat tips along a first face of the filter media and second pleat tips along a second face of the filter media, the pleat tips and the pleat panels extending between opposed side edges of the pleated filter media pack, the plurality of pleat panels including first pleat panels and second pleat panels, wherein the filter media pack includes four sides in surrounding relation and that extend from the inlet face to the outlet face; and wherein adjacent sets of pleat panels are shifted relative to each other such that at least two of the sides are non-planar.

In such a pleated filter media pack, two of the sides may be planar and two of the sides may be curved.

Alternatively, all four of the sides are non-planar and curved, the adjacent sets of panels being rotated relative to each other about an axis that is perpendicular to the pleat panels.

Another inventive aspect of the present invention is directed toward a pleated filter media pack, comprising: a filter media sheet that includes a plurality of folds that form a plurality of pleat panels extending between a first end face of the filter media and a second end face of the filter media, the folds extending between opposed side edges of the pleated filter media pack, the plurality of pleat panels including first pleat panels and second pleat panels, and wherein the filter media pack includes four sides in surrounding relation and that extend from the first end face to the second end face; and further comprising embossments in the form of grooves on at least some of the pleat panels extending in a curved path along the length of the grooves as the grooves extend between the first end face and the second end face, the grooves making a turn of at least 20 degrees.

The aspect may additionally comprise straight grooves that have a strait portion along the length of the straight grooves.

This feature may be used with curved packs, where the first and second end faces may planar, and wherein at least two of the sides are planar and at least one of the sides is curved, and preferably both sides are curved.

Preferably, the curvature of the at least one side matches the curvature of the curved path of the embossments.

This curvature may be also advantageously used with pocket pleats, wherein the pleated filter media pack comprises pleat panels that form pocket pleats wherein opposed side edges are joined together at select adjacent pleat panels to form the pocket pleats, the curved path arranged to direct fluid flow from at least one of an inlet face and an outlet face formed by one of the end faces toward at least one of the opposed side edges.

Another inventive aspect of the present invention is directed toward a filter media pack, comprising: a plurality of filter media panels formed from a filter media including first panels and second panels, the plurality of filter media panels in overlaying relation to provide the filter media pack and extending between an outlet face and an inlet face, with a flow path running through the filter media from the inlet face to the outlet face; a plurality of first embossments on the first panels, and a plurality of second embossments on the second panels, the first embossments and the second embossments and nesting either within or adjacent each other.

In such a nested arrangement the first embossments can extend into a region between the first and second panels, and second embossments can extend in the region between first and second media panels.

Such nested embossments can nest within each other and/or the embossments can be offset and adjacent each other.

The nesting arrangement can provide compactness. The first panel and the second panel can closer together than a maximum depth of the first embossment and a maximum depth of the second embossment, combined.

Another inventive aspect of the present invention is directed toward a filter media pack, comprising: a plurality of filter media panels formed from a filter media including first panels and second panels, the plurality of filter media panels in overlaying relation to provide the filter media pack and extending between an outlet face and an inlet face, with a flow path running through the filter media from the inlet face to the outlet face; plurality of embossments formed in at least the first panels, the embossments comprising first embossments and second embossments, wherein the first and second embossments cover at least 90% of a span between the inlet face and the outlet face to maintain bridge strength in the filter media pack; wherein the first embossment has first length extending in a first direction and the second embossment has a second length extending in a second direction.

The first and second lengths can be linear.

Additionally, the first and second lengths each separately can extend at least 90% of a span between the inlet face and the outlet face, and wherein the first embossment extends at a different angle than the second embossment between the inlet face and the outlet face.

Another inventive aspect of the present invention is directed toward a filter media pack, comprising: a plurality of filter media panels formed from a filter media including first panels and second panels, the plurality of filter media panels in overlaying relation to provide the filter media pack and extending between an outlet face and an inlet face, with a flow path running through the filter media from the inlet face to the outlet face; a plurality of embossments formed in at least the first panels, the embossments comprising first embossments and second embossments, the first and second embossment extending less than 90% of a span between the inlet face and the outlet face, wherein the first embossments cover a span region not covered by the first embossments such that in combination the first and second embossments cover at least 90% of a span between the inlet face and the outlet face to maintain bridge strength in the filter media pack.

In some embodiments, the first embossments extend from proximate the inlet face toward the outlet face but terminate in a middle region of the filter media panels, and the second embossments extend from proximate the outlet face toward the inlet face but terminate in the middle region of the filter media panels.

In some embodiments, the first embossments and the second embossments are linearly aligned with each other between the inlet face and the outlet face but do not overlap each other in the middle region, and may connect into each other.

The first embossments and the second embossments can be arranged offset from each other relative to extend past each other as the first embossments extend toward the outlet face and as the second embossments extend toward the inlet face.

The embossments may also be on different panels, wherein the first embossments are on the first panels and the second embossments are on the second panels, although alternatively the first embossments and the second embossments are on the same panel as shown in various embodiments.

In an embodiment for a different strength feature, the first embossments extend from a first plane of the first panel into an upstream face of the first panel and into a downstream face of the first panel such that first embossments project from both the upstream face and the downstream face of the first panel, and wherein the second embossments extend from a second plane of the second panel into an upstream face of the second panel and into a downstream face of the second panel such that second embossments project from both the upstream face and the downstream face of the second panel.

Other aspects, objectives and advantages of the invention will become more apparent from the following detailed description when taken in conjunction with the accompanying drawings

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIG. 2 is an isometric view of an upper top stamping die in the form of an embossing plate according to an embodiment of the present invention that is usable in the press illustrated in FIG. 1;

FIGS. 3, 4 and 6 are bottom, front and side views of the embossing plate shown in FIG. 2:

FIG. 5 is an enlarged view of a region of FIG. 4 taken about a circle;

FIG. 7 is an isometric view of a lower bottom stamping die in the form of an embossing plate usable in the press shown in FIG. 1 in conjunction with the top plate shown in FIGS. 2-6;

FIGS. 8, 9, and 11 are top, front and side views of the bottom embossing plate shown in FIG. 7;

FIG. 10 is an enlarged view of FIG. 9 taken about the indicated circle;

FIG. 12 is an additional perspective illustrations of a bottom embossing plate the same or similar to that shown in FIG. 7 and used or usable in in the assembly and line of FIG. 1, but with additional score bars attached to upstream and downstream sides or ends of the embossing plate to provide a press plate assembly;

FIG. 12a is an enlarged view of FIG. 12 taken about the indicated circle;

FIG. 13 is a front view of the respective plate assembly shown in FIGS. 12 and 7 with both upper and lower embossing plates illustrated and with upper and lower score bars attached thereto, with the plates shown in the engaged position with the corresponding embossed features being received into each other and the score features being received into each other;

FIG. 14 is a cross-sectional view of FIG. 16 taken about line 14-14;

FIGS. 14, 15, 16 are partially schematic top view and cross-sectional side view and cross-sectional end view illustrations, respectively, of a pressed media sheet formed through the press assembly shown in FIG. 1;

FIG. 58 is an isometric view of yet a further embodiment of a pressed pleated filter media pack wherein adjacent sets of panels are shifted relative to each other such that two of the sides are non-planar with adjacent panels being rotated relative to each other about an axis that is perpendicular to the pleat panels;

FIG. 59 is an image of a pressed media pack panel where the panel is a parallelogram and the embossments in the form of grooves are shown to be skewed relative to the plane of the inlet and outlet faces;

FIG. 60 is an isometric illustration of two panels of a pressed pleated filter media pack where each panel has embossments and two sets of embossments and wherein embossments on each panel project in a different direction from the plane of the panel;

FIG. 61 is an isometric view of two panels of a pressed pleated filter media pack wherein each panel contains embossments and wherein the embossments extend substantially less than a span between upstream and downstream flow faces and/or creases/folds at opposed ends and also where the embossments or grooves may project from different directions from a plane of each panel;

FIG. 62 is an expanded isometric view of two panels of a pressed pleated filter media pack where one panel is pivoted and rotated away from the other panel for illustrative purposes to better show features, and wherein two different forms of tabs, one for pinching and securing pleat panels together and another that extends from the panel to support an outer perimeter ring seal (that may form a complete ring loop that may be rectangular or other annular shape) that can be used to seal a filter cartridge against a housing in which a filter element is installed when in use;

FIG. 63 is an enlarged illustration of a portion of FIG. 62 taking about circle 63;

FIG. 64 is an enlarged illustration sofa portion of FIG. 62 taking about circle 64;

FIGS. 75, 76; and 77, 78 are additional isometric and end views of a portion of a filter media sheet through sections of embossments to show further embodiments of embossments usable with any of the foregoing embodiments;

FIG. 79 is an end view of a portion of pressed pleated filter media pack showing two adjacent panels each with embossments in the form of longitudinal grooves wherein the embossments on adjacent panels are nested within each other in a region formed between adjacent panels;

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
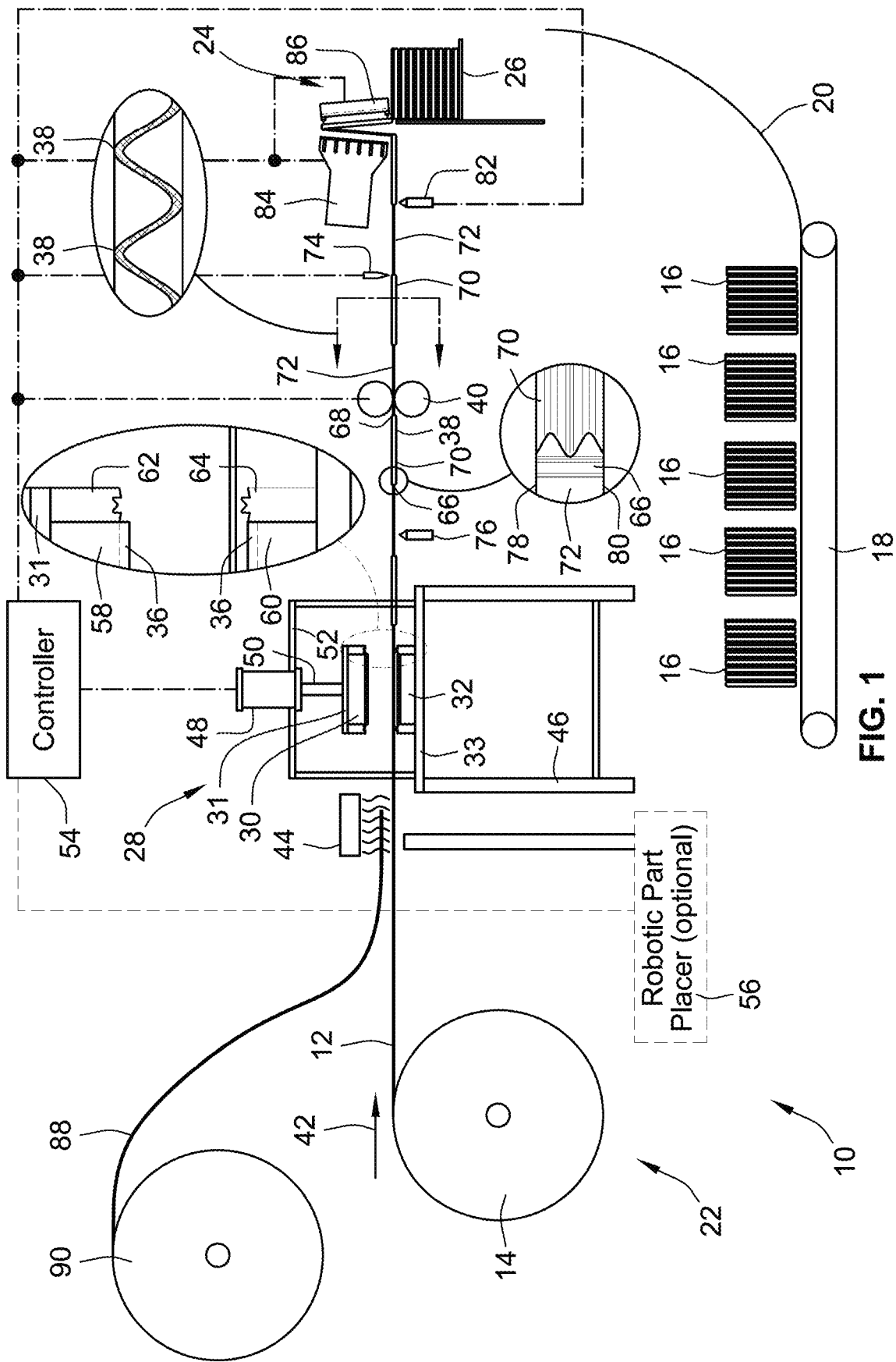
FIG. 1 is a partially schematic side elevation view of a pressed pleat machine assembly and line that is creating pressed, pleated and embossed filter media packs, with circles indicating an enlarged portion of the press and cross-sectional and top schematic views of the embossed and scored and creased filter media sheet.

Turning to FIG. 1, the first embodiment of the present invention has been illustrated as an apparatus in the form of a press and pleat machine assembly line 10, that processes a continuous filter media sheet 12 that is being unwound from a filter media roll 14. It is noted that "assembly line" in this context does not mean linear but instead means a manufacturing process in which processing steps are conducted in a series of different work stations typically in a sequence until a final product is produced. In this instance, the final products produced are a plurality of pleated filter media packs 16 that are delivered onto a conveyor 18 via a shoot 20.

The machine assembly line extends generally between an upstream region that includes a media unwind station 22 where the filter media roll 14 is placed to allow media to unwind and that is periodically replaced when the media roll is exhausted thereby temporarily shutting down the line, toward a downstream region where a pleater such as media pack collector 24 is located. The media pack collector 24 includes a trap door 26 to allow a produced filter media pack 16 to ride on the pack shoot 20 to the conveyer 18.

In accordance with certain inventive aspects according to certain claims, the machine assembly line 10 includes between upstream and downstream regions a press 28 that comprises a cooperating pair of stamping dies that include an upper stamping die 30 and a lower stamping die 32. The press 21 further includes a ram 34 that drives the stamping dies 30 and 32 repeatedly into and out of engagement with each other during operation. As can be seen in the enhanced circle image, the stamping dies comprise mating female and male embossment features 36 that are adapted to form embossments 38 into the filter media sheet 12 as also illustrated by enlarged circle views.

The machine assembly line 10 further includes a media conveying mechanism such as a conveyor such as cooperating rolls 40 that serve to advance the filter media sheet 12 in a direction from the unwind station 22 region toward the region or the pleat collector 24. These cooperating rolls 40 may be located at multiple locations along the machine assembly line but in this instance is shown located between the press 28 and the pleat collector 24.

It should be noted that the cooperating rolls 40 do not deform or form the filter media in an embodiment, but instead will serve to grip the filter media and move the filter media along a path 42 leading to the media pack collector 24.

The cooperating rolls 40 may also be chilled to effectively cool the embossed filter media sheet after it has passed through the press 28. In this regard, stamping dies may also be heated and are preferably heated to an elevated temperature as described herein such that during a dwell time of the stamping dies the filter media is heat-pressed to set and heat-press the embossments 38 into the filter media sheet 12.

Additionally, or in the alternative, an optional oven or heater 44 may be arranged upstream of the press 28 to preheat the filter media sheet 12 and therefore make it more pliable for processing through the press 28.

In an embodiment, the press may include a support table 46 upon which the lower stamping die 32 is removably mounted and fixed. The lower stamping die 32 may thus be non-movable during operation.

Further, the ram 34 may include a hydraulic or electrical linear actuator 48 that drives shaft 50 in successive and repeated linear reciprocating movement. Shaft 50 at its end supports and carries the upper stamping die 30 which is driven linearly back and forth in close proximity to the lower stamping die 32 with the filter media sheet 12 trapped and pressed therebetween.

The linear actuator 48 may be supported via a support cage 52 that may be self-supported or supported more preferably by the table 46 to maintain the alignment between the upper and lower stamping dies 30, 32 so that the respective male and female embossment features 36 in the stamping dies meet in cooperating and receiving fashion into each other.

The press and its linear actuator 48 and the cooperating advance rolls 40 may be manually activated in an intermittent fashion whereby during the pressing operating the litter media sheet 12 is not advancing along the predetermined path 42 but is maintained stationary and when the press and its stamping dies 30 and 32 are released with a large clearance gap therebetween, then the cooperating advance rolls 40 may be driven to advance the sheet to the next embossing location.

More preferably, this is automated and done with a suitable control such as an electronic controller that may be a software programmed computer and/or a programmable logic controller. Controller 54 is shown to be connected to the cooperating rolls 40 as well as the linear actuator 48 to automate this intermittent activity such that the press is driven into engagement heat pressing the filter media sheet 12 while the cooperating advance rolls 40 are not in driving engagement. Further, the controller 54 maintains the released and separated position of the upper and lower stamping dies 30, 32 while the cooperating rolls 40 are being driven. The controller 54 alternates between these two states. Further, the controller 54 will advance the filter media sheet a predetermined distance each time and may be programmed or selected to provide regular intervals that may be equal intervals or alternatively variable distance intervals for the various embodiments of filter media packs described herein.

The controller 54 may also coordinate and actuate an optional robotic part placer 56 that may be arranged along the line, preferably upstream of the press 28 to locate and place tabs as herein described in certain embodiments with or without adhesive onto the filter media sheet 12 that may then be run through the press 28 and also pressed into engagement for further securement. Such tabs are optional features used in some of the embodiments disclosed herein such as in those embodiments of FIGS. 62-64 for example.

The press and upper and lower stamping dies 30, 32 include upper and lower emboss plates 58, 62 and may also include both at upstream and downstream ends upper score bars 62 and lower score bars 64. The score bars and the upper and lower emboss plates may provide for plate assemblies. The upper and lower score bars 62, 64 are preferably provided to also simultaneously press scores and thereby crease the filter media sheet 12 both upstream and downstream from the embossments 38 in the filter media sheet to form upstream and downstream scores 66, 68 that afford the opportunity to provide creases that serve to facilitate folding of the filter media. Folding at the creases provides the pleated filter media pack 16 with embossed pleat panels 70 that have been pressed and unembossed pleat panels such as flat pleat panel 72 that may not have been pressed and preferably are not pressed. As can generally be seen, the process forms a continuous sheet of alternating embossed pleat panels 70 and flat pleat panels 72 that are joined to each other through upstream and downstream scores 66 and 68 as indicated.

When the desired length of filter media sheet 12 has been generated and passed through the machine assembly line 10 it may be manually cut or more preferably cut via an automatic pack cutting knife 74 that may be also in communication with the controller 54 to cut at appropriate times relative to the advancing cooperating rolls 40 that advance the filter media sheet along the predetermined path 42. Once the controller 54 has driven the cooperating rolls 40 a predetermined distance corresponding to the desired length of filter media sheet 12 usable for the pleat filter media pack 16, the pack cutting knife 74 may be actuated to cut through transversely and preferably perpendicularly to the travel path 42 to cut the sheet to length for each of the filter media packs 16. Preferably this is also done during intermittent stoppage but may also be operated on a continuous basis in which the knife could move at an angle other than perpendicular to the path 12 to move at the same speed in the direction of the path during cutting.

Figure 41:
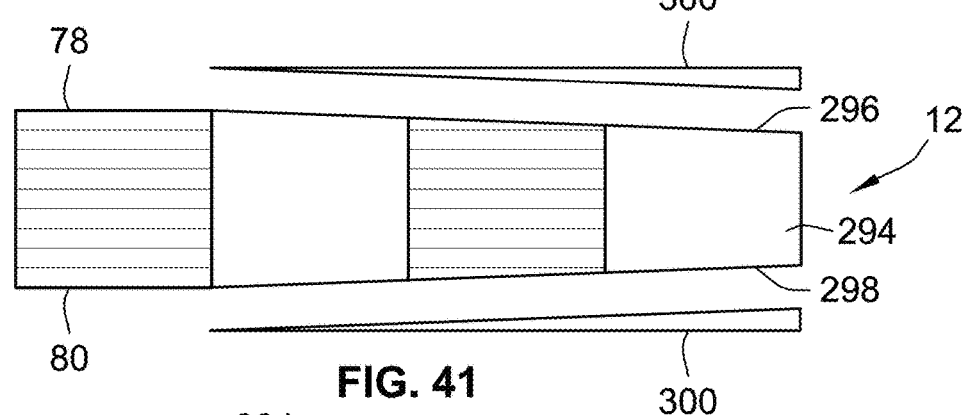
FIG. 41 is a partly schematic top view of a further embodiment of an embossed increased filter media sheet that has had its edges trimmed and cut away for creating a non-cuboid shape pleated filter media pack.

Another optional feature that may be used in issues to make certain filter media pack embodiments is a trim knife 76 that may be used to trim one or both of the side edges 78, 80 of the media as schematically indicated in FIG. 1. For example, this trim knife 76 may be used to trim edges such as shown in FIG. 41 or as otherwise used to trim edges to form the shapes shown in FIGS. 45-48 for example; as well as additional embodiments shown for example in FIGS. 56 and 57.

Trim knives 76 may be provided on opposing opposite sides or proximate the side edges 78, 80 on opposite sides of the filter media sheet 12 to perform these operations. The trim knife 76 may be operated while the mechanized media advance roll 40 is operating or alternatively may cut and perform a trimming operation in a mechanized fashion while the filter media sheet 12 is stopped and during pressing operation of the stamping dies 30, 32 when they are engaged. Greater precision and control of knife 76 can be realized during stoppage.

Figure 97:
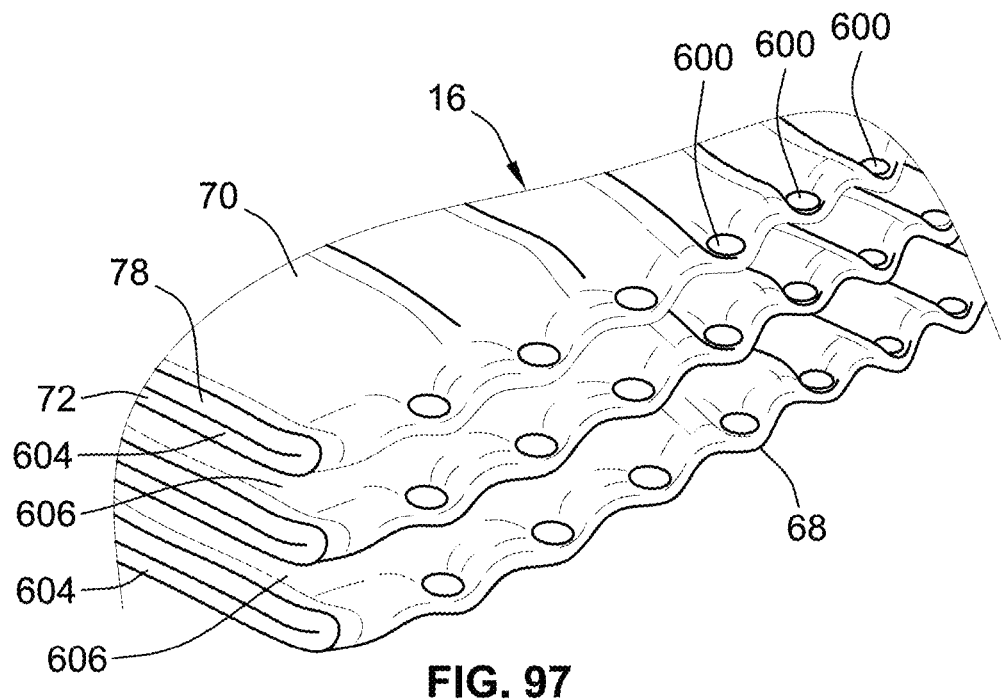
FIG. 97 is a perspective view of a portion of a pressed pleated filter media pack made aby the assembly and line of FIG. 1 and having pocket pleats and also ultrasonically point bonded pleat tips in accordance with further embodiments of the present invention.

Additionally, another further optional and desired feature is the ability to have adhesive applicators 82 that may also be in electrical communication with the electronic controller 54 to dispense adhesive such as hot melt, urethane, glue or other such suitable adhesive upon the filter media sheet 12 at desired locations. The adhesive applicator 82 may thus dispense adhesive only while the rolls 40 are advancing the filter media sheet 12 but advantageously can also be operated during the intermittent stopping to apply adhesive while the filter media sheet is stopped such as applying across the filter media sheet if additional stitch feeds are desired. The adhesive 82 may also be applied at different locations and there may be more than one adhesive applicator 82 such as on opposed side edges 78, 82 that may apply adhesive on opposed side edges 78, 80 of the filter media sheet 12 in order to seam the side edges and form pocket pleats. For example, the adhesive applied by the adhesive applicator 82 upon the edges of filter media sheet 12 may seam together and form a sealed seam on opposed side edges to in effect form a pocket pleat such as can be seen for example in the embodiment of FIG. 97. In FIG. 97 adjacent edges of an embossed panel and a flat panel are shown to be seamed together which may be ultrasonically bonded or alternatively through adhesive.

Figure 98:
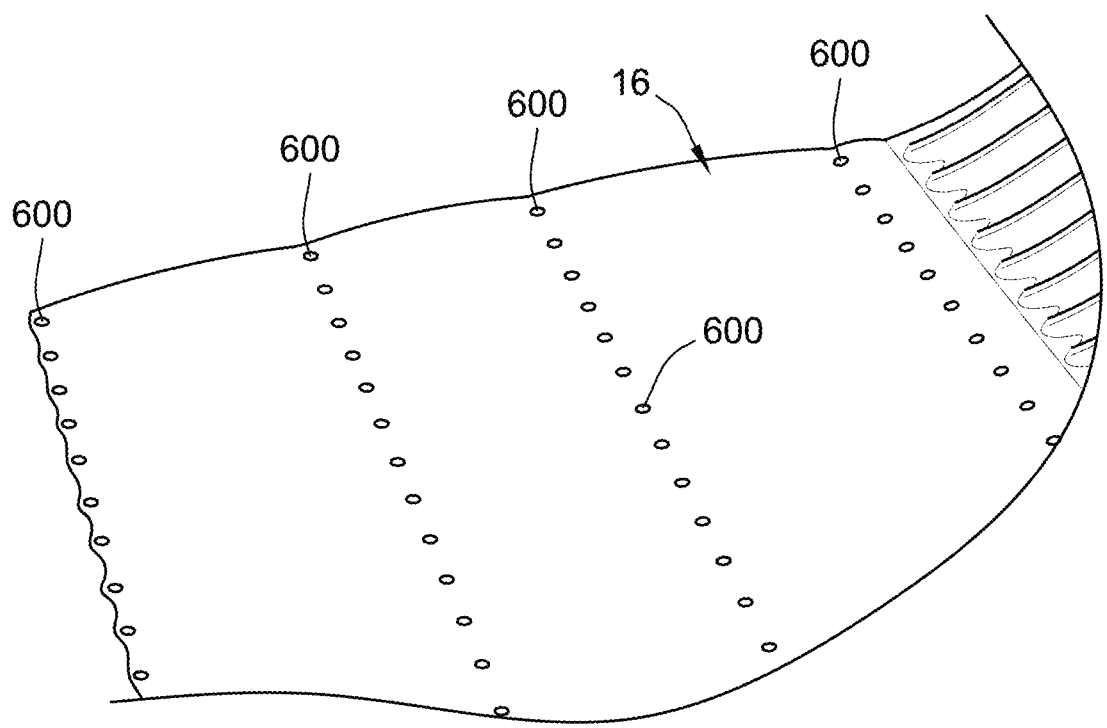
FIG. 98 is a perspective illustration of the filter media pack of FIG. 97 being made showing the pleat pack and the next hinged embossed panel for illustrative purposes.

Additionally, or in the alternative, the adhesive applicator 84 may also apply adhesive at select locations such as shown in FIG. 98 where various dots are illustrated. These dots may be adhesive applications for point bonding or which may alternatively represent ultrasonic bonding locations. This may provide for additional structural integrity to the pleated filter media pack 12 to prevent panels from shilling relative to each other during use.

Downstream of the press and optional bonding, various forms of pleaters may be used including pleat collectors that simply fold the filter media pack.

One form of pleat collector as illustrated is in the form of an ultrasonic plunge welder 84 that works in conjunction with an ultrasonic anvil 86 that are configured with ultrasonic horn features that mate and contact with each other to ultrasonically bond and weld adjacent portions of the filter media sheet together. The plunge welder 84 and the anvil 86 may be driven towards and away from each other with adjacent pleat panels 70, 72 therebetween. The plunge welder 84 and anvil may also be used to form bonds at seams and/or form point bonds through ultrasonic welding and/or thereby form the features such as pocket pleats as shown in FIGS. 97 and 98. Each of the plunge welder 84 and the anvil 86 are movable toward and away from each other and may be moved away from each other to allow the plunge welder 84 to allow advancement of pleat panels of the filter media sheet and to weld features upon the immediate pleat panels of the sheet of the in-process filter media pack 16 that is positioned in media pack collector 24.

The movement of the plunge welder and the anvil may also be coordinated relative to the action of the cooperating rolls 40 and may be active during intermittent stoppage and can also be operated during advancement of the filter media sheet along the path 42. The plunge welder 84 may include suction and a vacuum on its face in order to pick up and temporarily secure the pleat panel to itself and facilitates folding of the filter media sheet along the upstream and downstream scores 66, 68 that are created by the corresponding score features of the upper and lower score bars 62, 64.

Yet another optional feature that may be employed is the ability to use a laminate sheet 88 such as an additional filter media sheet, a scrim, a support, a screen such as expanded metal for support or other such laminate feature which may be desired to be employed. In some embodiments it may be desired to have two layers of filter media sheet to provide for a first level of filtration to capture larger particles and thereby a less efficient upstream surface to the filter media sheet and a more efficient downstream layer to the filter media. Accordingly, a laminate sheet 88 may be dispensed from laminate roll 90 to overlay either above or below filter media sheet 12 and also run through the similar components including the press 28 of the machine assembly line 10. Accordingly, with this configuration the laminate sheet 88 would also be pressed with the same embossment features and embossment 38 as in the filter media sheet 12.

Turning now to FIGS. 14, 15, and 16, the details of the pressed filter media sheet 12 formed by the machine assembly line 10 illustrated in FIG. 1 and its component as illustrated in FIGS. 2-13 can be seen with additional detail. In FIG. 15 it should be noted that only a partial section of the filter media sheet is shown and break lines on the top and bottom are illustrated to show that additional embossments are placed side by side. From the foregoing description it will be readily understood how the filter media sheet 12 with the embossments 38 are formed and now detail will be provided to those formed features.

The embossments 38 take the form of projecting ridges 182, when viewed from one side such as top side in the case shown in FIG. 15, and that form corresponding grooves 186 also defined along the underside of the embossments 38 as well as grooves 186 that are formed between the projecting ridges 182. Additionally, on the bottom side, corresponding ridges 182 are formed with grooves 186 on the opposite side.

Typically, the embossments 38 extend a full length of the embossed pleat panel 70 and between adjacent but spaced flat plate panels 72 as shown in FIGS. 15 and 16, which typically is at least 90% of the length span of the embossed pleat panels 70 between upstream and downstream scores 66, 68 that provide for pivoting hinges at upstream and downstream locations indicated at 188, 190. In this manner, the upstream hinge 188 allows the upstream flat pleat panels 72 illustrated in FIG. 16 to swing and overlay the bottom side of the embossed pleat panel 70 shown in FIG. 16; whereas the downstream hinge 190 is oriented to allow the downstream flat pleat panel 72 to overlay the top side 184 with the orientation shown in FIG. 16. It is understood that the top side 184 and bottom side 185 are reversible in that the top side may be the bottom side and the bottom side may be the top side.

In the elevation indicated in FIG. 16, preferably the upstream hinge 188 is located at a different elevation relative to the pivoting hinge when the filter media sheet is viewed inside elevation. Specifically, with the filter media sheet or embossed panel lying flat, the upstream hinge is shown to be positioned below the downstream hinge 190. This allows a vertical gap to allow for folding and pleating of the filter media sheet 12 to accommodate the height of the embossments 38. Preferably, the upstream and downstream hinges 188, 190 are spaced and separated from each other a vertical distance with the orientation shown in FIG. 16 preferably at least 50% of height of the embossments and more preferably at least 75% of the embossments.

Further, the ends of the embossed regions as shown in FIGS. 15 and 16 may additionally include tapered ends at the opposite ends of the embossments that lead into and merge into the hinges 188, 190. Additionally, the hinges are also provided with smaller size grooves 194 extending perpendicular to the embossments that provide for additional flexibility in the hinge structure. These grooves 194 may be formed by the additional triangular groove and triangular ridge projections 174, 176 as shown with reference to FIGS. 12 and 13, while the main score lines 66, 68 can be formed by the triangular ridge and triangular groove 170, 172 also shown in FIGS. 12 and 13.

Figure 17:
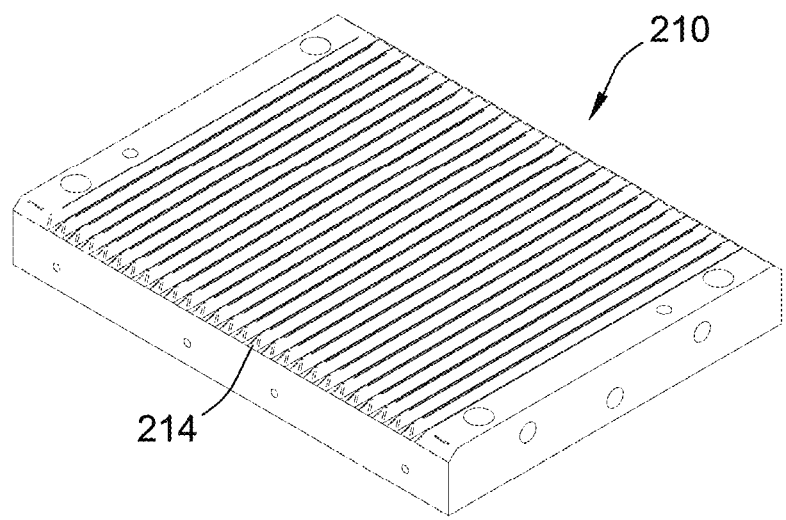
FIG. 17 is an isometric view of a bottom embossing plate similar to FIG. 7 and also usable in the press assembly and line of FIG. 1 but that has tapered regions at ends of the embossed groove pattern.
Figure 18:
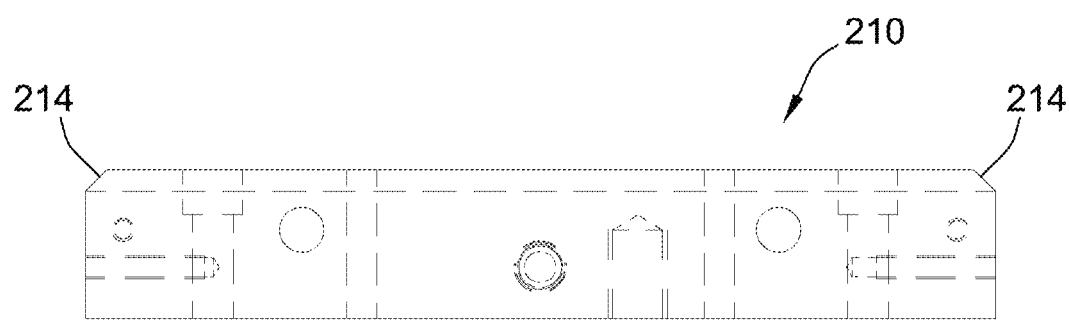
FIG. 18 is an end view of the embossing plate shown in FIG. 17.
Figure 19:
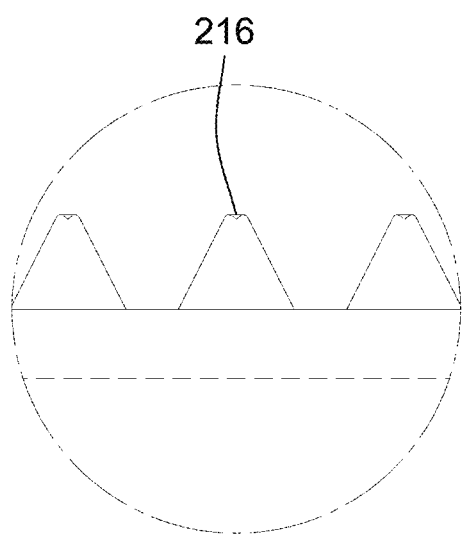
FIG. 19 is an enlarged view of a portion of FIG. 17 from a front side.

To help facilitate the formation of the tapered ends 192, the embossing features 36 shown on the stamping dies may also have corresponding tapered end sections as shown for example in the embodiment of the emboss plates of FIGS. 17-19.

To recap and provide additional further details on the operation of the assembly line and the method of forming a pleated filter media pack with a filter media sheet, it can be seen with reference to FIGS. 1-16 that the method comprises pressing embossments 38 into the filter media sheet 12 repeatedly with the stamping dies 30, 31. Thereafter, the filter media sheet 12 is pleated utilizing the upstream and downstream scores 66, 68 that form corresponding hinges 188, 190 that facilitate folding and thereby pleating of the filter media sheet into the pleated filter media pack 16.

Figure 43:
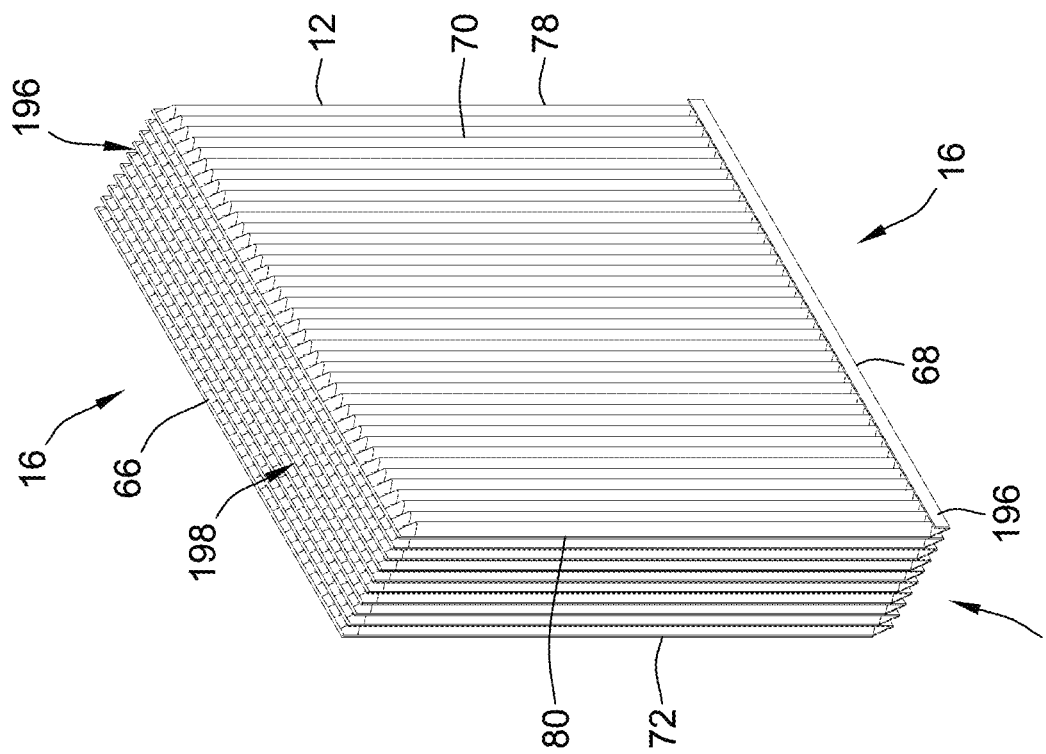
FIG. 43 is an isometric view of at least part of a pressed pleated filter media pack that can be made in a standard cuboid form made by the press assembly in line of FIG. 1 according to an embodiment of the present invention.

An additional view of such a filter media pack for example is shown in FIG. 43 where it can be seen that this methodology increasing the filter media sheet at spaced intervals forms the filter media pack 16 to include a plurality of pleat tips 196 at both flow faces 198, 200 in which one flow face is the upstream flow face and one face is the downstream flow face. By creasing the filter media sheet at spaced intervals to form the pleat tips, the embossments 38 can be seen as extending and disposed at least partially between the pleat tips 196 as shown in FIG. 43.

When done in this fashion, where the intervals are uniformly spaced and with the pleat (e.g. pleat panels) extending between the pleat tips at the respective inlet and outlet faces, the distance between the pleat tips at the inlet face and the pleat tips at the outlet face may remain constant and thereby form a cuboid shape for the filter media pack 16 shown in FIG. 43.

Figure 44:
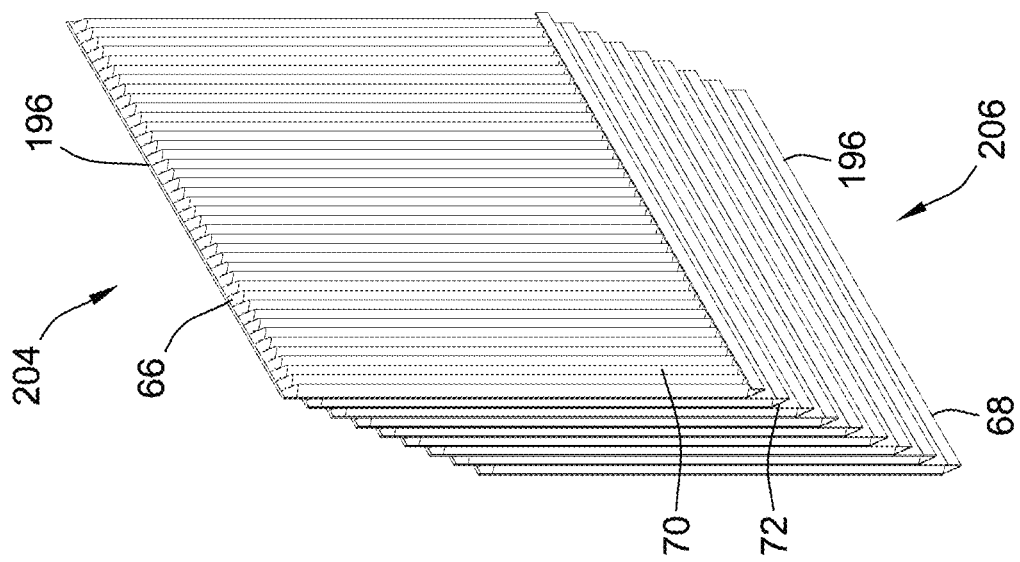
FIG. 44 is an isometric view of an alternative embodiment of a pressed pleated filter media pack according to another embodiment of the present invention made by the press assembly in line of FIG. 1 wherein the embossed panel and non-embossed panel have differing lengths to provide a non-cuboid shape.

However, with the pressing methodology it can also be accomplished to form the intervals at non-uniform spacing wherein the pleats extend between pleat tips at the inlet face and pleat tips at the outlet face with a distance bearing and creating pleated filter media packs that are irregularly shaped with a region of the inlet face and the outlet face extending obliquely relative to the extent of the pleat panels 70, 72 such as shown in the similar but alternative embodiment of FIG. 44 showing a pleat pack 202 where the flat pleat panels 72 are longer than the embossed pleat panels 70. Accordingly, the flow faces 204 and 206, while they may extend parallel to each other, extend obliquely and not perpendicular (as in the case of FIG. 43) relative to the embossed pleat panel 70 and flat pleat panel 72.

In both embodiments of FIGS. 43 and 44, it can be seen that, relative to the advancement of the filter media sheet 12 along the travel path 42 shown in FIG. 1, the extent of the creasing formed by scores and thereby the corresponding pleat tips 196 extend in a direction that is transverse and typically perpendicular to the travel path. Also, advantageously, is that not every panel needs to be processed which provides additional speed to the overall process in that the pressing of the embossments 38 will be done only into the embossed pleat panels 70 and the pressing may be skipped on the flat pleat panels in an embodiment which also causes the first and second embossed and flat panels to mismatch. This procedure is repeatedly or successively conducted to form the overall pleat packs 16 and 202 shown in FIGS. 43 and 44 for example.

In a preferred operation of the machine assembly line 10 of FIG. 1, the filter media sheet 12 is intermittently and successively advanced and stopped along the travel path 42. While the filter media sheet 12 is stopped, the pressing is conducted via the press 28 such that the filter media sheet 12 cannot advance if the press is stationary, and while the filter media sheet is advancing, the filter media sheet passes freely through the stamping dies 30 and 32 which are separated by a large gap for clearance and not in engagement such as shown in the current condition in FIG. 1. When the stamping dies come together in the pressed and engaged position though, as shown for example in FIG. 13, that is when the filter media sheet cannot pass, travel or advance relative to the press.

An advantage of this intermittent advancing and stopping operation is that further operations can be conducted either upstream or downstream of the pressing dies. While the filter media sheet is stopped, other processing steps and their control are easier and more precise as such operations do not need to be moved at the same speed as the filter media sheet but may be kept in a stationary position without needing coordination with the speed of the filter media sheet. For example, during stoppage bonding of adjacent pleats formed by pleating can be conducted such as by the plunge welder $4 and anvil 86.

Additionally, or alternatively, during such stoppage of the filter media sheet, the edges of adjacent pleats may be trimmed to include one or both of side edges 78 and 80.

Additionally, the pleat tips for at least one of the inlet and outlet faces may be cinched and/or pressed together such as like by ultrasonic bonding that may also be performed by the plunge welder and anvil 84, 86 with such features being shown for example in the pleated filter media pack shown in FIG. 97. Additionally, during stoppage the robotic part placer 56 may attach components to adjacent panel to provide for structural support or facilitate better integral attachment of an integral housing seal as shown with respect to various embodiments.

Preferably, and for the most simplistic type of operation, the upper and lower stamping dies 30, 32 including their respective plates are movable toward and away from each other with linearly reciprocating movement of the plates with the respective female and male embossment features received into each other with the filter media sheet therebetween. With this configuration, the respective plates 58, 60 extend in parallel planes.

An advantage to using the linearly extending grooves and the linearly extending ribs to provide for the male and female embossment features as shown in the emboss plates of FIGS. 2-10 is that the corresponding embossments 38 formed into the filter media sheet can maintain a consistent depth and height for at least 90% of the length of the central portions of the embossments that extend between the corresponding pleat tips that are formed during pressing and pleating. This provides a maximum ridge strength and structural integrity such that the pack when formed such as shown in FIG. 43 or 44 maintains considerable strength when subjected to an air flow in application. Specifically, the spacing between the adjacent pleat panels is maintained during air flow, and the pleats do not collapse or blind off on each other due to the embossments which provide for structural support and integrity of the pleats. This maintains open and good air flow between adjacent pleat panels due to little contact or minimal contact between adjacent pleat panels to maximize the usage of the filter media contained within the filter media sheet.

The embossments also provide in effect a corrugation pattern that prevents the filter media sheet from bending in at least one dimension providing for additional strength and support for the pleated filter media pack. Thus, by extending the embossments over the full length such as at least 90% of the length, good structural integrity of the pleated pack is realized. This is particularly advantageous for deep pleat filter media packs that have a pleat depth (e.g. span between inlet and outlet faces) of greater than 6 cm and pleat packs that may be greater than 10 cm or even 20 cm or more. Pleat packs may be formed that have a pleat depth between 1 cm and 180 cm, but again this is particularly advantageous for the deep pleat media packs aforementioned.

Also, during a preferred operation, the filter media sheet 12 is engaged and actively pressed with force between the upper and lower stamping dies 30, 32 wherein the stamping dies can be separated in the engaged and pressing position by a gap equivalent to but more preferably slightly less than a caliper thickness of the filter media sheet that may be a gap of between 80- and 99% of the caliper thickness of the filter media sheet. This gap can be controlled with stop abutments on the plates of by way of the amount of pressure applied to the presses in which the media content of the filter media sheet limits the pressing.

During pressing, a significant dwell time may occur that is between 0.2- and 300 seconds and preferably between 1- and 15 seconds to ensure adequate formation of the embossments and maintain the shape. This in effect presses and holds the media to press the features akin to an ironing operation.

Also, preferably, the tapered end portion in the form of tapered ends 192 are formed into opposed ends of the central portions of the embossments 38 such as shown in FIG. 19, but also shown in the completed filter media packs of FIGS. 43 and 44 with the tapered end portions extending toward the respective pleat tips 196. This provides for a larger air flow entrances and air flow exits at the respective inlet and outlet (low faces 204 and 206.

To facilitate formation of the most advantageous grooves to provide for maximum filtration capacity, the corresponding grooves and ribs of the embossment features on the die 36 and the corresponding embossments 38 formed into the sheet press embossments have a length greater than 5 cm with a width of at least 2 mm and a depth of at least 2 mm.

These measurements are shown in FIGS. 16 and 14 as length L, width W, and depth D. It is noted that width is measured in these embodiments between the center of adjacent tips of the ridges and the depth is measured from the tip of a ridge to a groove bottom.

Preferably, the embossments (and corresponding ridges and/or grooves) have a depth of between 2 mm and 8 mm, and a width of between 2- and 16 mm. The length will depend upon the overall span or length of the filter media pack between upstream and downstream pleat tips, but typically comprises at least 90% of the length as described herein, although other alternatives are possible.

Additionally, to sufficiently set the pleats and maintain the embossed shape, heating of the filter media sheet for the pressing to a temperature below the glass transition point of the fibers of the media is conducted such that the fibers are not melted or bonded together due to the heating of the filter media sheet. For example, the heating comprises elevating the temperature of the filter media sheet to between 65- and 125° C. for medias that comprise at least 50% cellulose fibers by weight; between 65- and 205° C. for medias that comprise at least 50% fibers by weight including at least one of polypropylene, polyester or nylon fibers. These are typically the most commonly envisioned fibers employed in a filter media sheet, but additional types of fibers and materials may be used including glass fibers and a variety of other polymeric materials that are known to one of ordinary skill in the art and/or that are used in conventional filter media sheets. While the press is preferably heated and heats the filter media sheet and may be the sole source of heat, additional heating may be conducted such as preheating the filter media sheet prior to entering the stamping dies. Again, active cooling of the filter media sheet such as by the advance rolls or by running through a cooling station may be conducted after being pressed by the heated stamping dies.

Another advantage of using the press may be realized in certain embodiments, especially with the configuration of the width and depth of the embossments in that the filter media sheet can be stretched at the embossments to provide for an increased airflow permeability in the pressed region of the filter media sheet. These pressed regions and embossments may have the fibers pulled apart and not compressed according to certain embodiments. Specifically, it has been found that a filter media sheet can be stretched with the fibers slightly separated due to the pressing operation when compared to the unpressed filter media sheet or the unpressed flat panels that are formed between embossed panels.

For example, due to the stretching the pressed air flow permeability is at least 110% greater than the impressed air flow permeability measured by a TAPPI T251 air flow permeability test. Preferably the pressed air flow permeability may be between 125- and 500% greater than the unpressed air flow permeability.

As a consequence, and when used in the embodiment where there are pressed regions and unpressed regions such as the embossed pleat panels 70 and the flat pleat panels 72, different filtering characteristic regions may be formed in the pleated filter media pack. The pressed region may comprise between 20- and 80% of the pleated filter media pack whereas the unpressed region may comprise the remainder of between 20- and 80%. This provides the opportunity to loosen up a more restrictive media and provide for a region that is slightly less efficient but more air permeable in the embossed pleat panels and a region in the flat pleat panels that are more restrictive to air flow but have a higher efficiency.

In terms of materials, the filter media sheet preferably comprises at least 10% polymer fibers by weight and more preferably at least 20% polymer fibers by weight and most preferably at least 50% polymer fibers by weight although other possibilities are possible.

The polymer fibers may comprise at least one of a fluorinated polymer, PVDF, polypropylene, polyester and nylon which are common materials used in filtration medias but again other materials are possible. The filter media sheet may also alternatively comprise at least one of the following media fibers: wet-laid microglass, nylon, polypropylene, polyester, wet-laid cellulose and wet-laid polymer. These fiber materials may be used alone or in conjunction with each other.

The filter media fibers include fibers having a diameter size of less than 10µ and preferably less than 50µ and most preferably less than 20µ in more efficient medias. These fiber materials may be used alone or in conjunction with each other.

For most typical filtration applications, the filter media sheet 12 prior to pressing has an air flow permeability of between 2 and 400 CFM for most filtration applications (including liquid filtration at the lower range end), and more preferably between 10 and 150 CFM for most air filtration applications (measured by ASTM D737-04(2012) standard, commonly tested with TEXTEST Model FX3300 instilment); and an initial gravimetric efficiency of between 50% and 100% for ISO 12103-1, A2 Fine Test Dust made by Powder Technologies having a location in Arden Hills, Minnesota (measured by ISO 5011 standard), and a caliper thickness of between .2 and 7 millimeters, and more preferably between .2 and 1 millimeters.

Turning now to FIGS. 2-5 and FIGS. 7-10, the cooperating and mating upper and lower emboss plates 58 and 60, as employed in the press 28 shown in FIG. 1, are shown in larger and greater detail. In FIGS. 2-5, the upper or top stamping die in the form of embossing plate 58 is illustrated to include a planar body in the form of a flat plate 100 into which a plurality of embossment features 36 are formed to include a plurality of teeth and ridges 102 and grooves 104 that extend longitudinally between an upstream end 106 and a downstream end 108. The grooves 104 extend generally parallel and in spaced relation and are formed between the ridges 102 in this embodiment. The teeth and ridges 102 and the grooves 104 are sized and configured to be closely received within corresponding grooves and ridges formed on the bottom emboss plate 60 shown in FIGS. 7-10 (see description below).

The upstream and downstream ends 106, 108 preferably have a plurality of bolt holes 110 that allow for attachment of score bars as can be seen for example in FIGS. 12 and 13. Additionally, bolt holes 112 are provided for receiving bolts that provide for attachment to the carriage 31 of the upper stamping die (See FIG. 1.)

Longitudinal and extending holes extend between front and back sides 114, 116 and are indicated as heating channels 118 that can either receive a heating element or alternatively be hooked up to a fluid circuit to circulate hot fluid to facilitate heating of the emboss plate 58 to the desired temperature to facilitate heat pressing of the filter media sheet.

Further, pilot structures 120 may be provided that interact and align with corresponding pilot structure on the upper stamping die carriage 31 to facilitate better alignment and precise alignment of the upper emboss plate 58 relative to the lower emboss plate 60 of the lower stamping die 32 shown in FIG. 1.

Turning then to FIGS. 7-10, the lower emboss plate 60 is illustrated in greater detail which is quite similar to that of the upper emboss plate shown in FIGS. 2-5 and is configured to matingly receive with the upper emboss plate with the teeth and ridges of the upper emboss plate being received within the grooves of the lower emboss plate and the teeth and ridges of the lower emboss plate being received within the grooves of the upper emboss plate. It is also understood that the lower emboss plate rather than being mounted to the upper stamping die carriage would be instead nested and received within a fixture 33 of the lower stamping die 32 shown in FIG. 1, which may simply be the table top or other structure mounted on table 46 shown in FIG. 1.

In FIGS. 7-10, the lower or bottom stamping die in the form of embossing plate 60 is illustrated to include a planar body in the form of a flat plate 130 into which a plurality of embossment features 36 are formed to include a plurality of teeth and ridges 132 and grooves 134 that extend longitudinally between an upstream end 136 and a downstream end 138. The grooves 134 extend generally parallel and in spaced relation and are formed between the ridges 132 in this embodiment. The teeth and ridges 132 and the grooves 134 are sized and configured to be closely received within corresponding grooves and ridges formed on the top emboss plate 58 shown in FIGS. 2-5 (see description above).

The upstream and downstream ends 136, 138 preferably have a plurality of bolt holes 140 that allow for attachment of score bars as can be seen for example in FIGS. 12 and 13. Additionally, bolt holes 142 are provided for receiving bolts that provide for attachment to the table in FIG. 1

Longitudinal and extending holes extend between front and back sides 144, 146 and are indicated as heating channels 148 that can either receive a heating element or alternatively be hooked up to a fluid circuit to circulate hot fluid to facilitate heating of the emboss plate 60 to the desired temperature to facilitate heat pressing of the filter media sheet.

Further, pilot structures 150 may be provided that interact and align with corresponding pilot structure on the table and fixture to facilitate better alignment and precise alignment of the upper emboss plate 58 relative to the lower emboss plate 60 as shown in FIG. 1.

Turning to FIGS. 12-13 it can be seen that upper and lower score bars 62, 64 are removably and adjustably mounted to both the upper and lower emboss plates 58, 60 by way of bolts 152 that are shown in FIG. 13. The score bars include oblong adjustment slots 154 that allow the score bars to be moved vertically upward and downward to allow positioning of the score lines when conducted on the filter media to be at a higher or lower end relative to the embossments that are formed, which is advantageous in pleating operations of the embossed pleats formed herein. Further, it can be seen that when engaged as shown in FIG. 12a there exists a gap 156 between the upper and lower score bars 62, 64 to accommodate the filter media sheet.

In this regard, it should also be appreciated that the respective teeth and ridges 102, 132 and corresponding grooves 104, 134 of the upper and lower emboss plates 58, 60 when engaged do not contact each other, but instead there is a similar gap to gap 156 that can in some embodiments be formed due to the fact that the upper and lower emboss plates 50 and 60 have corresponding abutment surfaces 122, 124 both on front and back ends that run traverse and preferably perpendicular to the score bars that will contact each other before bottoming out occurs to ensure a gap that is of the desired width to accommodate the filter media sheet. Additionally, shims may be placed on either or both of the abutment surfaces 122, 124 and form the abutments to adjust the gap accordingly, to accommodate different filter media caliper thicknesses.

With continuing reference to FIGS. 12 and 13, it can be seen that the upper and lower score bars 62, 64 are each made of similar and individual and cooperating score bar members 158, 160, either which may be an upper or lower score bar. Score bar member 158 includes a groove 162 that receives a projection 164 extending from the other score bar member 160.

Further, a preferred configuration formed on the outside surface of the corresponding groove and projection includes tapering walls including tapering walls 166 formed on the grooved score bar member and tapering walls 168 formed on the ridged score bar member 160 that match and align with the tapering walls 166 such that a consistent gap 156 is maintained therebetween.

Additionally, within the groove and projection features, additional grooves and projections are provided. For example, the grooved score bar 158 also includes a central projection in the form of a triangular ridge 170 that is configured to form a corresponding score line to form a corresponding hinge in the filter media sheet for forming pleats. The triangular ridge is received within a corresponding triangular groove 172 that is formed within the projection 164 of the ridged score bar member 160. Additionally, on either side of the triangular ridge, a pair of triangular grooves 174 are provided that receive the corresponding pair of triangular ridge projections 176 from the other score bar member. These create additional flexibility if desired in the overall hinge structure of the filter media sheet when used to form a pleated filter media pack.

As can be seen, the grooved score bar members 158 are provided as attached to the lower emboss plate 60 of the downstream end with the ridged score bar member 160 attached to the upper emboss plate 58; while on the upstream end 106, 136 the grooved score bar members 158 are provided as attached to the upper emboss plate 58 with the ridged score bar members 160 connected to the lower emboss plate 60. By virtue of this configuration, the hinges are inverted one another when formed into the filter media sheet as will be seen with reference to FIG. 16.

While the abutment surfaces 122 and 124 may stop and thereby provide a limit to a maximum amount of compression, the stop and abutment surfaces 122 and 124 may not come into contact with one another, but may actually be separated by a gap even when in the pressed and engaged position with the filter media sheet being pressed by the embossment features 36 of the respective upper and lower stamping dies 30, 32. In particular, rather than controlling the gap or thickness by contact with the abutment surfaces 122, 124, the ram 34 and its linear actuator 48 may have a predetermined or preset pressure to provide a predetermined pressure in pounds per square inch to the filter media sheet.

The filter media sheet typically does not extend over the abutment surfaces 122, 124 in a preferred embodiment, although other alternatives are possible, including having trimming knives that engage on the abutment surfaces. By using a controlled pressure, a desired amount of stretch may be imparted to facilitate stretching of fibers and increased air flow permeability to provide a filter element that may have an increased life span due to the increased air flow permeability. The reason is that filter expiration for lifespan is often determined by the restriction or pressure drop at predetermined air flow parameters. By opening the media through stretching and providing for increased air flow permeability, that will delay the point in which a filter reaches the restriction or pressure drop thereby extending the overall life of the filter and its lifespan.

Further, to form the filter media sheet having the width, depth and length dimensions shown in FIGS. 14, 15 and 16 it will also be appreciated with reference to FIGS. 5, 6, 10, and 11 that the same width and length and depth dimensions will also apply to the teeth and corresponding grooves on the upper and lower emboss plates 58 and 60. This makes sense because the shape of the embossed features 36 in the stamping dies generally match the embossments 38 formed in the filter media sheet. However it is noted that in the filter media sheet, and due to flexibility and some memory of the filter media that the edges and features of the filter media including the corresponding ridges and valleys such as grooves, may not have sharp corners but may be more rounded in profile. Referring back to FIGS. 10 and 11, it can generally be seen that the shape of the grooves include the maximum width (designated as width W measured between peak tips of ridges), but also have a groove bottom which defines a minimum width Wmin that in an embodiment may be 20- to 50% of the normal width W. Additionally, each of the teeth or ridges 102 has a tip having a width Wt that is smaller than the width Wmin to allow room for the filter media to pass along either side of the teeth without being cut or rendered non-functional. Typically, the tooth width Wt is less than 75% of Wmin and typically 50% or less in various embodiments herein, but the ultimate shape or thickness will depend in part upon the desired caliper thickness of the filter media sheet being run. As shown in the first embodiments shown in FIGS. 2-13, the bottoms of the grooves 104, 134 may be flat and the tips of the teeth and ridges 102, 132 may also likewise be flat.

Turning next to the emboss plates shown in FIGS. 17-22 according to yet another embodiment of the present invention, it will be understood that these emboss plates 210, 212 are structurally the same as those shown in the corresponding embodiments of FIGS. 2-13 and also usable in the press 28 of FIG. 1 such that the afore-described features of the prior embodiments are applicable to this embodiment as well. However, additional features and distinctions will be discussed below.

Figure 20:
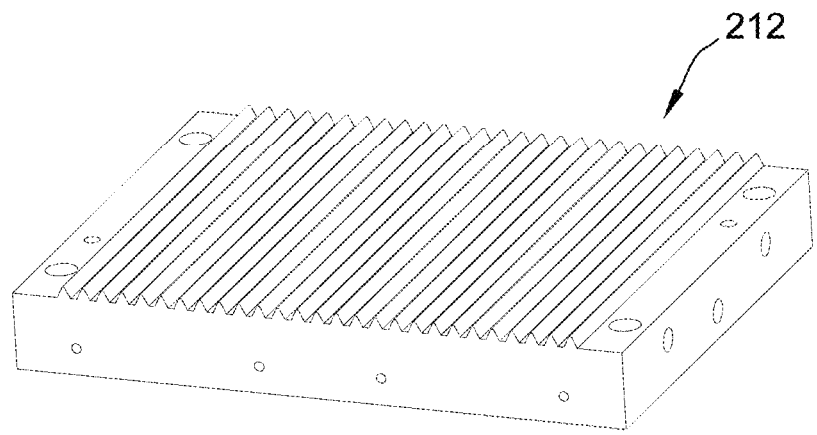
FIG. 20 is an isometric view of stamping die in the form of a top embossing plate shown in isometric usable with the lower stamping die shown in FIG. 17.
Figure 21:
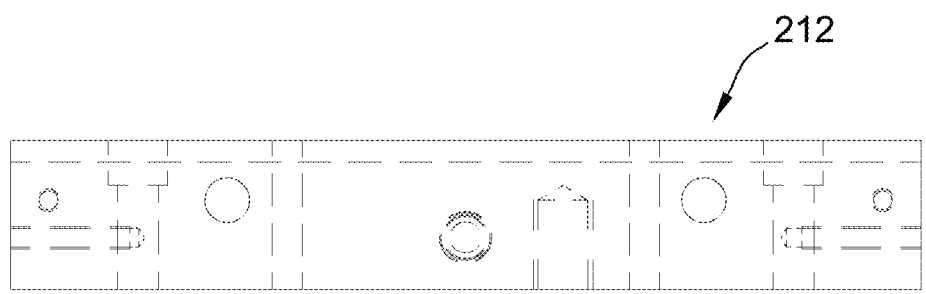
FIG. 21 is an end view of e upper embossing plate shown FIG. 20.
Figure 22:
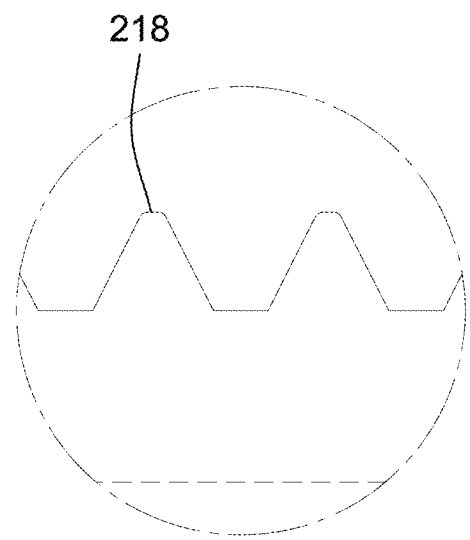
FIG. 22 is an enlarged view or a region of the frontal portion of FIG. 20.
Figure 23:
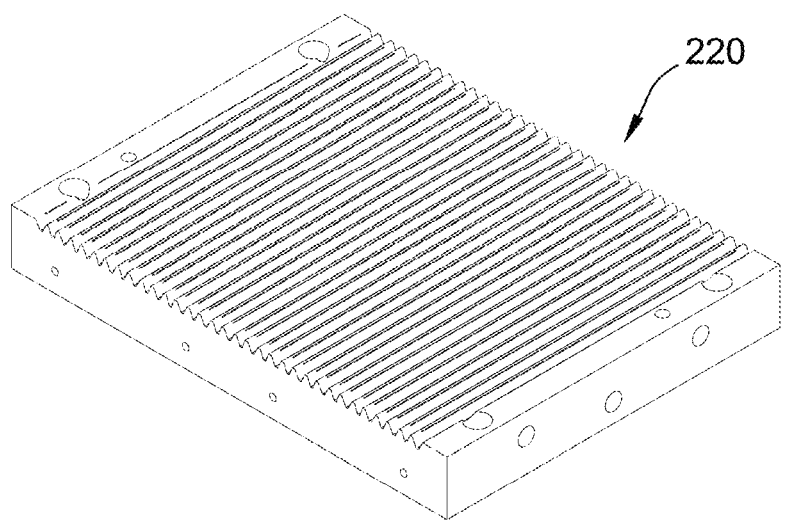
FIG. 23 is another isometric view of a further embodiment of a bottom grooving plate usable in the press of FIG. 1 but having wide and narrow V-shape to the embossed groove pattern.
Figure 24:
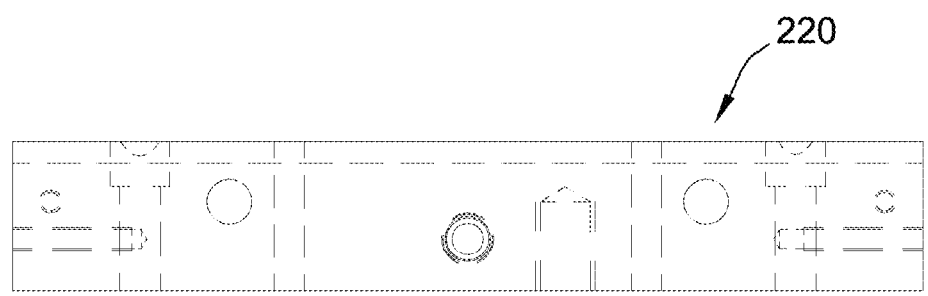
FIG. 24 is an end view of the embossing plate shown in FIG. 23.

As can be seen in FIGS. 17 and 18, emboss plate 220 is formed with an additional feature in the form of tapered ends 214 that are formed integral with the embossing feature and at corresponding upstream and downstream ends of the emboss plates. Further, the teeth tips may also include a non-flat feature such as a linearly extending indentation 216 that may have some advantages with certain medias. Turning to FIG. 20, the emboss plate 212 matches and mates with the emboss plate 210 as shown in FIG. 17. This emboss plate 212 is similar to those of previous embodiments, but it is noted that the pleat tips while flat do not have sharp corners but are rounded at rounded tips as shown in FIG. 22.

Turning next to FIGS. 23-28, further embodiments of cooperating and mating emboss plates 220, 222 are illustrated that also include a V-shaped or tapering groove profile according to a further embodiment of the present invention. It will be understood that emboss plates 220-222 are structurally the same as the embodiments of FIGS. 2-13 and also usable in the press 28 of FIG. 1, such that the afore-described features of the prior embodiments are applicable to this embodiment. However, additional features and distinctions will be discussed below.

Figure 25:
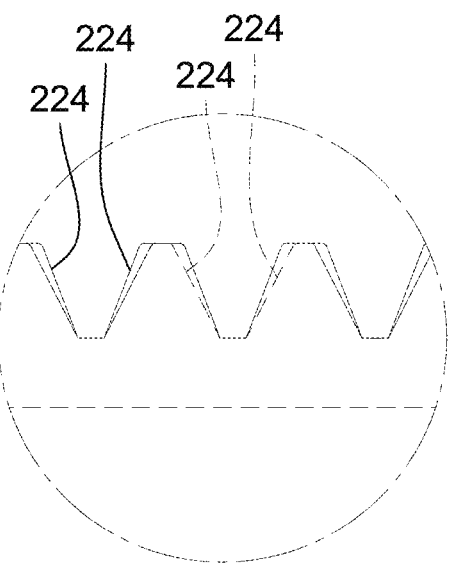
FIG. 25 is a front view of a portion of the embossing plate shown in FIG. 23 to better illustrate the wide and narrow V-shaped groove detail.
Figure 26:
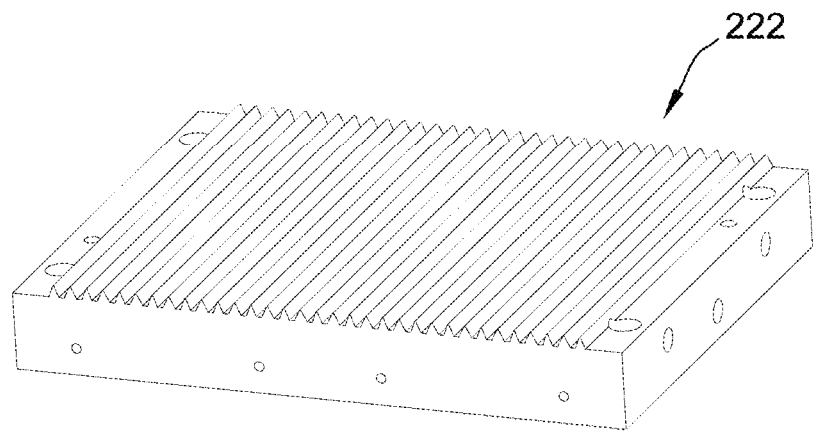
FIG. 26 is an isometric view of a top embossing plate usable with the embossing plate shown in FIG. 23 also with the widening and narrowing V groove feature.
Figure 27:
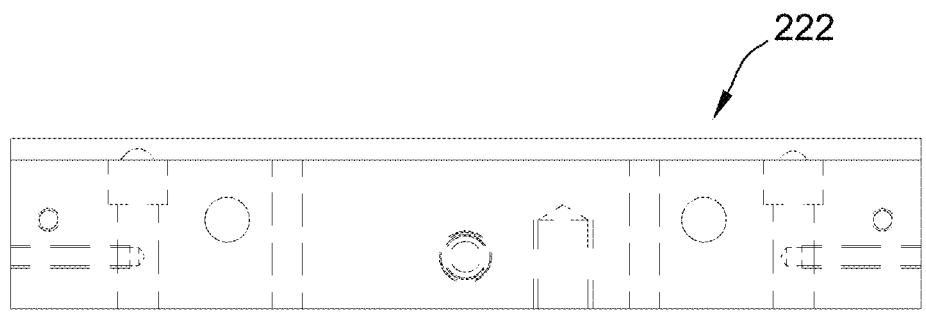
FIG. 27 is an end view of the embossing plate shown in FIG. 26.
Figure 28:
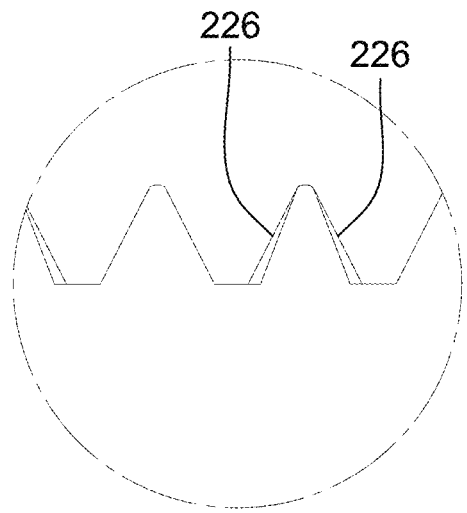
FIG. 28 is an enlarged frontal view of a portion of the front of the embossing plate shown in FIG. 26.
Figure 29:
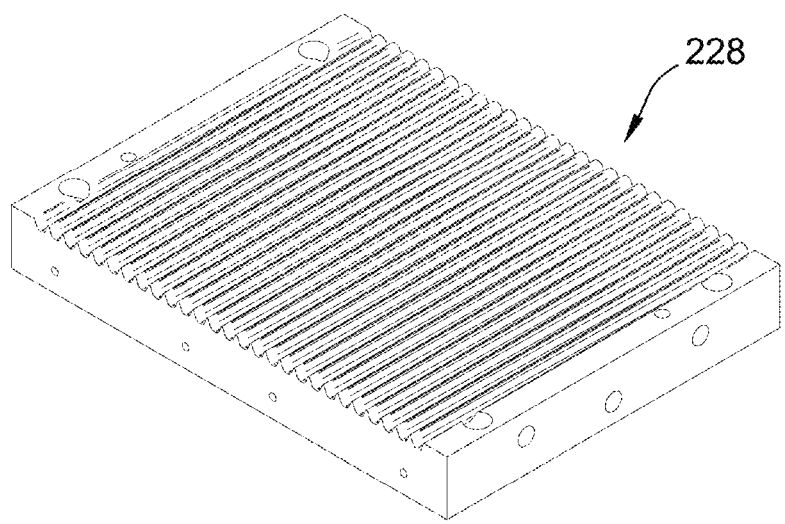
FIG. 29 is an isometric view of another embodiment of a bottom embossing plate having a tapering groove profile and that is usable in the press illustrated in FIG. 1.
Figure 30:
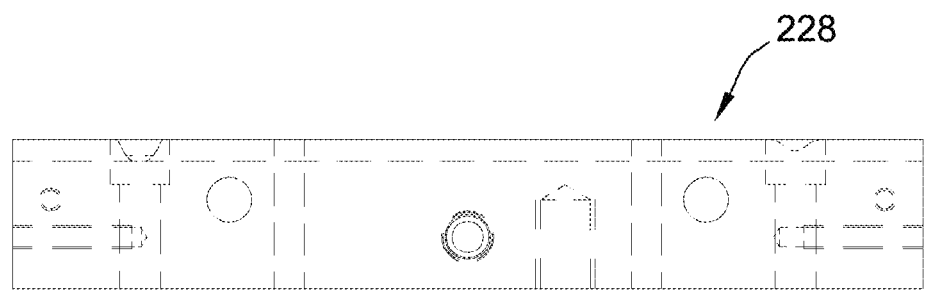
FIG. 30 is an end view of the embossing plate shown in FIG. 29.

The primary additional distinction and feature is that each embossment feature tapers from upstream and downstream ends with a widening V profile at the upstream or inlet face (as well as the outlet face) in the eventually formed media pack to allow for greater air flow into the filter media pack and thereby funnel airflow into the media pack. Specifically, it can be seen that groove sidewalls 224 taper from the upstream end to the downstream end as shown in FIG. 25 thereby providing a narrower groove width at one end as compared with the other for the emboss plate 220. Similarly, the corresponding and matching emboss plate 222 also has tapering groove sidewalls 226 as shown in FIG. 28. The grooved sidewalls 224, 226 thus do not extend parallel to the travel path 42 when employed in the press 28 of FIG. 1, but extend at an oblique path to provide for the tapering grooves. Further, it is noted that with this profile some of the embossments and their defined grooves formed in the resulting filter media pack will have a wider opening at the inlet end while some of the grooves will have a wider opening at the outlet end.

Turning next to the embodiment of FIGS. 29-34, further embodiments of emboss plates 228, 230 are illustrated, where it is understood that these are structurally the same as the embodiments of FIGS. 2-13 and also usable in the press 28 of FIG. 1, such that the afore-described features of the prior embodiments are also applicable to this embodiment. However, additional features and distinctions will be discussed.

Figure 31:
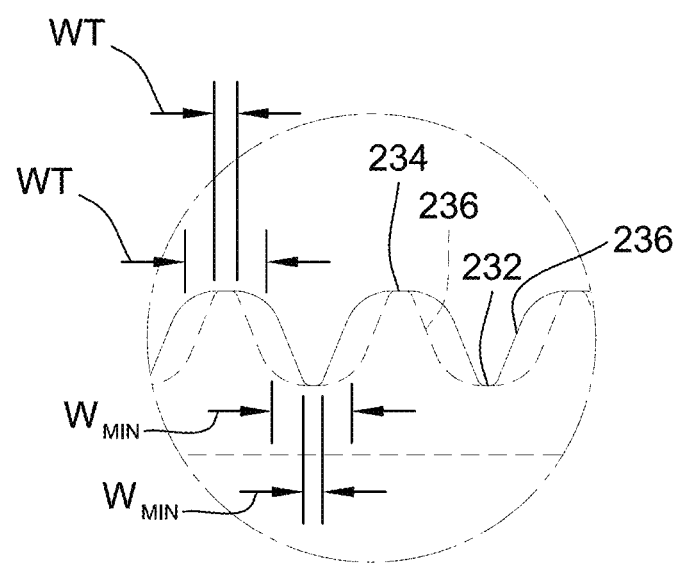
FIG. 31 is an enlarged front view of a portion of the embossing plate shown in FIG. 29.
Figure 32:
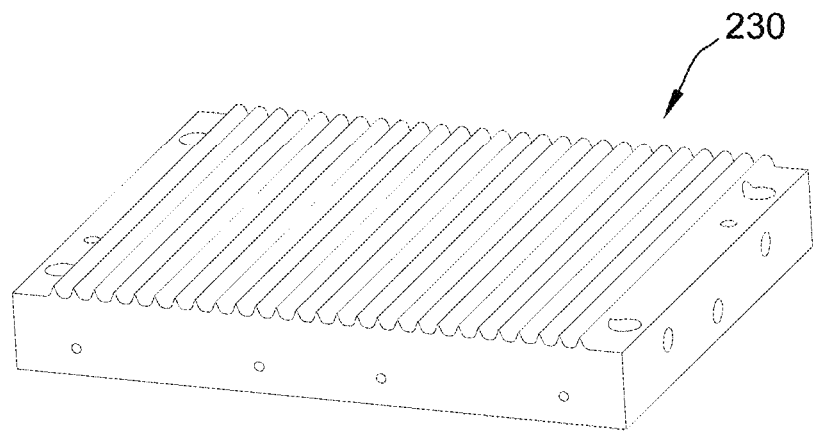
FIG. 32 is an isometric view of a top embossing plate usable with the embossing plate shown in FIG. 29, also having the tapering groove profile.
Figure 33:
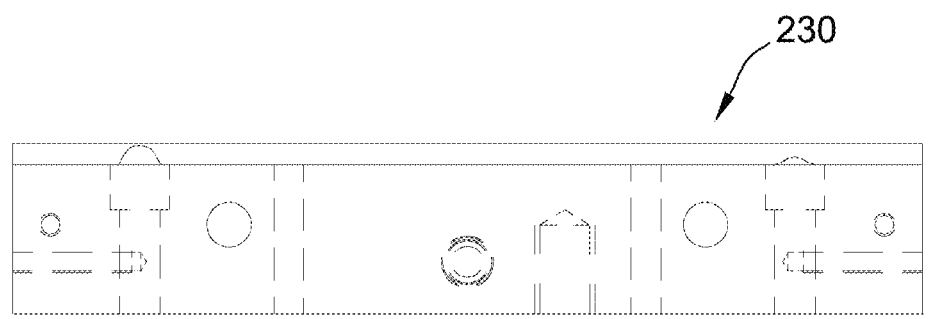
FIG. 33 is an end view of the embossing plate shown in FIG. 32.
Figure 34:
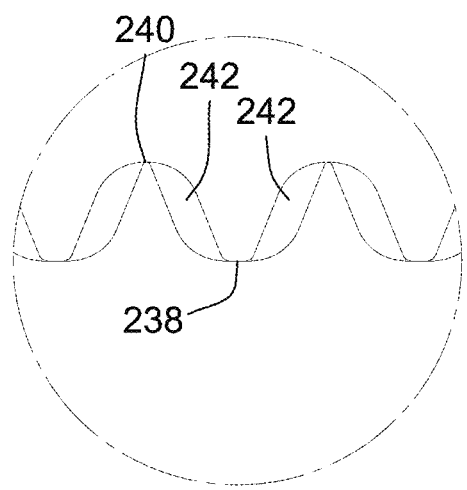
FIG. 34 is an enlarged front view of a portion of the embossing plate shown in FIG. 32 to better show the tapering groove profile.

Referring to these figures, it can be seen that a tapering group profile and tapering tooth profile is provided for both of the emboss plates 228, 230. Specifically, it can be seen that the groove bottom and teeth tips 232, 234 each taper from one of the upstream and downstream ends to the other end of the emboss plate 228 which provides for tapering sidewalls 236 between upstream and downstream ends. As can be seen, the groove bottom and teeth tips may also be rounded in this design, but it can also be seen that the groove bottom width Wmin in this embodiment varies and widens from one end to the other and narrows from that end to the first, as depicted in FIG. 31. Additionally, the same and matching features apply to emboss plate 230 shown in FIGS. 32-34 with similar variable width groove bottoms, 238 variable width teeth tips, 240, and tapering sidewalls 242.

Figure 35:
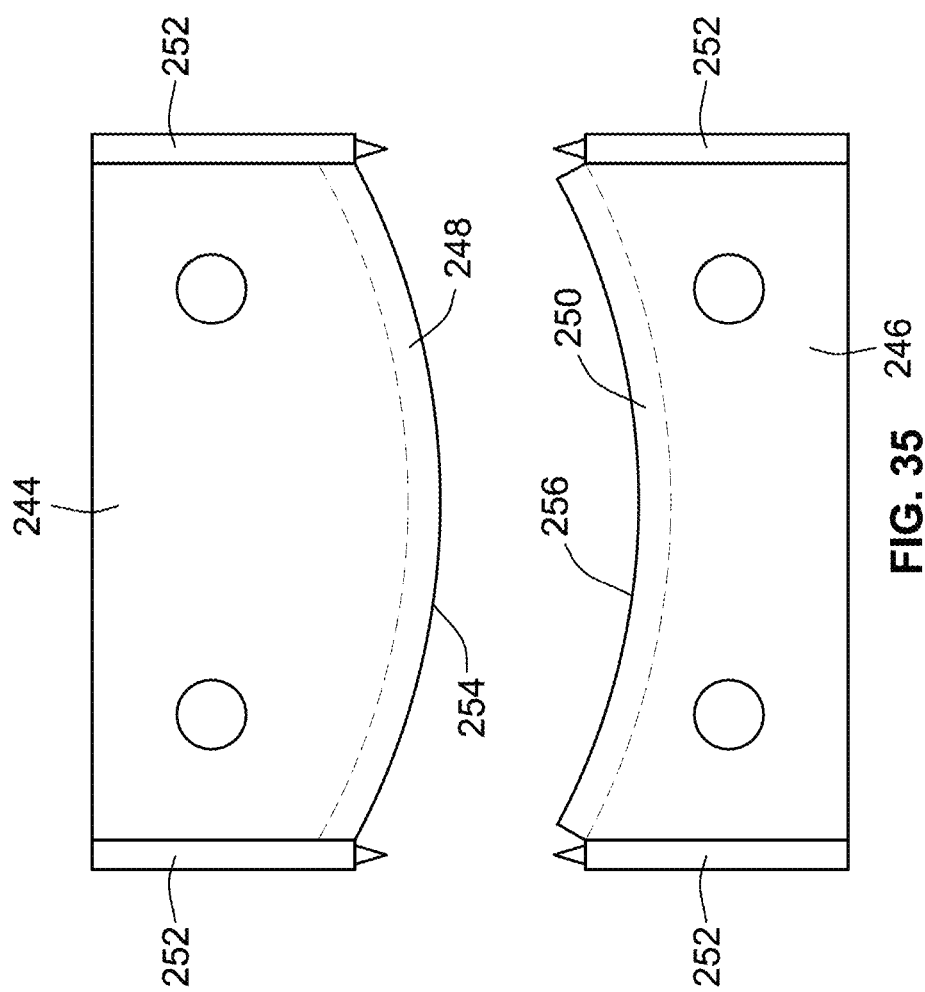
FIG. 35 is a schematic illustration of a curved embossing press plate assembly including upper and lower plates shown in a frontal and partially schematic view according to a further embodiment of the present invention that is also usable in the press illustrated in FIG. 1.

Turning next to FIG. 35, a further embodiment is illustrated in partly schematic form of upper and lower emboss plates 244, 246, that are also structurally the same as the embodiments of FIGS. 2-13 and also usable in the press 28 of FIG. 1 such that the afore-described features of the prior embodiments are applicable to this embodiment. However, additional features and distinctions will be discussed. The upper and lower emboss plates 244, 246, in this embodiment, have a curved profile to provide curved male and female embossment features, including curved embossment features 248, 250 on the respective plates that also extend between upstream and downstream ends where respective score bars 252 are schematically indicated. One of the plates has a concave press surface that receives and provides a nest for the convex press surface 256. An advantage of using this design is that it may also impart a non-planar or curvature to the resulting alter media pack and filter media sheet to form the filter media sheet yet in a further dimension in addition to the dimensions conducted by the embossments.

Yet a further embodiment of emboss plates 260, 262 are illustrated in FIGS. 90-96 where it will be understood that these are structurally the same as the embodiments of FIGS. 2-13 and also usable in a press 28 of FIG. 1, such that the afore-described features of the prior embodiments are also applicable to this embodiment. However, additional features and distinctions will also be discussed.

In this embodiment, a unique pattern of tapering grooves and corresponding tapering teeth 264, 266 are provided in emboss plate 260 with the depth of the tapering grooves and width of the tapering grooves both varying as the plate extends from one end to the other. It can be seen that a first set of tapering grooves narrow in width and depth from an upstream end to the downstream end, while a second set of tapering grooves narrow in depth and width from the downstream end to the upstream end. Further, the mating emboss plate 262 has tapering profiled teeth 268 that are adapted to be received in the tapering grooves 264 with narrow slit grooves 270 illustrated, for example, in FIG. 96.

Figure 38:
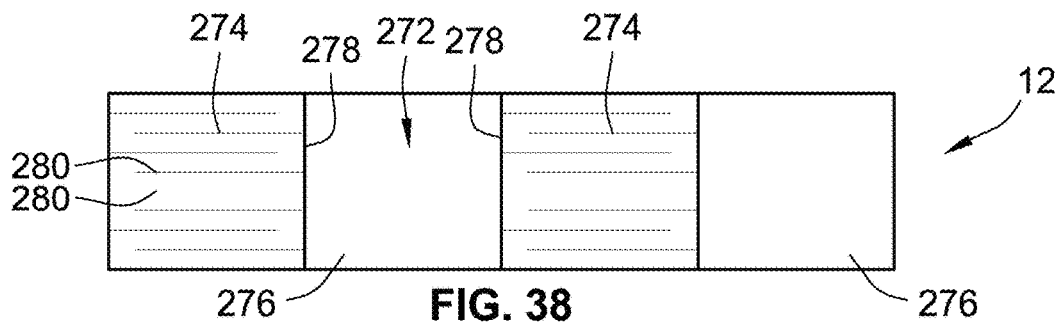
FIG. 38 is a partly schematic top view of an embossed and creased filter media sheet according to an embodiment of the present invention that may be made using the press of FIG. 1.

Turning next to FIGS. 38-41, it can be seen that various forms of embossments and profiles may be created into the filter media sheet 12 using the machine assembly line 10 of FIG. 1. It will be understood that each of the embodiments shown in FIGS. 38 and 41 is structurally similar to the embossed sheet that is shown in FIG. 1 and, accordingly, the afore-described features of the prior embodiments are also applicable to these embodiments. However, additional features and distinctions will also be discussed.

Turning first to FIG. 38, an embossed filter media sheet 272 is illustrated to include embossed and non-embossed, unpressed or flat panels 276 which are separated from one another by full creases divided by score lines 78. Embossments are provided which define grooves 280 which are schematically indicated and run perpendicular relative to the score lines 278. However, the grooves in this embodiment only extend a partial span between upstream and downstream score lines 278 of the embossed panels 274. Thus, these are only partial length grooves 278 rather than full length grooves. However, the grooves overlap and a first set of the grooves 280 extend from the upstream score line to an overlap in a middle region with a second set of grooves 280 which extend from the downstream score line 278. These grooves may terminate at least 15% short of the upstream or downstream crease created by the respective score lines. As a result, an upstream set and a downstream set of grooves are laterally offset from each other, but have overlapping portions such that in any plane perpendicular to the travel direction of the media during pressing, the plane extends at least through one of the upstream and downstream sets of grooves to provide a continuous bridge strength through a middle region of the embossed sections, thus collectively the grooves and embossments extend at least 90% of the length or span between creases when two adjacent grooves or embossments are considered together. With this configuration, less of the sheet may need to be embossed and the grooves also do not need to extend fully which allows for more open now in some embodiments.

Figure 39:
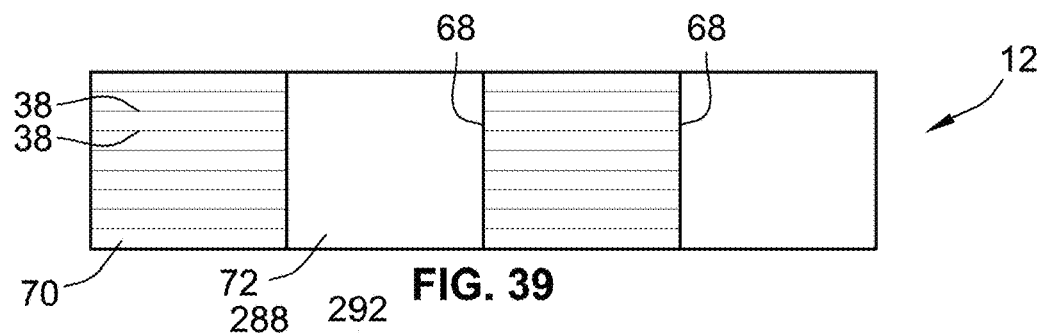
FIG. 39 is a partly schematic top view of embossed and creased filter media sheet for making a pleated filter media pack according to another embodiment that may be made using the press of FIG. 1.

FIG. 39 is a schematic illustration of die embossed filter media sheet shown in FIG. 1 and accordingly no additional description is necessitated.

Figure 40:
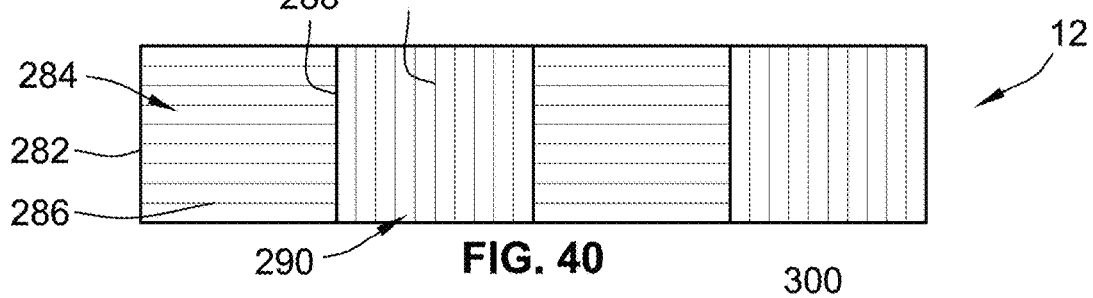
FIG. 40 is a partly schematic top view of a filter media sheet including embossments and creases for making a pleated filter media pack according to a further embodiment of the present invention.

FIG. 40 shows another embodiment wherein at least two different press stations and presses 28 would be utilized in the machine assembly line 10 of FIG. 1, and in series to facilitate stamping of alternating grooves into the embossed filter media sheet 282 shown in FIG. 40. Specifically, embossed filter media sheet 282 includes a first set of embossed panels 284 with schematically indicated embossments defining grooves 286 that extend longitudinally between creases 288 which facilitate pleat folds; and a second set of embossed panels that have transverse grooves 292 extending in a different direction from longitudinal grooves 286 and that may run parallel with the creases. The longitudinal grooves 286 run transverse to the creases and preferably perpendicular to the creases 288 in this embodiment. This provides bridge strength in two dimensions and better ensures and prevents blinding off during fluid filtration.

Turning to FIG. 41, embossed filter media sheet 294 is provided that is the same as that of FIG. 39, and of the embodiment shown in the machine assembly line 10 of FIG. 1, but in which the trimming operation has been used to cut from opposed side edges 78, 80 at cut lines 296, 298 using the trim knife 76 shown in the machine assembly line 10 of FIG. 1. Trimmed segments 300 are removed from the embossed filter media sheet 294. This can be employed to create unique and different shapes. While wedge-shaped trimmed segments 300 are shown in FIG. 41 more typically, stepped segments will be conducted whereby the shape of the embossed panel will match that of the flat panel to create any of the shapes in FIGS. 47, 48, 49, 56, and 57 for example. Two adjacent panels will typically have the same cut profile (not shown in this embodiment but shown in FIGS. 45-49 for example). Thus, the cut lines 296 and 298 and resulting trim segments 300 can be adjusted or coordinated to the desired shape of the filter media pack according to the embodiments shown in FIGS. 47, 48, 49, 56, and 57.

Figure 42:
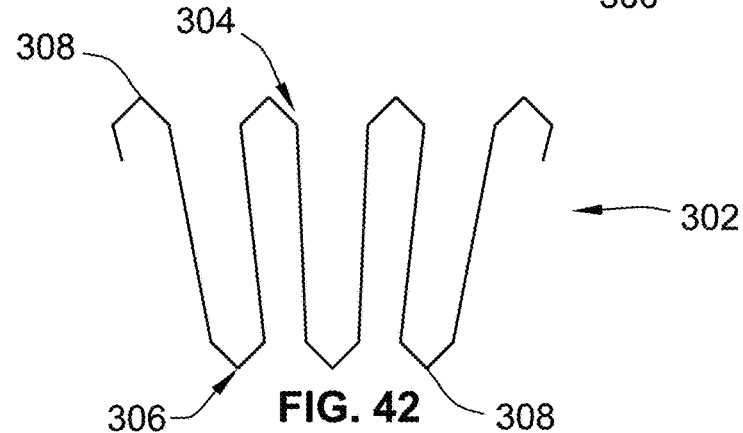
FIG. 42 is a schematic side illustration of a pleated filter media pack showing that the folds or creases at one end may be pinched closer together at one of the flow faces as compared to the other flow face to provide a fan or tapering profile to a filter media pack from one flow face to the other flow face.

Turning to FIG. 42, a schematic side illustration of a filter media pack 302 is illustrated having an upstream (low face 304 and a downstream flow face 306 for fluid flow. The pleat tips 308 at the downstream face 306 are pinched together and may even compress the embossments slightly to provide for a narrower width at the downstream flow lace 306 as compared to the upstream flow face 304. The upstream flow face may alternatively or additionally be fanned out such that adjacent panels or sets of embossed panels do not touch each other; whereas at the downstream flow face, all of the panels are in contact with each other. This may be facilitated by the fact that the grooves and strength afforded by the filter media allow for this feature to be implemented without requiring additional structural support. This may be particularly advantageous in an air cleaner housing where there may be more room at an upstream end than a downstream end while being able to allow for increased flow area at the upstream end. Spacers may be installed at the upstream end to fan out pleats and maintain spacing.

Figure 46:
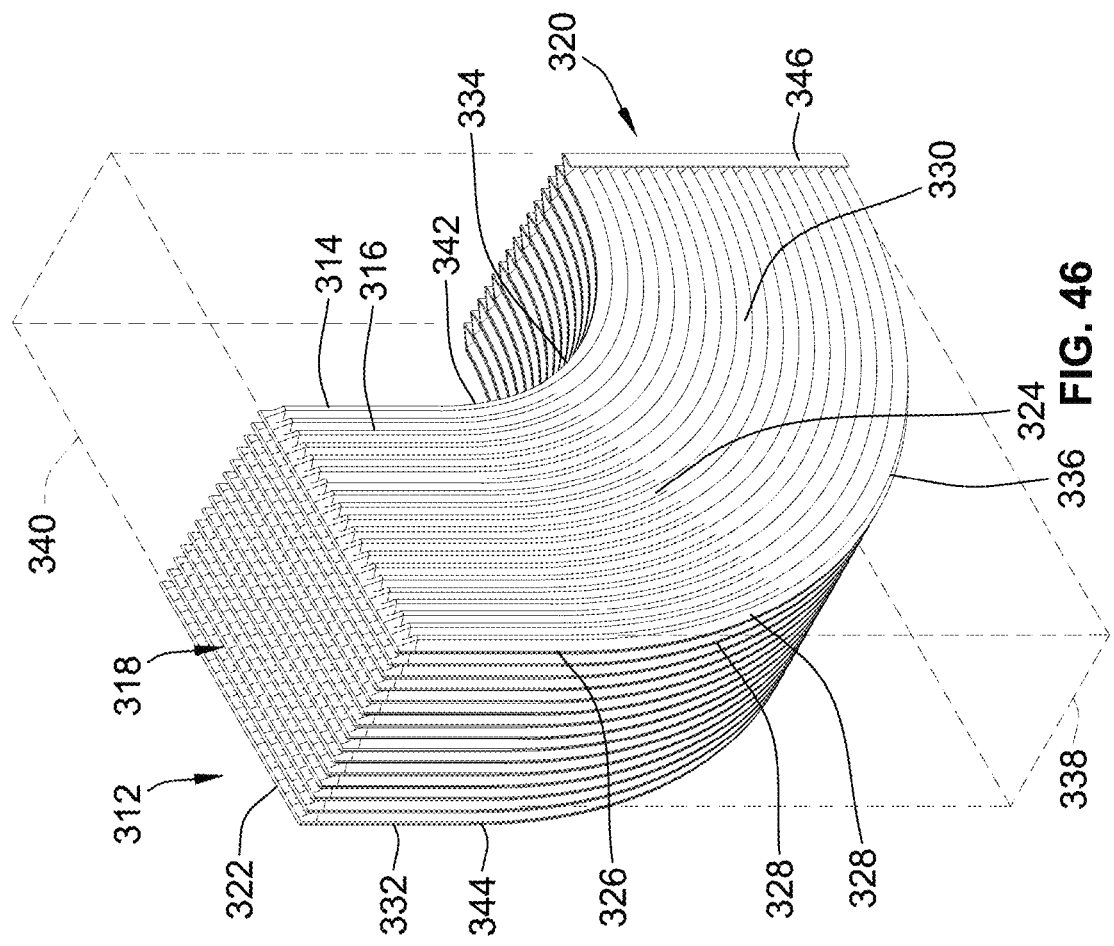
FIGS. 45 and 46 are isometric views of two additional further alternative curved pressed pleated filter media packs whereby edges have been trimmed via a trimming knife using the trimming option device shown in FIG. 1 and wherein pairs of adjacent panels along the sides and at one of the end faces have been seamed together such as via ultrasonic welding, and wherein dashed lines in FIG. 46 show where trimming has occurred.

Turning then to resulting filter media packs that may be achieved through trimming attention will now be directed towards the additional embodiments of FIGS. 45-58, one of ordinary skill will understand that in each of these embodiments they are structurally the same as the embodiment shown in FIGS. 1, 43, and 46 and also usable in being made with the press 28 and assembly line 10 of FIG. 1, such that the afore-described features of the prior embodiments are also applicable to these embodiments and like numbers may be used for greater understanding as done throughout. However, additional features and distinctions will be discussed.

Figure 45:
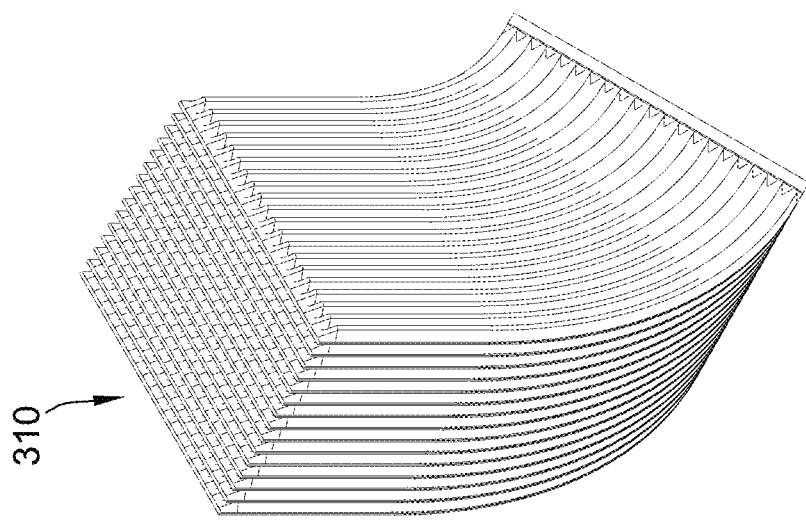

Turning to FIGS. 45 and 46, curved filter media pack 310, as shown in FIG. 45; and curved filter media pack 312 as shown in FIG. 46, are illustrated and are much the same other than the media pack 310 shown in FIG. 45 has a displacement of 45° between the inlet face and the outlet face whereas in the embodiment of FIG. 46 the curved filter media pack 312 has a displacement between the inlet face and the outlet face of 90°.

Both of these embodiments are made and created with similar methodology as such attention will be focused upon that the embodiment of FIG. 46 understanding that the same description applied to FIG. 46 is also applicable to FIG. 45. In making the filter media pack 312, the embossing features on the respective stamping dies employed in the assembly line of FIG. 1 do not extend linear but extend along a curved path to form corresponding curved embossments to define curved ridges 314 and curved grooves 316 extending between two flow faces 318, 320 wherein one of the flow faces is an inlet face and the other being an outlet face. At flow face 318, scores 322 are provided which define creases and folds between emboss plate panels 324 and an unembossed or flat plate panels 326 thereby providing a plurality of pleats which in this embodiment form a plurality of pocket pleats 328. As can be seen, the flow faces 318, 320 may be flat in the aggregate (i.e. able to lie flat) and similarly two side faces are flat side faces 330, 332 are in the aggregate flat (the back side face 332 being the back side of the last flat pleat panel 326 with the front flat side face 330 being the embossed pleat panel 324). In contrast the other two sides are curved sides 334 and 336 that extend from one flow face 318 to the other flow face 320 and transversely between the flat side faces 330, 332.

Preferably, the shape of the curved ridges, 314 and curved grooves 316 match the curvature of the curved sides 334, 336.

To create this filter media pack preferably the trim knife 76 is utilized to cut away regions of each emboss plate panel 324 and flat pleat panel 326 as indicated by dashed cut-away regions 338, 340 that each indicate the section of each panel that has been cut away to form the curved shape. Additionally, in order to form pocket pleats, adjacent pairs of embossed and flat pleat panels 324, 326 are seamed together and bonded together through adhesive and/or ultrasonic welding at curved seam 342, and curved seam 344 to avoid unfiltered air flow through these seams and to ensure that as fluid travels from one flow face to the other flow face that filtration occurs and no unfiltered air flow travels through the curved filter media pack 312. Additionally, the crease at the other flow face 320 is created by an end seam 346 to complete the pocket pleats 328 which is also performed by the ultrasonic tool (e.g. the plunge welder 84 and anvil $6 as shown in the machine assembly line 10 of FIG. 1) or created via the adhesive applicator in which adhesive is applied to join adjacent pairs of individual pleat panels.

It can be seen with the embodiments shown in FIGS. 45 and 46 that the length of the grooves can extend between the first end face and the second end face with the grooves making a turn of at least 20° and the overall filter media pack also making a turn of at least 20°. This may be advantageous in various applications where space is limited or needs to make a turn such as in various engine filtration applications which allows for flexibility of design to accommodate other engine components around the filter (e.g. such as a pipe or duct).

Figure 36:
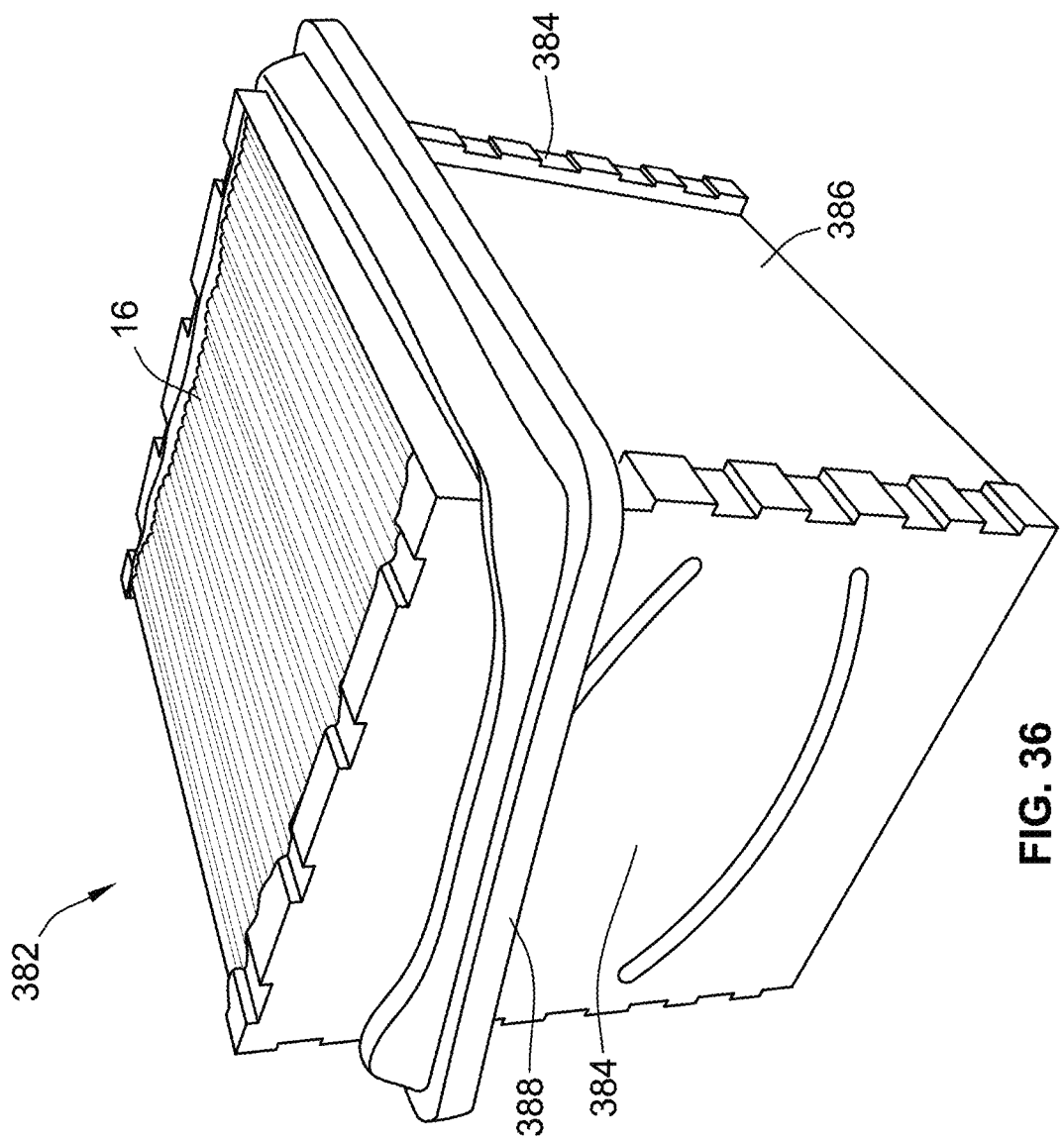
FIG. 36 is a perspective illustration of an air filter cartridge according to an embodiment that can employ the pleated filter media pack created according to the embodiments of FIGS. 1, 15, 16 and/or 43, or other such embodiments discussed herein.

It will also be appreciated that in this embodiment pocket pleats may not be necessitated but instead alternatively, the curved sides 334 and 336 may alternatively be formed with molded side panels to prevent leakage or seal off those side faces similar to as is done in the embodiment of a completed filter media pack with sealing system as indicated in FIG. 36 for example.

Figure 47:
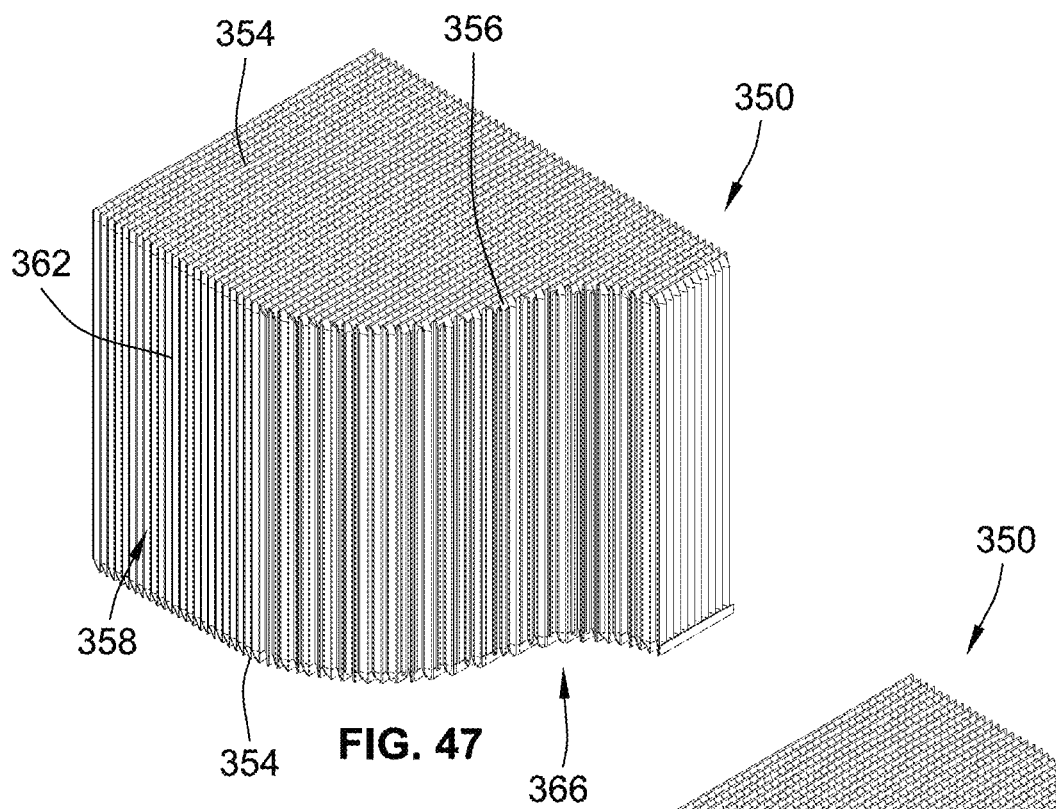
FIGS. 47 and 48 are additional isometric views of pressed pleated filter media packs having non-cuboid shapes wherein the optional trimming knife in FIG. 1 has been used to trim or cut individual panels into such shapes to form these shaped packs.
Figure 48:
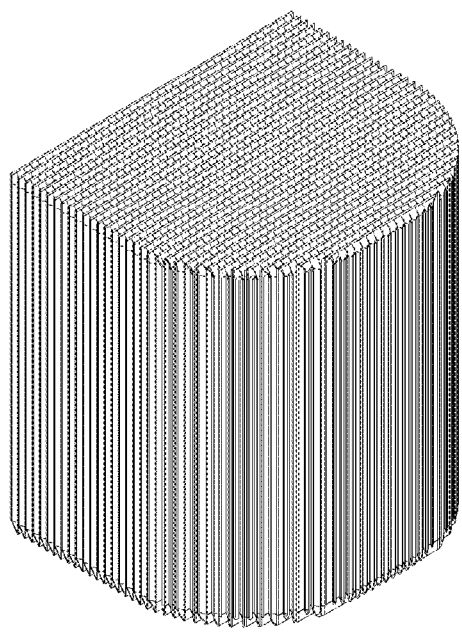

Turning to FIGS. 47 and 48, two additional irregular-shaped filter media packs 350, 352 are illustrated in which the flow faces are non-rectangular. For example in the regular filter media pack 350, the flow faces 354 are formed via a cut line 356 by virtue of the trim knife 76 employed in the machine assembly line 10 of FIG. 1. This embodiment does include a cuboid portion 358 and a non-cuboid portion 360 that together make up the overall irregularly-shaped filter media pack 350. It can be seen that the embossments also run transversely and preferably perpendicularly to the flow faces 354 in this embodiment. In the cuboid portion 358, the trim knife 76 may not be necessitated for use but is necessitated for use in creating the non-cuboid portion. The outer peripheral sides 162 of media pack 350 which includes some planar faces and the curved portion may be mounted with a suitable frame and adhesive attachment or can be over-molded if desired to prevent unfiltered air flow when fluid flows between the respective flow faces 354. The irregularly-shaped filter media pack 352 of FIG. 48 is much similar to that of FIG. 47 other than the shape being different such that the aforementioned description is applicable to FIG. 48 other than the shape variation. It is seen in FIG. 48 that a V-shaped filter media pack may be achieved as an alternative. This emphasizes the flexibility and design in that it may take a variety of shapes from cuboid shapes to non-cuboid shapes and allow for design variation to fit a variety of different housing configurations.

Figure 49:
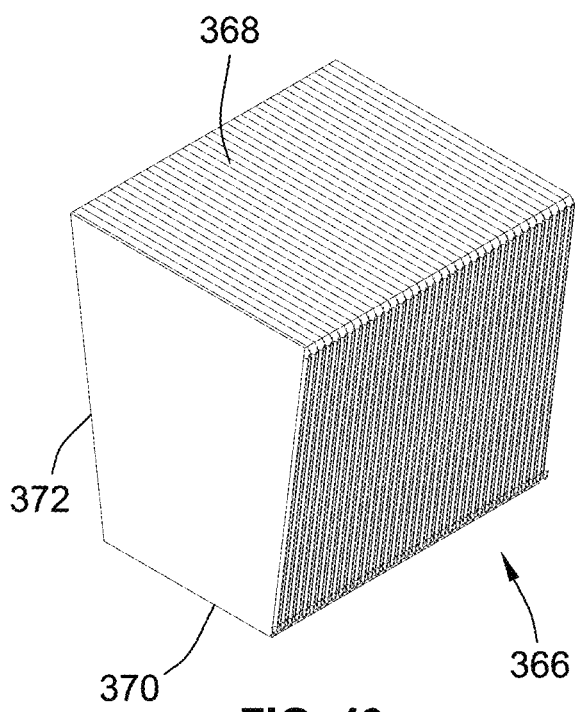
FIG. 49 is an isometric view of yet another embodiment of a pressed pleated filter media pack made by the press assembly in line of FIG. 1 wherein the optional trimming device has been used to cut the panels to trapezoidal shape and wherein the sides have been seamed together to form pocket pleats.
Figure 51:
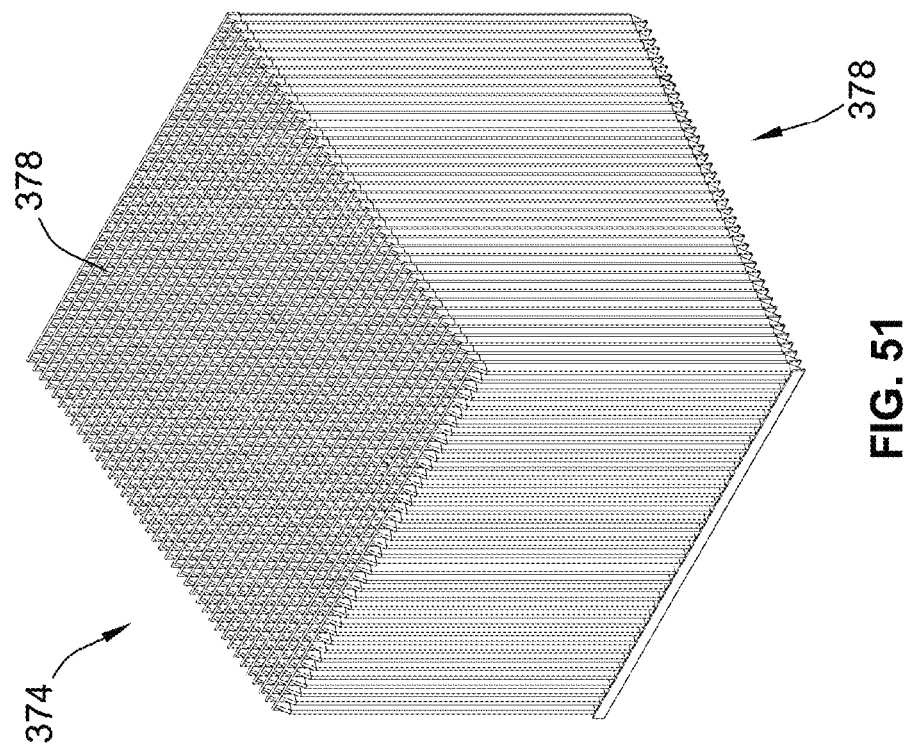
FIGS. 50 and 51 are side and isometric views of a further embodiment of a pressed pleated filter media pack wherein the embossed panels and the non-embossed panels each vary in size and distance from one side to another side to provide for a non-cuboid shape.
Figure 50:
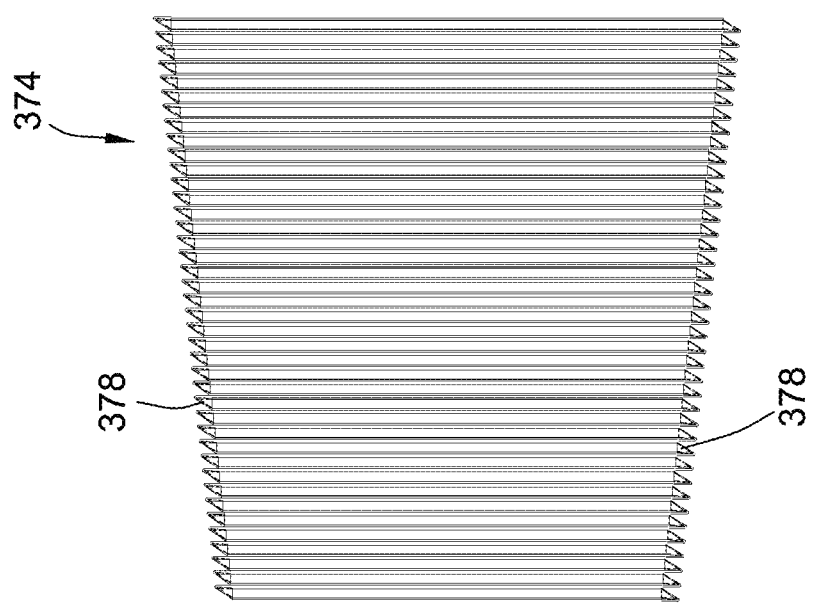
Figure 53:
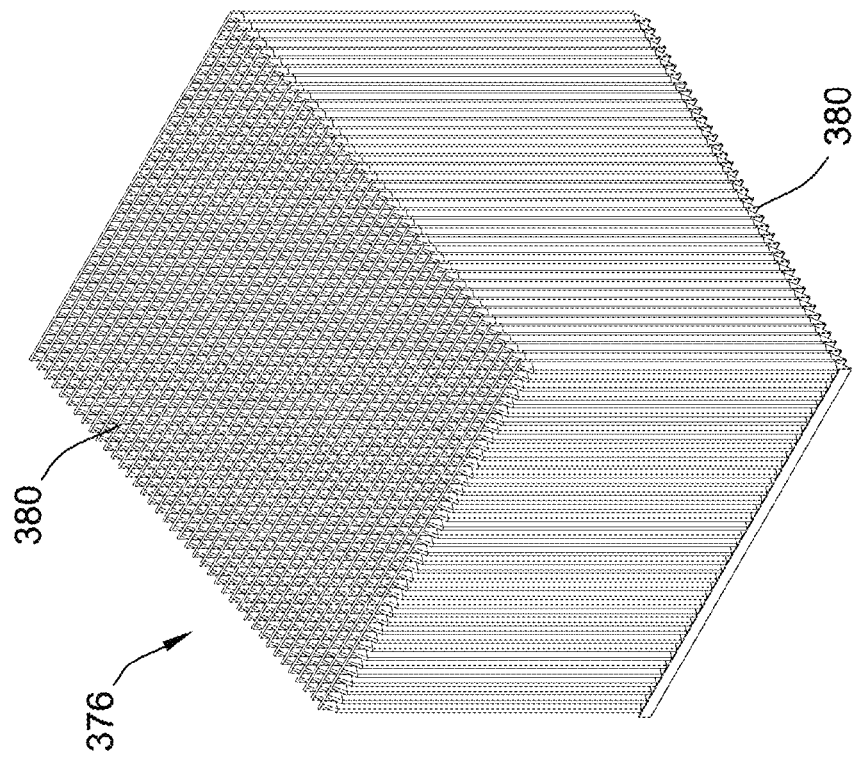
FIGS. 52 and 53 are another embodiment of a pressed pleated filter media pack similar to that shown in FIGS. 50 and 51 also with varying pressed embossed and non-embossed panel lengths to provide a non-cuboid shape.
Figure 52:
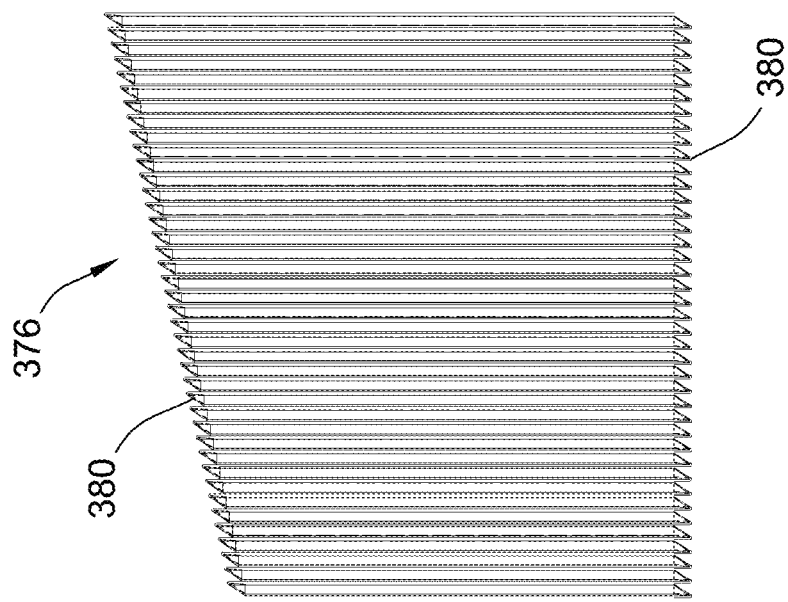

Turning to FIG. 49, a further embodiment of a filter media pack 166 is illustrated that is quite similar to that of FIG. 43 and as such the same description thereto is applicable but in this case the trim tool knife 76 of FIG. 1 is used to cut a different shape to make one flow face 168 of a different shape than a second flow face 170 by cutting at least one side to provide one or more tapered sides.

In this manner, the filter media pack 166 takes the form of a trapezoidal shape. Again the tapered sides may be sealed and over-molded if desired or pocket pleats can be formed by seaming adjacent pleat panels if desired.

In the embodiments of FIGS. 50-53 additional media packs 174 and 176 are provided in which respective flow faces 178 (shown in FIGS. 50 and 51) and flow faces 180 (shown in FIGS. 52 and 53) while planar are not parallel with each other. This can be accomplished by varying the height of the pleat which is allowed and permitted in that the filter media may be advanced a predetermined distance as desired. Additionally, rather than just simply having one press station, and press 28 as indicated in FIG. 1, a series of presses 28 may be provided, one for each different length of embossment provided to facilitate the variable length and span of the filter media pack and embossments between the respective flow faces 178 shown for FIGS. 50 and 51 and flow faces 180 shown for FIGS. 52 and 53. These filter media packs 174, 176 may also be fitted with an outer frame or wrap structure such as shown in FIG. 36 and facilitated with a housing seal as also shown for FIG. 36.

Figure 37:
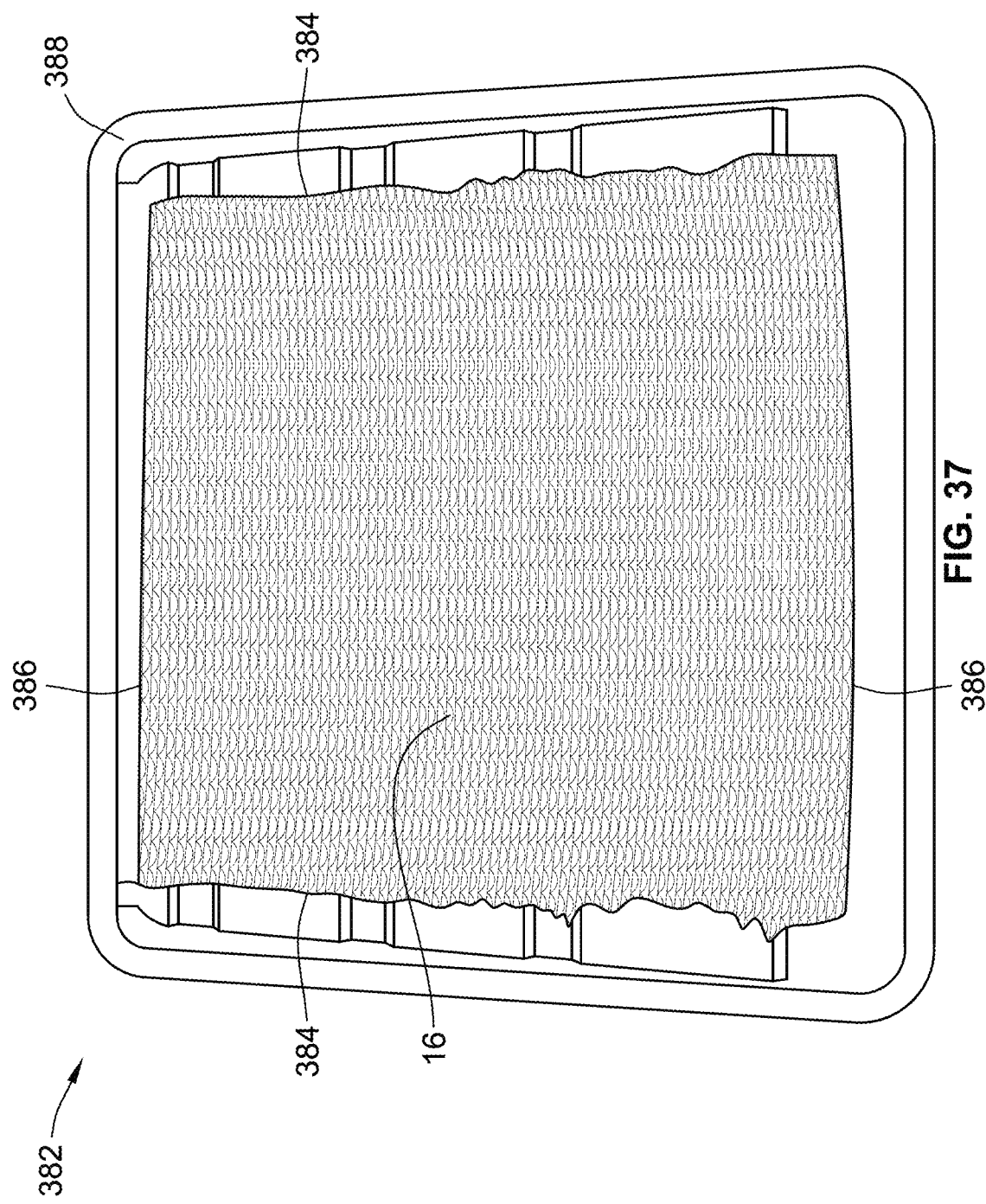
FIG. 37 is a top view of the filter cartridges shown in FIG. 36.

Turning to FIGS. 36 and 37 a perspective and top view of a replaceable filter cartridge 382 incorporating the pleated filter media pack 16 is illustrated that is usable for a replacement filter to filter air in an engine air filtration application such as being installed in an air cleaner housing (not shown) and sealed against a corresponding sealing surface of such an air cleaner housing. It is also understood that any of the filter media packs such as shown in FIGS. 43-58 may also be equipped with the same component with the shape of the side panels and seal configured to lit in surrounding relation for example of such filter media pack to the desired shape, such that the teachings and disclosure pertaining to this embodiment are applicable to the other embodiments of other shaped filter media packs disclosed herein to create filter cartridges that are usable in air cleaner housings and/or that can be connected to an fluid filtration circuit.

In this embodiment, the filter cartridge 382 employs a cuboid and rectangular filter media pack such as the filter media pack 16 created from assembly and line of the first embodiment of FIG. 1 and as represented by the filter media pack 16 in FIGS. 1 and FIG. 43 (understanding that the media pack 43 would have additional pleats over a lateral span to fill the square shape shown for the media pack 16 in FIG. 36). As shown therein, the filter media pack 16 includes integrally molded and molded-in-place side panels 384 on first and second opposite sides and that are integrally bonded and imbedded with corresponding side edges 78, 80 of the filter media sheet on opposed sides of the pleated filter media pack 16. It can be seen that these side panels 384 cover the full length of the sides between the opposed flow faces to protect and seal the opposed sides of the media pack where the raw edges of the emboss plate panels and the flat pleat panels are located. By sealing it is meant that the flow of unfiltered fluid is not allowed to pass through the side edges when installed in an air cleaner housing.

A relatively hard material of polyurethane may be used for the side panels 384 to provide for additional support.

Additionally, the fabricated side panels 386 in the form of fiber board, plastic, metal or other rectangular shaped panels may optionally be attached in covering relation to the embossed pleat panels or flat pleat panels at the other two opposed sides that extend perpendicularly to the molded-in-place side panels 384. The prefabricated side panels 386 are embedded within during the integral molding of side panels 384 to encapsulate these and provide for sealing relationship. The prefabricated side panels 386 may be attached and sealed along their entire lateral span with suitable adhesive such as polyurethane to attach and seal the side panels 386 to the opposite sides of the media pack in a manner that prevents flow of unfiltered air flow from one flow face 198 to the other flow face 200.

Alternatively, panels 386 may also be molded like panels 384 and also formed of polyurethane or other molding material.

Additionally, filter media cartridge 36 is provided with a housing seal 388 that may be a prefabricated seal that is glued and sealed around the periphery of side panels 384 and 386 in a manner that prevents unfiltered air flow through the filter cartridge from the inlet face to the outlet face or that is molded and placed around the outer periphery of side panels 384 and 386.

For example, housing seal 388 may comprise elastomeric material such as polyurethane, nitrile, rubber or other such elastomeric material that is suitable for providing either an axial seal or radial seal with a housing.

In an embodiment, the housing seal 388 is made of a material that is softer and more elastomeric than the harder material of side panels 384 and the side panels 386 which may also be formed of elastomeric materials such as polyurethane.

In another embodiment, the housing seal 388 may be integrally formed at the same time and/or formed of the same durometer material as the molded side panels 384.

It is also understood that rather than providing separate side panels 384 and 386 that side panels 384 and 386 may instead be a prefabricated rectangular casing that has a rectangular opening and void for receiving the filter media pack 16 in which the filter media pack 16 would be adhesively attached and sealed around its periphery to such rectangular prefabricated housing. As such, side panels 384 and 386 may also be for example a prefabricated plastic or metal or paperboard or cardboard rectangular shell in the form of a casing that takes the same shape as that of the media pack and receives the media pack therein. Such a shell in the form of a casing may then also provide a structure for supporting a seal or providing for integral molding of a seal thereto to provide for the housing seal 388.

A wide variety of fluted filters, direct flow filters, panel filters and panel filter casings are known in the art, and the media packs of the embodiments herein can be used to replace those while using the same casings and sealing systems of those prior systems.

Figure 54:
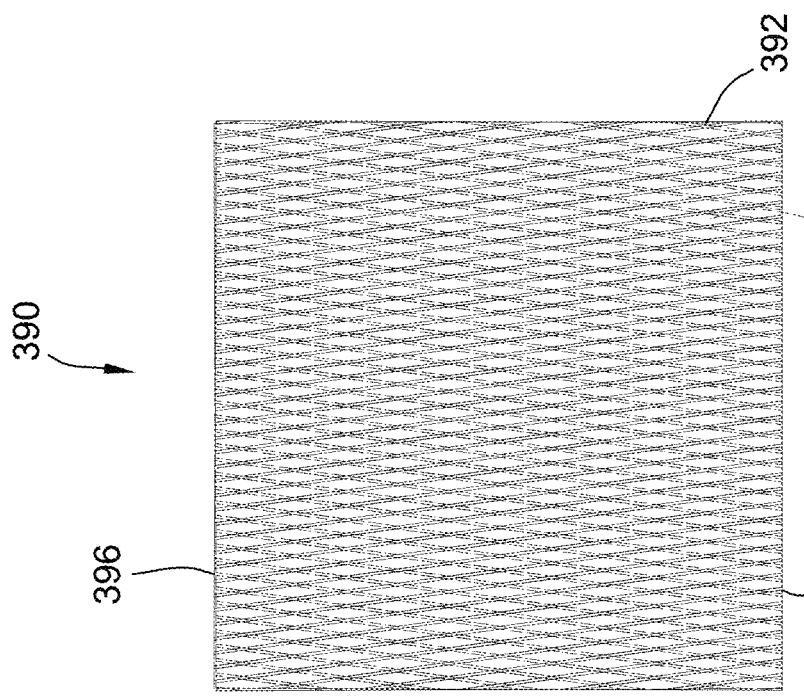
FIG. 54 is a side end view of an embossed pressed pleased filter media pack whereby the embossments are skewed and do not run perpendicular to the inlet and outlet flow faces and wherein each panel is embossed with grooves having a different skew (note a first set of skewed embossments showed in solid lines and a second set of embossments on a panel behind shown in dashed lines) and only two panels of the filter media pack being shown with solid and dashed lines.

Turning to FIG. 54, another embodiment of a pleated filter media pack 390 is provided wherein each of the panels are embossed such as was shown for example in FIG. 40 but wherein the adjacent panels define different sets of embossments which in this embodiment includes first skewed embossments 392 extending from an inlet face 396 to an outlet face 398 and a second set of skewed embossments 394 that also extend from an inlet face to an outlet face. However the first and second sets of skewed embossments extend at different angles as can be seen. It should be noted that the embodiment of FIG. 54 is viewed from a side of the filter media pack 390 such that the first set of skewed embossments 392 are shown on the side face of the structure and the second set of skewed embossments 394 are on the very next panel behind and therefore shown in dashed lines. With this arrangement, each panel may be embossed and this also provides for additional structural support in that embossments are extending in two different directions and further each panel is embossed to provide structural support. Further, an advantage of this design is that the angles provide different dimensions of structural support not realized when embossments only extend in one direction. It will be understood that the pleated filter media pack 390 shown in FIG. 54 may be or a cuboid shape and therefore also used or employed in a similar manner such as pleated filter media pack shown for example in FIG. 1 or 43 for example.

Figure 55:
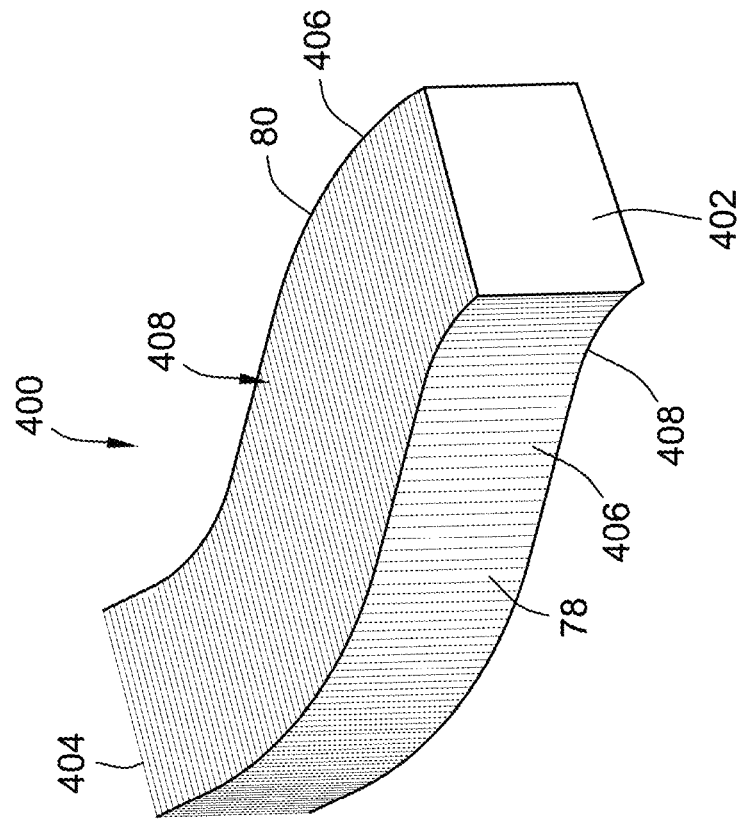
FIG. 55 is an isometric view of a further embodiment of a pressed pleated filter media pack wherein adjacent sets of panels are shifted relative to each other such that at least two of the sides are non-planar.

Turning to FIG. 55, another embodiment of a filter media pack is illustrated and that can be created using the filter media pack 16 shown in FIG. 1 but wherein individual panels are shifted to create a curved pleated filter media pack wherein the front pleat panel 402 is shifted from intermediate panels and the back pleat panel 404 to provide opposed matching curved sides 406 that are formed via the side edges 78, 80 of the filter media sheet. As a result, two of the sides extending between flow faces 408 are the curved sides 406 shown and two of the sides are flat sides provided by the front pleat panel 402 and back pleat panel 404 in that these will generally lie flat along a surface even if embossed. When in use, and jacketed or employed in a housing shell and/or molded panels carrying a seal, flow will flow between the flow faces 408 to filter fluid flowing therebetween.

Figure 56:
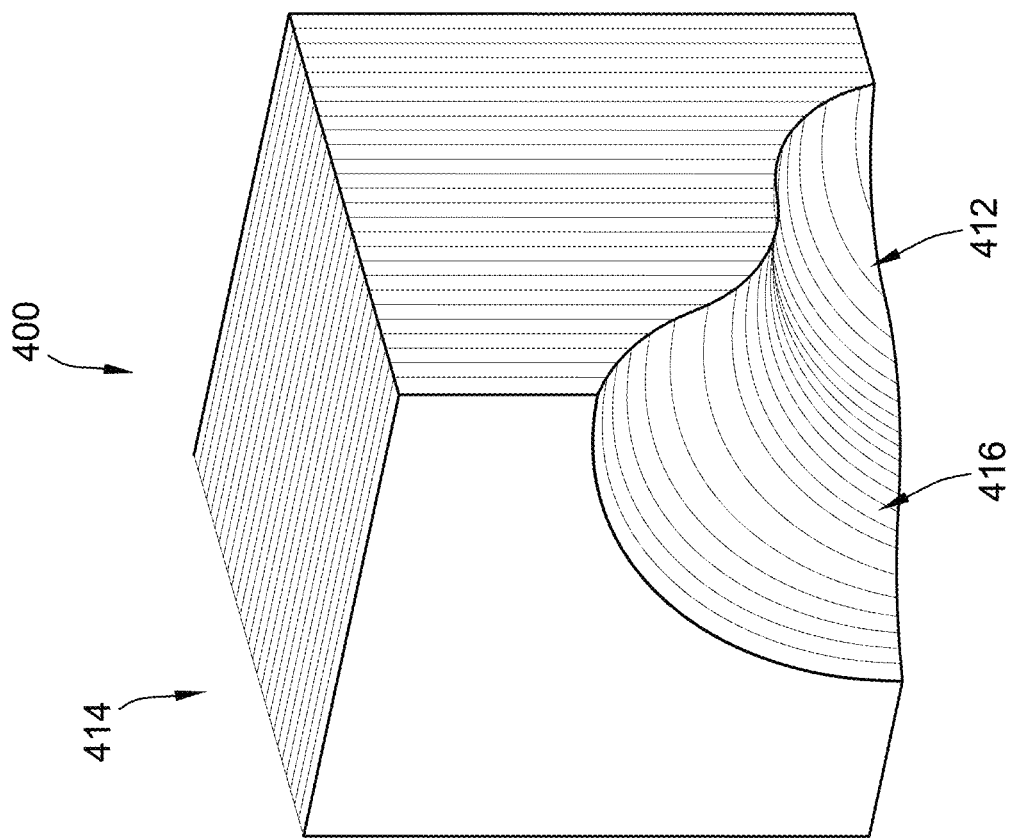
FIG. 56 is a further embodiment of a pressed pleated filter media pack made by the press assembly line of FIG. 1 where the trimming device is used to trim out part of one of the flow faces and sides and wherein ultrasonic welding is used to connect pairs of adjacent pleat panels to thereby provide for pleats and prevent unfiltered air flow through the media pack.

Turning to FIG. 56, a pleated filter media pack 410 is illustrated that is the same as that coming off the line for pack 16 except that an irregular corner portion 412 has been trimmed away via the trim knife 76 option of the line assembly of FIG. 1 to disrupt the otherwise cuboid shape of the media pack 410 in this embodiment. Removal of the corner portion 412 provides for a void that can receive for example a pipe, duct, engine assembly or other component and may allow for the filter housing in which it is installed to also include or accommodate such a shape that may allow for other engine components to protrude up into what would otherwise be a rectangular cuboid filter housing. This way, space which is limited under the hood in many engine applications can be accommodated by allowing for components to project up into areas that were not possible due to the previous cuboid or cylindrical shape of an air filter housing. In this embodiment, one flow face 414 is rectangular while the other flow face 416 is irregular. The irregular flow face 416 can be made and accomplished via the welding and anvil tool which joins and seams adjacent pleats providing for pocket-like pleats to finish up and seam the pleat edges and creases along the irregular flow face 416 as described above for other embodiments.

Figure 57:
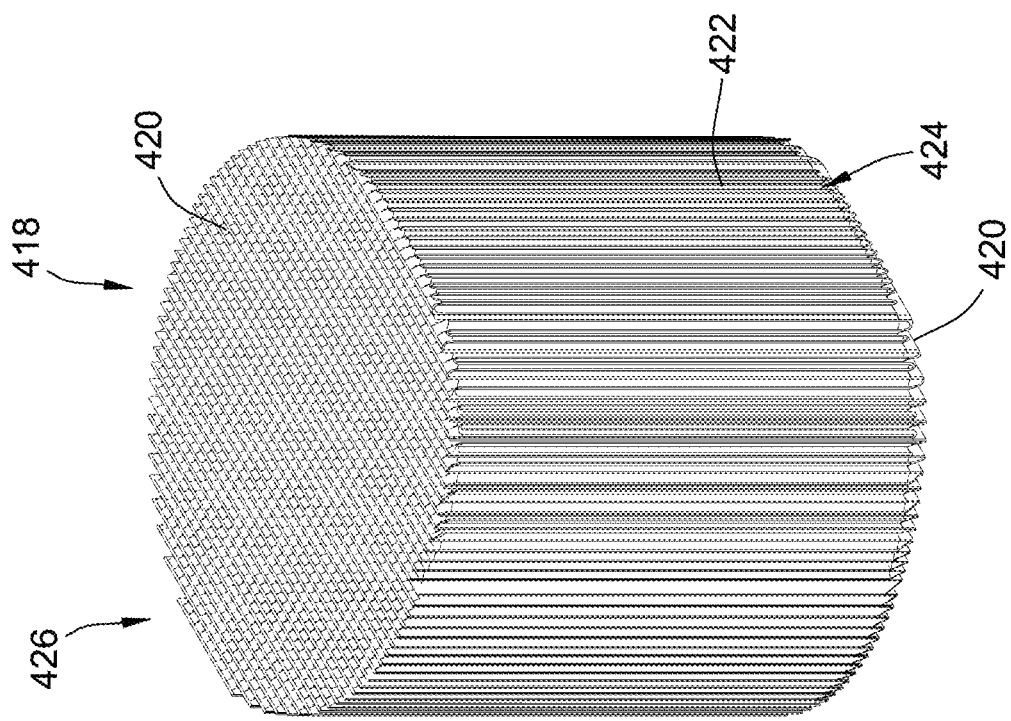
FIG. 57 is another embodiment or a pressed pleated filter media pack shown in a circular shape wherein the trimming tool has been used to shape and cut away the width of adjacent panels to appropriate lengths to create a circular cylindrical shaped media pack.

FIG. 57 illustrates a circular pleated filter media pack having circular upstream and downstream flow faces 420. A circular shape also allows for deep pleat technology to be used in circular pleated filter packs where a substantial amount of filter media is constrained within the volume of the filter media pack 418 as shown in FIG. 57. This media pack is also formed according to the similar methodologies as described above for example in relation to FIGS. 47 and 48 and otherwise where discussed in this application with trimming of the panels to the width shown in FIG. 57. The description for those embodiments is also applicable to FIG. 57. It can be seen in this embodiment that each set of pleat panels are variable and span across a lateral distance extending perpendicular to the flow direction through flow faces 420 as variable width panels 422 extend from a front side 424 to a back side 426.

As in many of the embodiments, the flow through the flow faces is generally transverse and typically or preferably perpendicular to the flow faces and thus is a straight through flow or direct flow through which in this case in the pleated filter media pack 418 of FIG. 57 is longitudinally or along the axis that cuts through the circular flow faces the axis being directed through the centers of the flow faces.

FIG. 59 illustrates a slanted pleated filter media pack 428 wherein slanted embossed panels 430 and slanted flat panels 432 extend at oblique angles relative to the plane of the flow faces 434. This can be created through appropriate creases and the folding techniques at the pleat tips 436 by providing an additional angle or bend 438 as indicated.

Also as with the other embodiments, flow through the filter media pack between flow faces 434 is from one flow face towards the other flow face with the air flow having to pass through the filter media sheet such that unfiltered air flow between the flow basis 434 is not permitted. This may also be employed and used very similar to cuboid shapes but also allows for design variation for a variety of reasons.

FIG. 58 illustrates yet another curve in this case corkscrew pleated filter media pack 440 that is accomplished by shifting individual pairs of embossed and flat panel pairs 442 relative to each other. For example, adjacent sets of pleat panels or pleat panel pairs 442 are shifted relative to each other such that at least two of the filter sides are non-planar and in this case all four sides 444 are curved sides to form the overall corkscrew shape. Only the sides defined by the pleat panel pairs 442 are flat in this embodiment. It should be noted that two of the sides (e.g. the sides where the scores and pleat folds are located) form flow faces 446 with one being an inlet flow face and the other being an outlet flow face.

Turning to FIG. 60, it is seen that there is another embodiment of a pleated filter media pack 448 shown in FIG. 60 but wherein only two of the panels 450 are shown and also separated from one another for illustrative purposes. However it will be understood that additional pleat panels similar to those of panels 450 would be joined at the free ends integrally via a continuous sheet and compacted together like the other embodiments.

In this embodiment, each pleat panel 450 includes embossments including a first set of embossments 452 and second embossments 454 that together provide for an overall embossment feature that extends a full length between flow face 456 and flow face 458 wherein one of the flow faces is an inlet face and the other is an outlet face. The flow faces may be defined and provided by pleat tips 460, 462 as is the case with the other embodiments as well.

Additionally, it can be seen that the first embossments 452 differ from the second embossments 454 to provide for additional support, filtration or other functional features. In this case, the first embossments 452 extend from a first plane of the panel into an upstream face of the first panel and the second embossments 454 extend into a downstream face of the first panel 450. In other words, the first and second embossments 452, 454 project from opposite sides of the filter media sheet in this embodiment which provides an overall thicker embossed structure to the overall sheet. The embossments generally extend between the opposed pleat tips 460, 462 at the opposed flow faces 456, 458. This may also be used to form a cuboid and rectangular filter media pack such as the filter media pack 16 shown for example in FIG. 1 and FIG. 43 but may also be used for other embodiments as well.

FIG. 61 shows a pleated filter media pack 464 much like that of FIG. 60 such that it will be understood that filter media pack 464 of FIG. 61 is structurally the same as the embodiment of FIG. 60 such that the above-described features for that of FIG. 60 including how it is illustrated are applicable to this embodiment. However additional features and distinctions will be discussed. In this embodiment, the first set of embossments 466 and second set of embossments 468 that protect from different sides of each pleat panel extend only a partial length between opposed pleat tips or flow faces 472, 474 for example, the embossments 466, 468 on panel 470 are adjacent to the upstream pleat tips and flow face 472 and spaced via a gap from the pleat tip defined by the other flow face 474.

The other pleat panel joined to pleat panel 470 at the pleat tip shown at flow face 476 (and also would be joined at pleat tips that would be at flow face 472) include first and second sets of embossments 478, 480 that project from opposite sides of the plane of the filter media sheet. In the aggregate, the embossments 478, 480 in conjunction with the embossments 466, 468 provide an overall embossment structure that extends a full length of the filter media sheet between flow faces 472 and 474 to provide for bridge strength through a central region of the filter media pack 464. Embossments 466, 468 and embossments 478, 480 overlap with each other (that is they are at least adjacent to each other or that extend past each other in the middle region sufficient to provide for bridge strength) in the middle region.

Turning next to FIG. 62-66, optional tab features are shown that may be integrally formed with the filter media sheet or separately attached to the filter media sheet and usable in any of the embodiments of filter media packs disclosed herein. As such the afore-described features of prior embodiments are also applicable to these embodiments. However additional features and components used in these embodiments will be described and discussed that are usable with the other embodiments discussed herein.

FIG. 62 shows a filter media pack structurally the same as filter media pack 16 shown for example in FIGS. 1 and 43 but for illustrative purposes only two of the pleat panels are shown and further, the pleat panels are separated and pivoted away from each other for illustrative purposes to better convey concepts to the reader.

In this embodiment, two separate tab structures are provided, although embodiments may include none or only one of the tabs.

One type of tab are the seal support tabs 482 that are bonded via mechanical or adhesive, pressing or other bonding attachment to flat pleat panels 472. Support tabs 482 project outwardly from opposed side edges 80, 78 of the filter media sheet to support a housing seal 484 that would extend in a continuous annular loop much like the annular rectangular housing seal shown for FIG. 36 for example. The housing seal 484 is integrally bonded to both the seal support tabs 482 as well as integrally bonded preferably to both the embossed pleat panels 70 and flat pleat panels in the finished media pack (recalling that the panels are pivoted away and separated only for illustrative purposes in FIG. 62). The seal support tabs include a first attachment portion 486 bonded to one of the pleat panels (in this case the flat pleat panel 80); and a seal support portion 488.

The seal support portion 488 may include irregularities and not be planar to have seal bonding enhancement to prevent seal delamination.

For example, the seal support portion 488 may include holes through which the seal material of the housing seal 484 flows during formation. For example the housing seal may be molded from polyurethane that flows through the holes 490.

During formation of the housing seal 484 and when the seal material is yet uncured, and in a fluid state, the seal support portion 488 of the seal support tabs are embedded in the seal material of housing seal 484 as well as portions of the opposed side edges 78, 80 of the sheet and across the first and last end panels of the pack whether they be flat panels or embossed panels to complete and form an annular surrounding periphery of the pleated filter media pack.

It is preferred that the seal support tabs 482 are formed of a more rigid material than that of the filter media sheet 12 to provide for additional seal support and attachment. For example the tabs may comprise plastic, paperboard, or metal material.

While only one flat panel 72 is illustrated it will be understood that the various flat panels or alternating flat panels if desired and also if desired embossed panels 70 may also include and have the seal support tabs 482 attached thereto. Such that a variety of seal support tabs may extend in an array around the rectangular periphery of the media pack.

Additionally, a second type of tab is provided in the form of pleat support tabs 492 that include a first wing 494 and a second wing 496 connected by hinge 498. It can be seen that the hinge is positioned over the pleat tip 500 and serves to fasten and provide for additional support at the pleat tip regions where the embossments merge or diminish in size as they merge into the pleat tip. The wings 494, 496 are pivotal about the hinge 498 and are cinched and fastened together by a suitable fastener such as rivet 502 that may be pressed and snap-fitted into a hole 504 (or in alternative to snap fit, the other end of the rivet deformed to provide an enlarged head once pressed through hole 504).

It will be understood that in a finished pleated filter media pack, the pleat tip 500 and fold will be completed such that the corresponding flat pleat panel 72 and embossed pleat panel 70 will extend parallel with each other in the context of a filter made according to this arrangement and as such the wings 494 and 496 will also extend parallel to each other when the rivet 502 is snap-fitted or otherwise secured within hole 504.

It will also be understood that the pleat tips 500 at both upstream and downstream flow faces may be cinched together with pleat support tabs 492 even though FIG. 62 shows that the pleat support tabs only at one of the pleat tips and flow faces provided thereby. Further, at either or both flow faces, all of the pleat tips 500 may be fitted and cinched with pleat support tabs 492 or alternatively alternating or selected pleat tips 500 may be fitted with pleat support tabs depending upon where additional cinching and support is desired.

Figure 66:
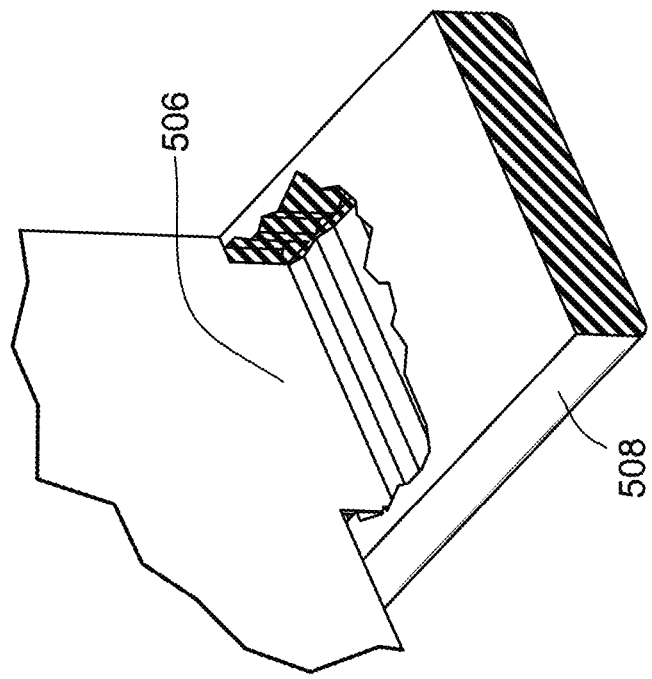
FIG. 66 is an enlarged view of a portion of FIG. 65 taken about circle 66.
Figure 65:
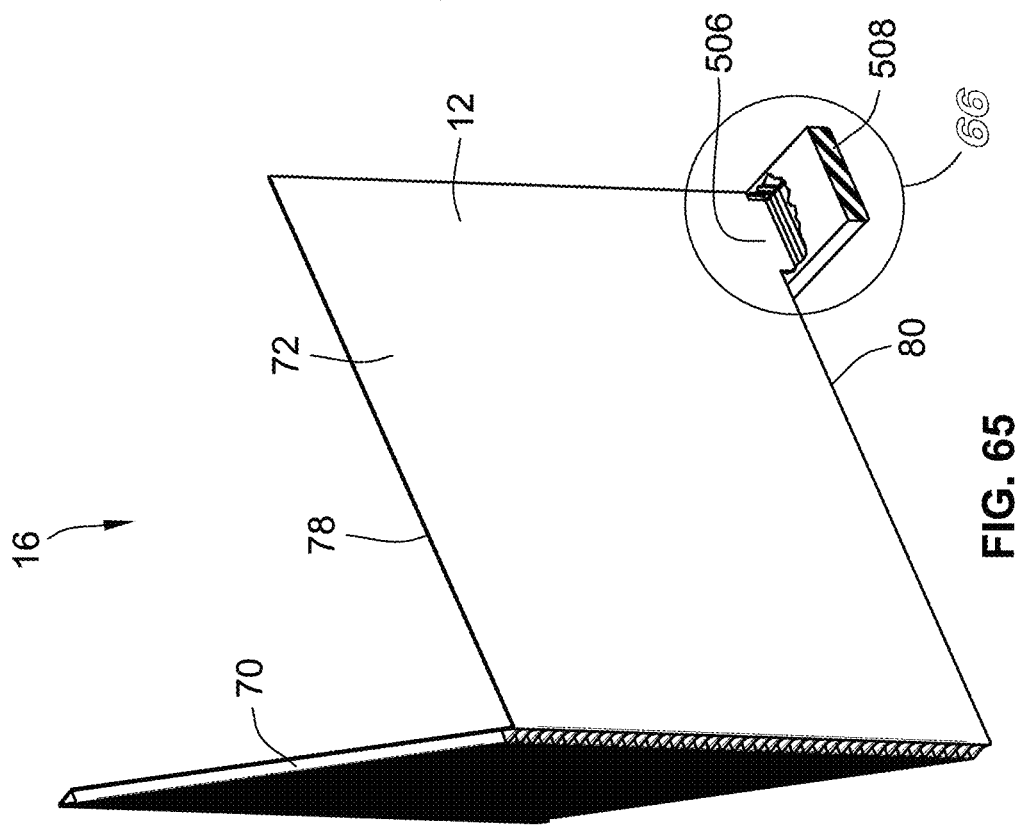
FIG. 65 is an isometric view of two panels of a pleated filter media pack where the filter media sheet has been formed by the press line assembly of FIG. 1 and wherein integral tabs have been formed into the filter media shape and that are embedded within an elastomeric seal (that would be understood to form a continuous loop for a housing seal such as a rectangular or annular shaped loop), with the adjacent pleat panels being shown rotated and pivoted away from each other for illustrative purposes.

Turning to FIGS. 65 and 66, the filter media package 16 is additionally shown to include a trimmed edge that may be along one or both side edges 78, 80 that defines an integral tab 506 formed into the filter media sheet 12. Thus, the tab 506 is formed of the filter media. The integral tab 506 is another form of a seal support tab but in this case it is integrally formed and projects outward from a remainder of the side edge 78 and/or 80. By projecting outward, the integral tab can more readily be embedded within a molded housing seal 508 during the formation of housing seal 508 prior to curing of the housing seal and when it is still in a fluid state. Again the housing seal 508 would also extend around a periphery of the completed filter media pack much like the housing seal shown for FIG. 36 for example. Housing seal 508 may not extend in a diagonal or skew relative to the inlet and outlet flow face but may extend in the same plane as the inlet and outlet face as illustrated in this embodiment and as such for the embodiment shown in FIG. 64.

Figure 67:
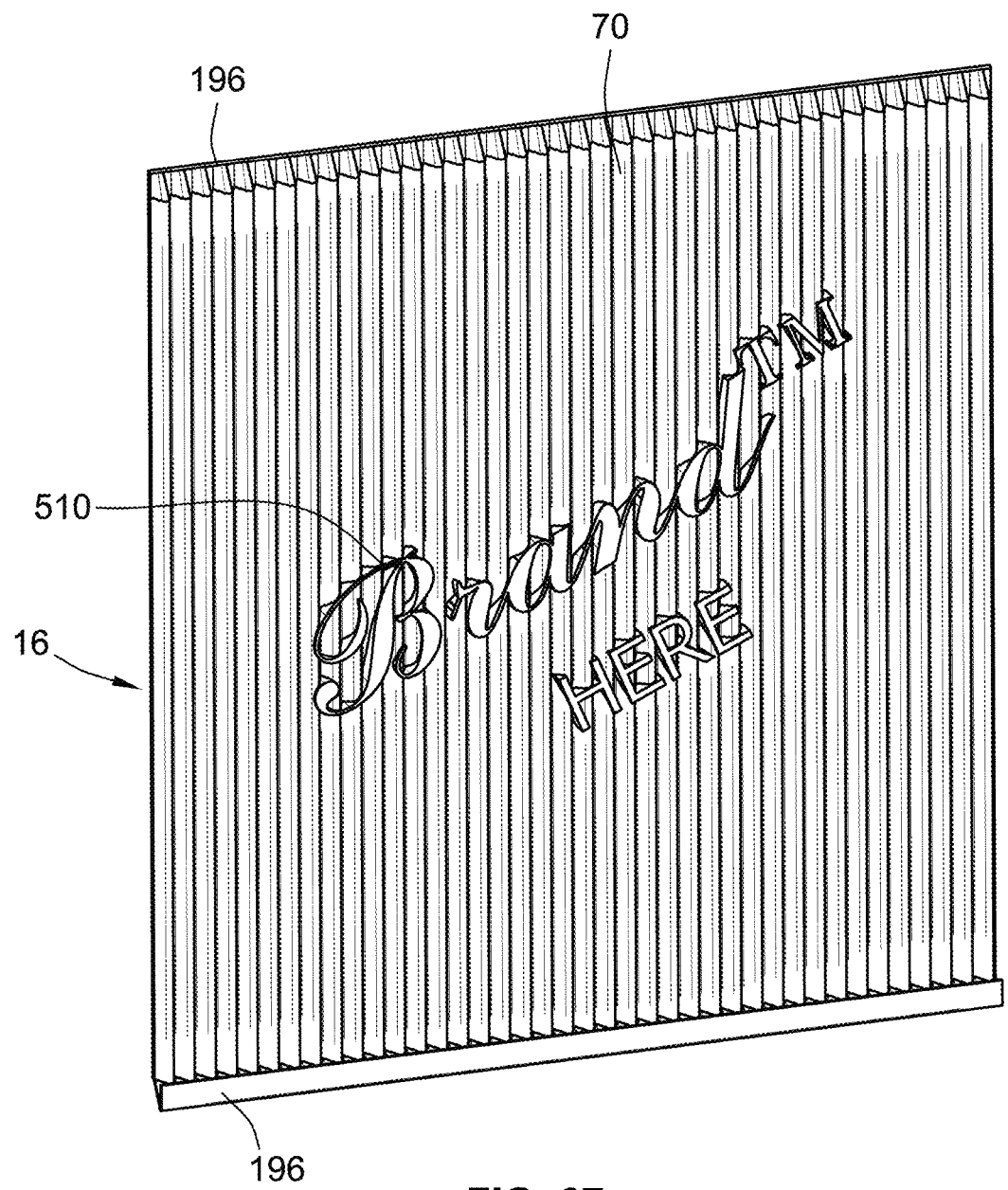
FIG. 67 is an isometric view of a side of a pressed pleated filter media pack made by the press assembly of FIG. 1 and wherein some of the embossments formed also include an embossed graphic such as a written statement for trademark branding or other information.
Figure 68:
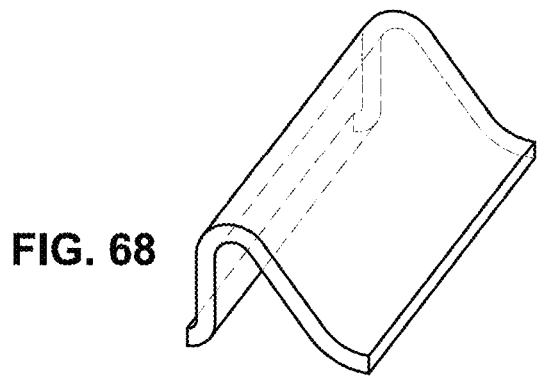
FIGS. 68 and 69; 70 and 71; and 72, 73 are three sets of different isometric and end view profiles of portions of filter media sheets showing different embossing patterns and profiles that may be formed into the filter media sheet and used in any of the embodiments disclosed herein.
Figure 69:
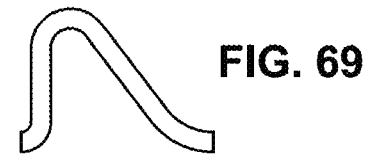
Figure 70:
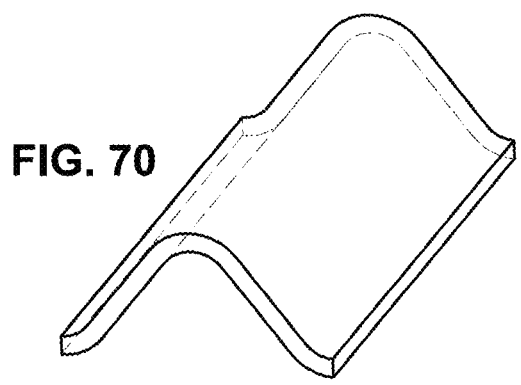
Figure 71:
Figure 72:
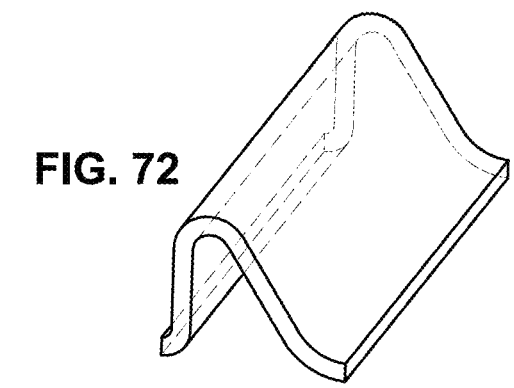
Figure 73:
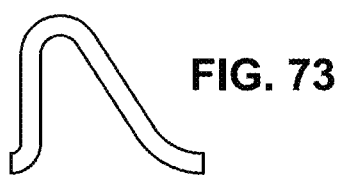
Figure 74:
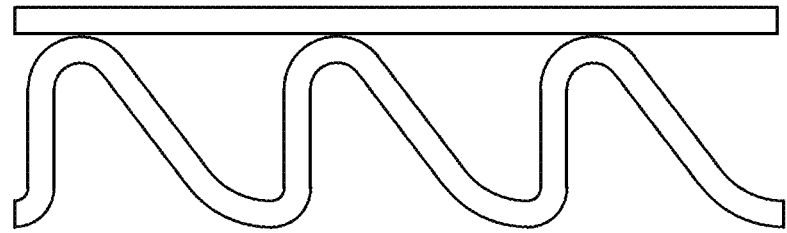
FIG. 74 is an end view of a portion of a pressed pleated filter media pack having an embossed panel with grooves according to one pattern that is attached to and abuts an unpressed planar panel formed into the overall sheet.

In FIG. 67, the filter media pack may be the same filter media pack 16 as shown in prior embodiments but additionally includes pressed therein a graphic and brand 510 that provides at least one of brand identification (e.g. trademark), an indication of flow direction, and installation information filter media parameters, and/or part numbers. This may convey important information to the mechanic, customer or other user of the filter media pack 16. This may be imparted simply on one of the exposed end panels or may be conducted throughout the filter media sheet. When it is done on the end panels it may be conducted by a separate press plate that may be interchanged during manufacture with the embossed press plate at press 28 or employed in a separate press station similar to press 28 positioned downstream of the press and in series with the press shown in FIG. 1. The brand may take the form of an embossment or may also take the form of flattening of a previously formed embossment but this is advantageously formed via pressing operation.

It will be appreciated that such information such as the branding and some of the other embossment features shown herein may not readily be formed via circular rolls.

Further, press plates being planar are much less expensive than embossing rolls and thus using press plates provides for additional advantages over using rolls in embodiments. Many different press plates of different shapes sizes and configurations can inexpensively be made and interchangeably used in the various press assemblies and line embodiments discussed herein.

In the FIG. 67 embodiment, it is shown that the brand 510 also takes the form of an embossment but again it is noted that it may simply be stamped flat and flatten the embossments previously formed rather than being an embossment. Thus this provides another type of feature in addition to embossments and score lines that may be pressed into the filter media pack using stamping dies. The brand forms a type of graphic that can readily be understood and convey useful information to an end user, customer or other interested party.

FIGS. 68-79 are illustrated to show different types of embossments and that not all embossments need to be uniform or identical and further that embossments may nest within each other. Any of these embossment structures may be employed and formed into the stamping emboss plates and into the corresponding filter media sheets in the various embodiments of filter media packs and embossed sheets disclosed herein. Further, these images show close-up images of the embossments to show that the embossments may define a projection on one side of the filter media sheet and thereby on the other side of the filter media sheet a groove. Various patterns are shown to include saw tooth pattern, offset patterns, symmetrical patterns, and nesting patterns as well as different heights, widths and configurations. Additionally, the embossments also may define and provide grooves between adjacent embossments.

As used herein, the term embossment is meant to be broad to generally include a structure that stands out in relief. Preferably the embossment will include and provide for grooves as discussed herein in the cue of a filter media sheet which typically has a predetermined caliper thickness.

Figure 80:
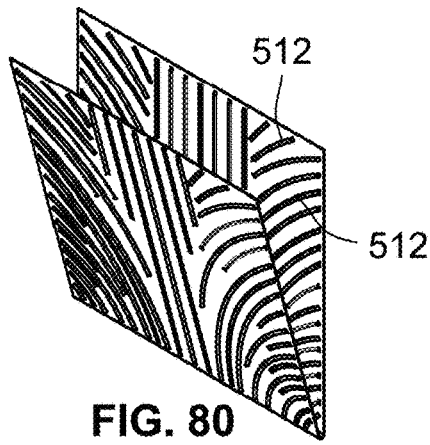
FIG. 80 is an isometric view of two panels of a pressed pleated filter media pack that is particularly useful for pocket pleats wherein curved embossments in the form of grooves are formed in conjunction with linear embossments in the form of grooves.
Figure 81:
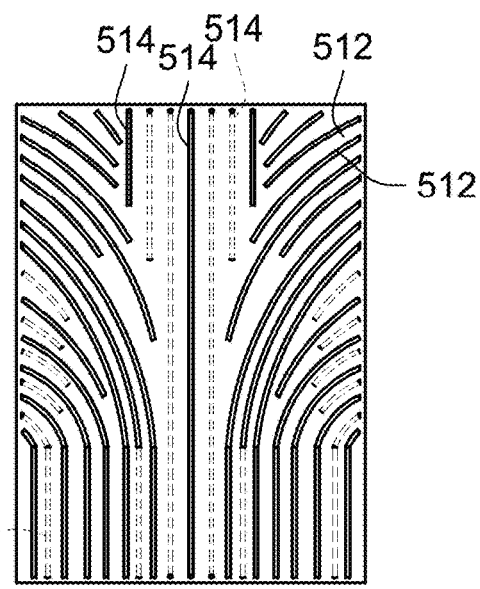
FIG. 81 is an isometric view of a panel similar to that shown in FIG. 80 but wherein embossments extend from either side of the plane of the panel.
Figure 82:
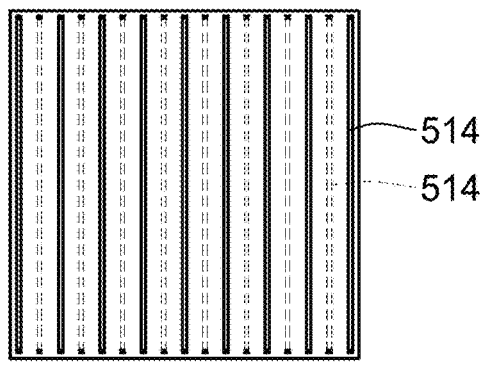
FIG. 82 is an illustration of a side of a pressed pleated filter media pack wherein the press panels have embossments projecting a full span of the pressed pleated filter media pack between an upstream face and a downstream face and wherein the embossments project from either side of the panels from which are embossed.
Figure 83:
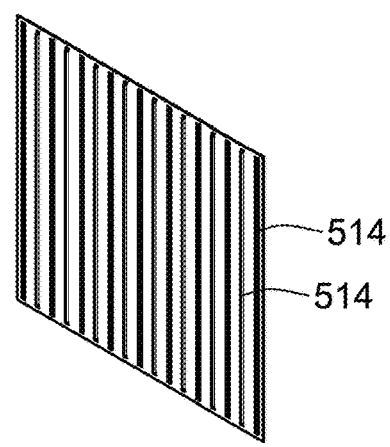
FIG. 83 is an isometric view of the embossed panel shown in FIG. 82 with the embossments projecting from both sides in opposite directions from the panel.
Figure 84:
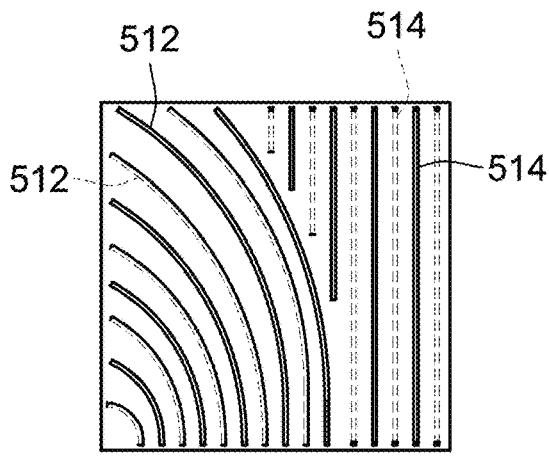
FIG. 84 is an end view of a pressed pleated filter media pack according to a further embodiment wherein a combination of longitudinal grooves and curved grooves are provided in combination and wherein some of the grooves project from the plane on one side of the embossed panels and other embossments project from the other side of the panels.
Figure 85:
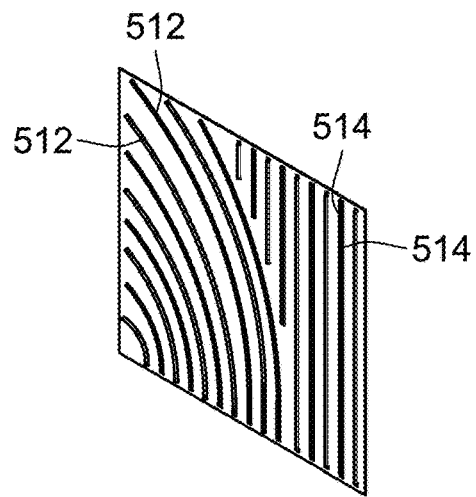
FIG. 85 is an isometric view of a panel used in the pack of FIG. 84 showing the embossments projecting from both sides of the embossed panel.

Turning to FIGS. 80-85, different configurations of embossments are possible with curved embossments 512 and linear embossments formed in the various different embodiments of pressed pleat panels shown for FIGS. 80-85. It will be understood that these embossed pleat panels of FIGS. 80-85 are usable in any of the filter media pack embodiments and some of them such as FIGS. 80 and 81 are particularly useful in association with pocket pleats to direct flow through an outlet face that extends not only over the plate tip but also along the side edges or seams of bonded adjacent side edges of individual pleat panels. Thus, the afore-described features of the prior embodiments are applicable to these embodiments and additional features and distinctions will be discussed with the understanding that these embossed panels may be used or substituted for the embossed panels of the filter media sheet employed in the other filter media packs.

In FIG. 80, the curved embossments 512 project from the pleat tip 516 at the inlet flow face and includes linear embossments 514 in the middle region. The curved embossments 512 that extend away from the linear embossments 514 as the curved embossments 512 extend from the pleat tip 516 at the inlet flow face towards the outlet flow face (or vice versa from the outlet flow face to the inlet flow face). This is particularly advantageous when using pocket pleats when air is permitted to flow not only axially through the media pack but also laterally through the media pack in the direction of the curves.

In each of these embodiments, dashed lines are used to indicate that embossments being curved embossments 512 or linear embossments 514 can project not only from one side of the plane of the filter media sheet but also from the other side of the filter media sheet. Additionally or alternatively the dashed lines may also be understood in another embodiment to be a separate embossed sheet immediately behind the front embossed sheet in which the curved embossments of the two sheets nest with each other (project in gap regions between embossments) and the linear embossments nest with each other which can be the case as was shown for example in FIG. 79.

Figure 86:
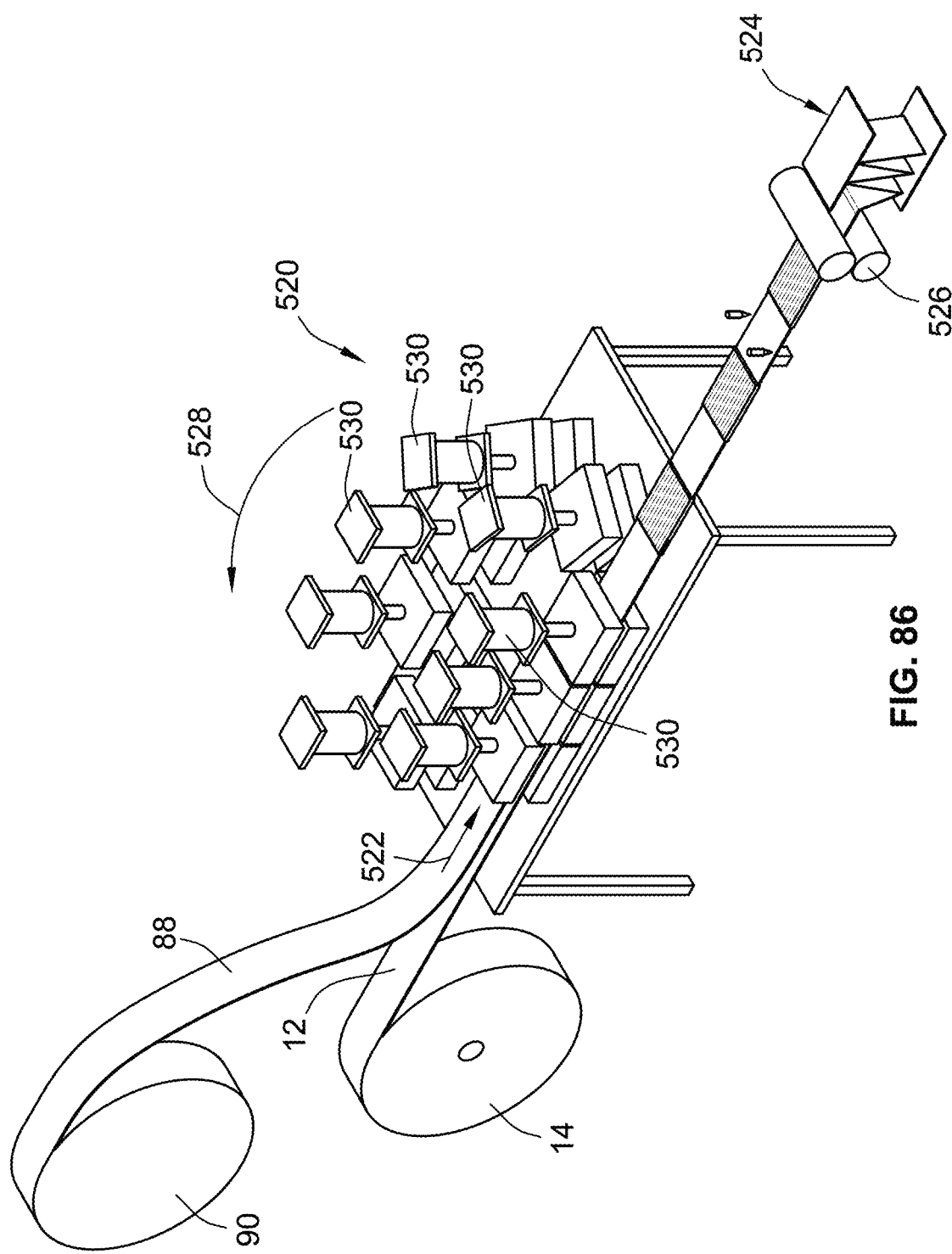
FIG. 86 is a perspective and partially schematic view of an alternative embodiment of a multiple press machine assembly and line for forming pressed pleated filter media packs.

Turning to FIG. 86, an alternative embodiment of a machine assembly line 520 is illustrated. It will be understood that the machine assembly line 520 is structurally the same as the machine assembly line 10 of the first embodiment shown in FIG. 1 such that the afore-described features of the prior embodiments discussed in association of FIG. 1 are also applicable to this embodiment including the optional features used for that embodiment. It will also be understood that this machine assembly line 520 may be used to form the various embodiments of pleated filter media packs of the various Filter media packs described herein and is usable for that purpose. As such, additional features and distinctions will be discussed and it is also understood that in this embodiment multiple presses are provided that may be used to provide for different types of embossments including two different types of embossed panels if desired.

In this embodiment the filter media roll 14 and its filter media sheet 12 along with optional laminate sheet 88 coming from optional laminate roll 90 are driven in a travel pack 522 from an upstream region to a plate collector in the form of pleater 524 which is schematically illustrated. In this machine assembly line 520 the filter media sheet 12 may be continuously driven along the travel path by advance rolls 526 and not stop intermittently or stop at all during processing, that is until filter roll 14 is exhausted and stoppage is necessitated for change-out or break-down. This is accomplished by an endless loop 528 of a plurality of presses 530 that are rotated along the endless path of the loop 528. The presses 530 may be similar to the press 28 as described in conjunction with FIG. 1 including all of its components including the ram, upper stamping die, lower stamping die and controls but in this instance the presses 530 are driven in the endless loop in the direction indicated in FIG. 86 and at the same speed as the filter media sheet along the travel path such that intermittent stoppage is not necessary. However this may also be used with intermittent stoppage if desired to allow for dwell time and may alternatively provide for the advantages of pressing different types of embossments into different panels as may be desired.

It is noted that part of the loop 528 that extends over the travel path 522 when the presses 530 are engaged in actively pressing the media is linear and travels parallel and at the same speed as travel path 522. Further, while the presses 530 are disengaged in traveling around the curvature of the loop, they may be disengaged and heated. Inactive presses along the loop may also have plates switched out to provide branding or other lengths of embossments or other features.

Additionally, the media advance conveying mechanism in this embodiment may be the presses itself and it may not be necessary to have the advance rolls 526 in that the presses and being driven in the endless loop and in engagement with the filter media sheet itself can drive and convey the filter media sheet along the travel path.

Optionally, adhesive applicators to apply adhesive such as hot melt may be used and further, a trim knife such as a water jet, laser, shear knife or cross-cut knife or other such knife may be used to cut and shape and slit the media as may be desired. This may be done on a continuous basis.

Optionally, the tooling plates of the presses 422 are heated and have multiple heat zones and may be also heated while disengaged from the filter media sheet.

Figure 87:
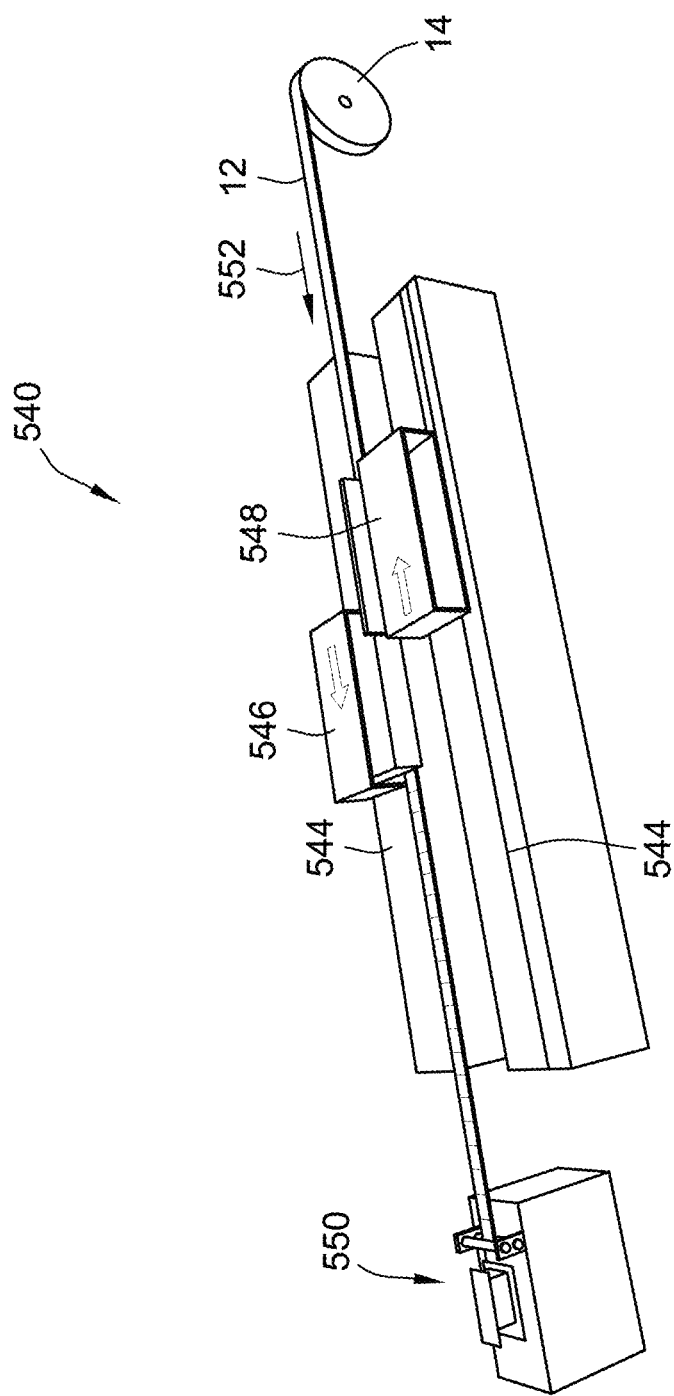
FIG. 87 is a perspective and partially schematic view of an alternative embodiment of a indexable press machine assembly and line for forming pressed pleated filter media packs.

Turning to FIG. 87, yet a further embodiment of a continuous process die press pleater and machine assembly line 540 is illustrated where it is understood that it is structurally the same and includes presses and its corresponding features as in the first embodiment shown in FIG. 1 and also able to form the various filter media packs of the various embodiments disclosed herein. However additional features and distinctions will be discussed with reference to this embodiment. In this embodiment the machine assembly line 540 includes a table having linear slides 544 that facilitate linear reciprocating movement of two indexable pleat press carriages 546, 548 (each of which may include one or more pleat presses if desired in series).

The filter media roll 14 and its filter media sheet are driven along a travel path 552 that is linear and extends toward a pleat collector in form of pleater 550 that is schematically indicated at the downstream end with the pleat press carriages 546 and 548 therebetween. It will be understood that each pleat press carriage incorporates and carries a press that is similar to press 28 as described in the first embodiment to include the upper and lower stamping dies and the electronically controlled rain. However in this embodiment, the pleat press carriages reciprocate along a linear path on the linear slides forward and backward parallel to the travel path 552. In this instance, pleat press carriage and its press are actively engaging and pressing the filter media and thereby engaged with the filter media sheet as it is being travelled along the travel path. The pleat press carriage 546 is moved at the same speed as the filter media sheet 12 along the travel path 552. Additionally, it will be understood that pleat press carriage 546 may not just include one set of emboss and score plates but perhaps a series of several presses and corresponding upper and lower emboss plates along the line to press several pleat panel sections at the same time or in sequence.

While the press carriage 546 is engaged and actively pressing and advancing the media, the pleat press carriage 548 is disengaged and traveling in a reverse direction to be at a point where it can start pressing panels immediately behind the engaged pleat press carriage 546 that is traveling forward with the media sheet. Once the pleat press carriage 546 completes its pressing, it will disengage and also then travel backwards while at the same time or about the same time the pleat press carriage 548 that is disengaged will become engaged and start to press and then move along the travel path 552, at the same speed as the advancement of filter media sheet 12. In this embodiment, the press carriages themselves when engaged may drive the filter media sheet along the endless path and may do so in a continuous non-intermittent fashion thereby increasing production in capacity. This also may be outfitted with the various optional features of the prior embodiments discussed the machine assembly lines 10 or 520.

Figure 88:
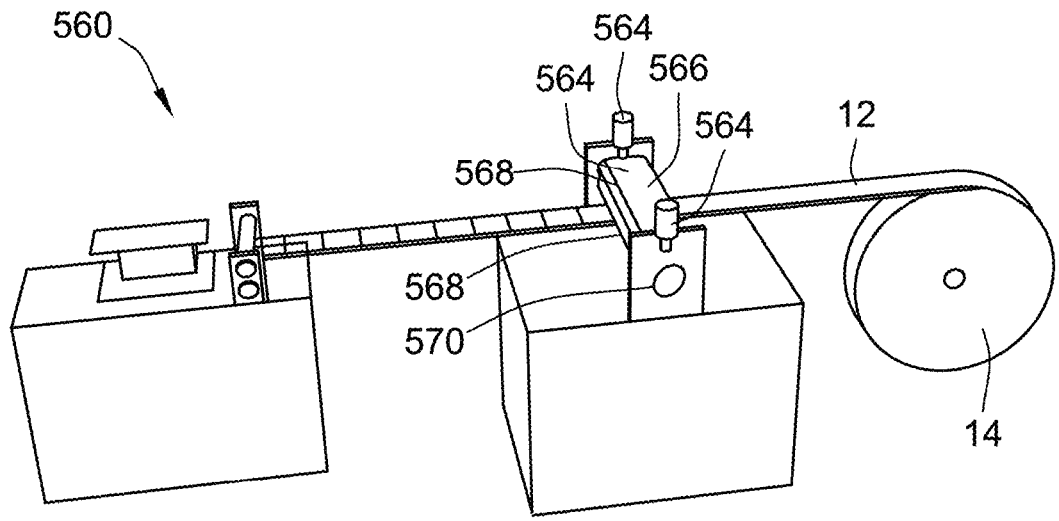
FIG. 88 is a perspective and partially schematic view of an alternative embodiment of a rotating lobbed press machine assembly and line for forming pressed pleated filter media packs.

Yet a further embodiment of a machine assembly line 560 is illustrated in FIG. 88 which is structurally the same as the embodiment shown in FIG. 1 and may include also the features desired in FIG. 1 such that the afore-described features of the embodiments associated with FIG. 1 are applicable to this embodiment. Further, this machine assembly line 560 is also usable in producing the filter media packs according to the various embodiments discussed herein.

In this embodiment the filter media sheet 12 coming off filter media roll is pressed by a different Form of press having lobed nip presses that are driven vertically into and out of engagement via a ram provided by hydraulic or electrical linear actuators 564. The lobe nip presses include stamping dies that have at least one planar section 566 and thus are an emboss plate, and may have rounded edges or lobed sections 568 the lobed nip rollers may be driven by the linear actuators 564 to not only facilitate linear pressing but additionally, rotary actuators 570 may rotate the lobe nip presses 562 when not in a dwell press mode to advance the media and score the media in the radius lobed sections 568 that can define scoring features along the lobes. It is noted that in each stamping die the planar section may be embossed both above and below such that as it rotates the other press emboss plate is used on the other side of the stamping die.

Figure 89:
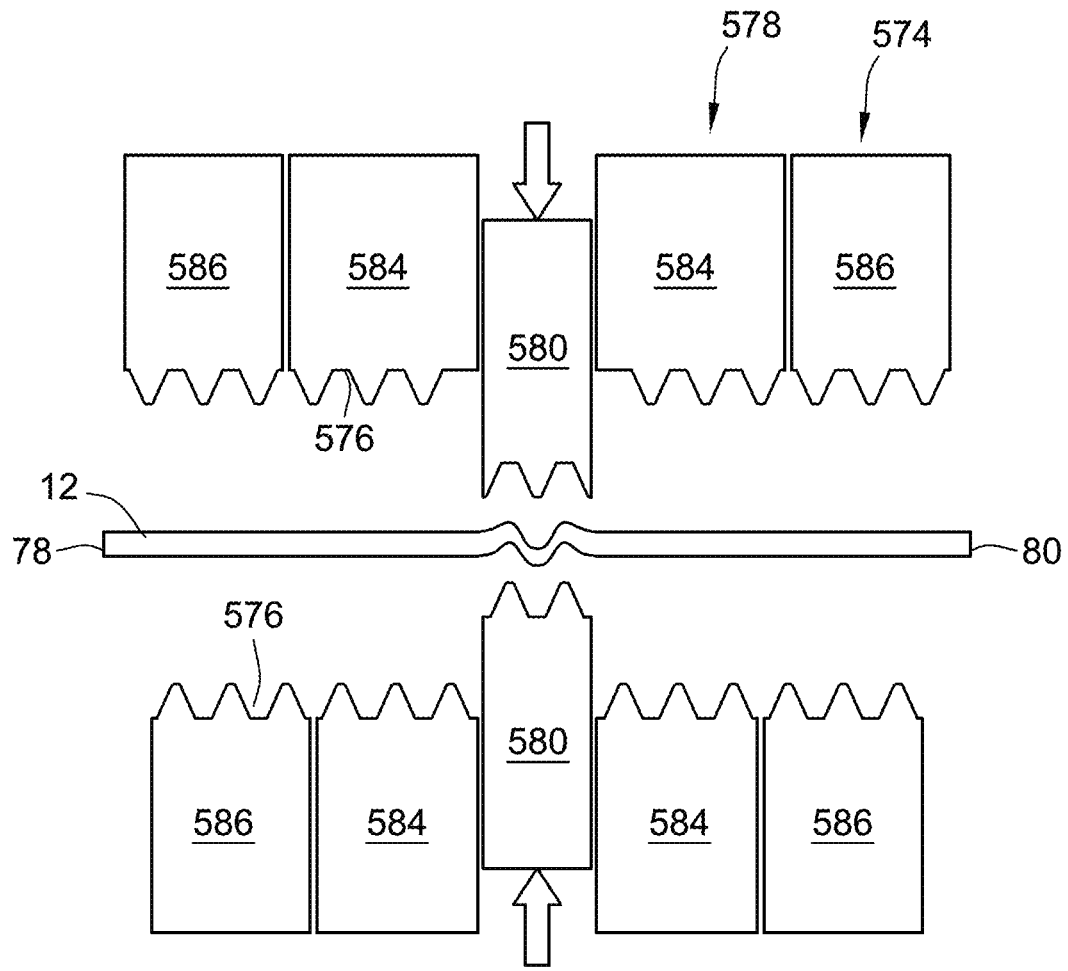
FIG. 89 is partially schematic, cross sectional view of an alternative embodiment of a progressive die arrangement that can be employed in any of the presses shown in FIGS. 1, and 86-88 according to various embodiments.
Figure 90:
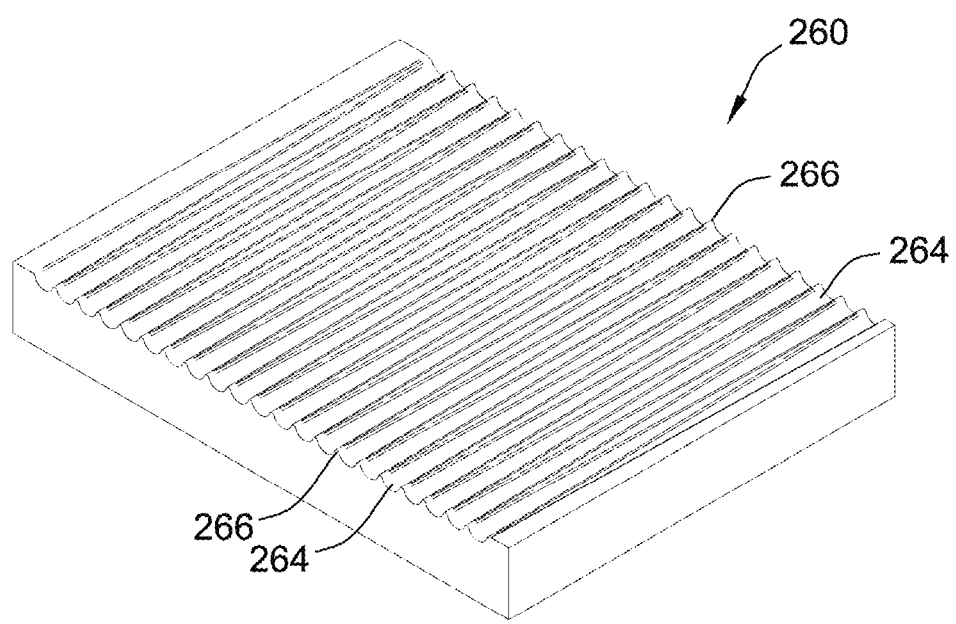
FIGS. 90, 91 and 92 are isometric top and end views of an alternative embodiment of an embossing plate for forming tapering grooves that is usable in the press assembly in line of FIG. 1.
Figure 91:
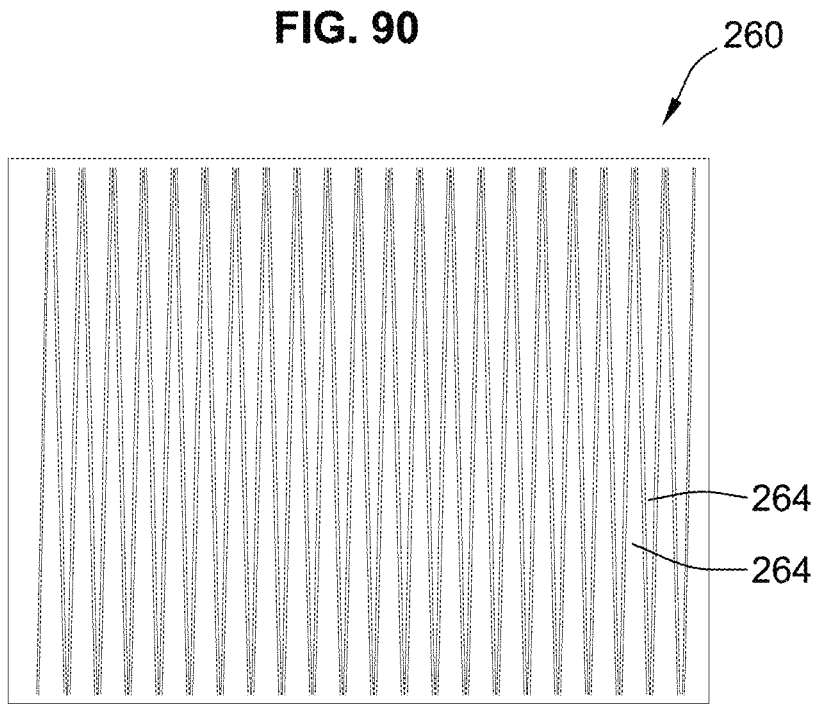
Figure 92:
Figure 93:
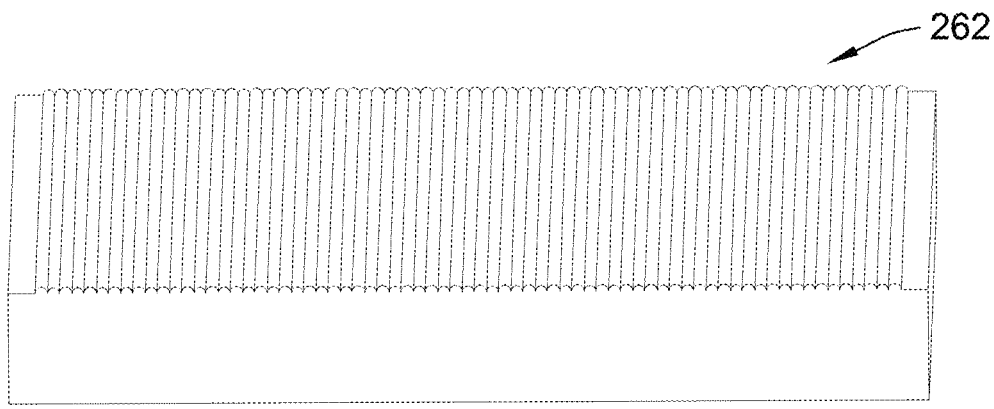
FIGS. 93, 94 and 95 are isometric bottom and end views of a top emboss plate usable with the bottom emboss plate of FIGS. 90-92 for forming tapering grooves.
Figure 94:
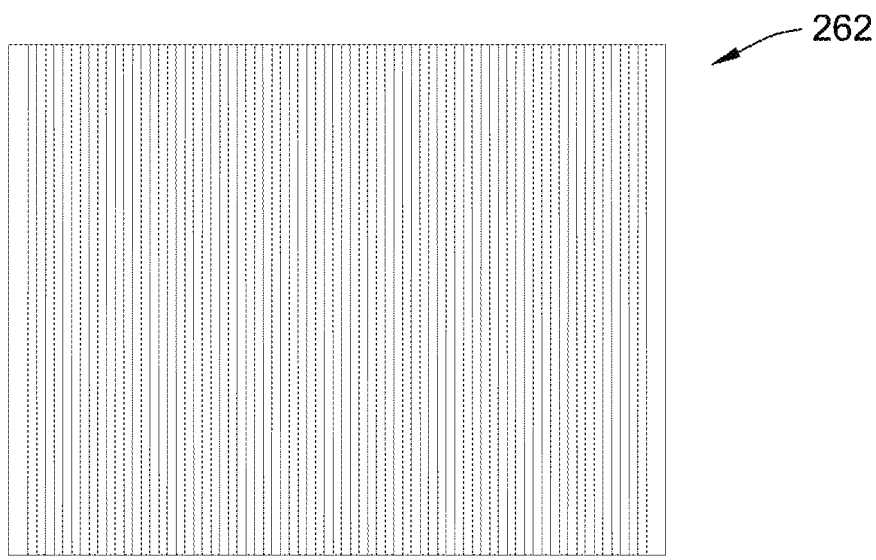
Figure 95:
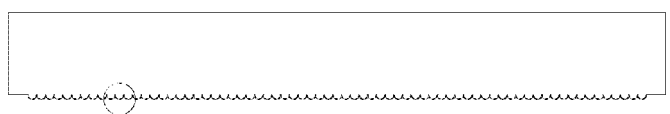
Figure 96:
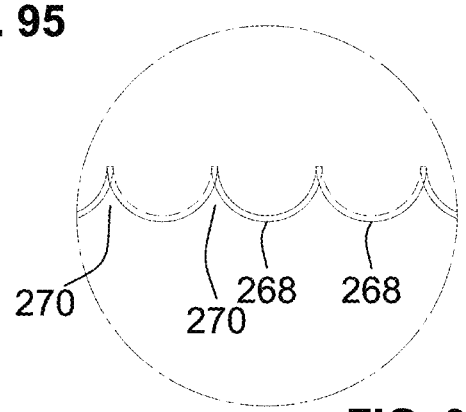
FIG. 96 is an enlarged view of a portion of FIG. 95 taken about the indicated circle.

FIG. 89 illustrates a progressive stamping die arrangement 574 that may be used in any of the presses of the embodiments described herein such as used in machine line assemblies 10, 520, 540, and 560 for example. As such it will be understood that the description and disclosure pertaining to those embodiments are also applicable to the progressive stamping die arrangement 574 of this additional embodiment such that distinctions and additional features will be discussed.

In the progressive stamping die arrangement 574, the embossment features 576 are spread out among a plurality of progressive stamping dies 578 that extend transverse to the flow path of the filter media sheet along its travel path (see e.g. side edges 78, 80 of the filter media sheet 12). It is noted that in some embodiments, especially where the embossments are deep that stretching of the filter media sheet and the fibers may be realized to provide for increased air flow permeability however, if stretching is not desired and deep embossments are at the same time desired then the progressive stamping die may be used as it tends to gather and move in the filter media sheet progressively rather than stretching and may also be used to compress instead in an embodiment. Specifically, a first set of central stamping dies 580 are first driven into engagement which gather the filter media sheet and move outer portions 582 inward thus moving the opposed side edges 78, 80 inward slightly as the embossments and the corresponding groove features are being formed into the filter media sheet. After the central stamping die 580 is engaged the next outside guard stamping dies 584 are engaged which tend to draw and pull the outer portions 582 and the corresponding side edges 78, 80 inward even further again with little or no stretching and then the outermost stamping dies 586 are subsequently engaged to finish off formation of the embossments in the filter media sheet.

With the sequential engagement of the progressive stamping dies from the central stamping die outward to the guard stamping dies 584 then the outermost stamping dies 586 a progressive stamping of the filter media sheet is accomplished that does not necessarily have to stretch the filter media sheet and that may also be used to compress the filter media sheet if desired to reduce air flow permeability and/or increase efficiency of the filter media sheet.

Turning to FIGS. 97 and 98, an additional embodiment or features for the pleated filter media packs 16 are illustrated that may be optionally used with the filter media pack 16. Specifically, these features discussed below may be used in the filter media packs of any of the embodiments of filter media packs discussed herein and may be accomplished by welding (such as via ultrasonic welding or other melting of media together) and/or by way of dispensing adhesive beads and/or pressing. In particular, these features may be accomplished by way of the plunge welder 84 and anvil 86 discussed in association with FIG. 1, other welding apparatus or by way of the adhesive applicator 82 which may dispense adhesive dots, lines at select locations on the filter media sheet.

As shown the lifter media pack 16 is shown to include point bonds 100 which may be at the pleat tips as shown in FIG. 97 as well as at intermittent locations between pleat tips as shown additionally in FIG. 98. Again these may be ultrasonic welds or alternative placement of adhesive bead dots that may optionally be pressed together. This provides for additional structural integrity and at the pleat tips may cinch the pleats together to provide a wider mouth to allow for additional air flow through the flow face defined by the pleat tips such as shown in FIG. 97.

Additionally, this embodiment shows that embossed pleat panel 70 may be seamed to adjacent flat pleat panels 72 in pairs to form pocket pleats 604 with three pocket pleats being illustrated in the embodiment of FIG. 97. In this embodiment in addition to being able to flow through the flow face defined by pleat scores 68, and thus flow in a direct manner, the air flow may additionally flow sideways or laterally out between the open regions 606 defined between adjacent pocket pleats 604. The seams 602 may also be formed either through adhesive application by forming and laying a continuous bead and then pressing the adjacent pleat panels together when forming the pocket pleats and pleating or by ultrasonically welding. It is also understood that while only one side is shown in FIG. 97 for side edge 78 that it is also applicable and that the same seam 602 would also be formed on the other side or side edge 80 (not shown in FIG. 97 but understood from other figures).

It is additionally noted that the point bonds 6110 will also prevent and limit relative movement between adjacent pleat panels to provide for structural support and prevent collapsing or blinding off of the filter media sheet when subjected to an application where substantial air flow is run through from the inlet face to the outlet face.

While not being limited thereto, certain examples and performance are described below. While the press can be used to process a variety of conventional filter medias that may include polymers, glass and/or cellulose as described above and thereby provide corresponding media packs with embossments and each can have advantages over conventional pleat packs, certain performance advantages can be obtained by use of medias that include polymer materials with the press. For examples, polypropylene media grade A2 and polyester media grade LFP 2.0 have been found to have sufficient to excellent processability with the press of FIGS. 2-13. The selected medias were chosen based on how well they were processed and how well they performs in system level lab tests. These medias may be commercially available melt blown medias from IREMA-Filter GmbH and sold under the IREMA brand, having an business address at An der Heide 16, D-92353 Postbauer-Pavelsbach, Germany. The characteristics of these medias are as follows in the TABLE 1 below, but it is contemplated that similar medias or variations of these grades will perform similarly. Additional high performance medias include Irema LFP 2.3 (polyester), Irema LFP10 (Polyester) available from Irema as noted above, and Grade 30XzPN/DG7513 (Glass/Polypropylene) which is available from Transweb, LLC of Vineland, New Jersey that may be useable in embodiments.

TABLE 1

Flat and embossed sheet parameters

|  | Irema A2 | Irema LFP 2.0 |
|---|---|---|
| Material | Polypropylene | Polyester |
| Mold/Press Temperature (of press plates in FIGS. 2-13 in degrees Fahrenheit) | 240 | 335 |
| Press Time | 5 seconds | 5 seconds |
| Flat Sheet Basis Weight (gsm) | 202 | 211 |
| Embossed Basis Weight (gsm) | 171 | 210 |
| Stiffness Flat (mgs) | 264.1 | 197.38 |
| Stiffness Embossed (mgs) | 954.6 | 654.9 |
| Mean Flow Pore ($\mu$) | 117 | 10.6 |
| Largest Detected Pore ($\mu$) | 41.8 | 31.4 |
| Mean Flow Pore—Embossed($\mu$) | 13.2 | 14.0 |
| Largest Detected Pore—Embossed($\mu$) | 52.8 | 43.6 |
| Permeability Flat (cfm) | 58.26 | 36.5 |
| Permeability Embossed (cfm) | 140.20 | 96.43 |
| Embossment Height Retention | 85% | 93% |
| Efficiency Flat |  |  |
| 0.3-1.0$\mu$ % | 98.66 | 92.30 |
| 1.0-3.0$\mu$ % | 99.69 | 96.24 |
| 3.0-10.0$\mu$ % | 99.98 | 99.51 |

TABLE 1-continued

Flat and embossed sheet parameters

|  | Irema A2 | Irema LFP 2.0 |
|---|---|---|
| Efficiency Embossed |  |  |
| 0.3-1.0$\mu$ % | 95.00 | 68.93 |
| 1.0-3.0$\mu$ % | 97.53 | 76.29 |
| 3.0-10.0$\mu$ % | 99.22 | 92.83 |
| Dust Holding Capacity Flat (g/100 cm$^2$ @1000 Pa) | 0.865 | 0.8145 |
| Dust Holding Capacity Embossed (g/100 cm2 @1000 Pa) | 1.637 | 1.824 |

Using these medias and embossing as described above using the embodiment of FIGS. 2-13 and as described in Table 1 (with the plates having an emboss groove depth of 0.18 inch and an emboss groove width of about 0.3 inch for the A2 example, and an emboss groove depth of 0.125 inch and an emboss groove width of 0.165 inch for the LFP2.0 example), standard cuboid shaped pleated filter media packs (e.g. shaped like as shown in FIGS. 43, or FIGS. 36,37 or FIG. 1) were created having a height of 7.5 inches, a width of 7.5 inches, and a length of 8.2 inches (volume of 461 cubic inches). These media packs were compared to a commercially available Dortaldson® Brand G2 fluted filter media pack having a height of 7.9 inches, a width of 7.5 inches, and a length of 8.2 inches (volume of 487 cubic inches and designated as comparative "C1" example in Table 2 below). The following performance characteristics of these examples are detailed in Table 2 below.

TABLE 2

Cuboid Filter Media Pack Performance

|  | C1 | A2 | LFP10 | LFP2.0 |
|---|---|---|---|---|
| Filter Media Sheet Area (inch$^2$) | 12053 | 5299 | 5299 | 5332 |
| Challenge Flow Rate (SCFM) | 500 | 500 | 500 | 500 |
| Initial Pressure Drop (PSID) | 5.4 | 5.5 | 5.2 | 5.75 |
| Initial Efficiency (%) | 99.63 | 99.9 | 99.05 | 99.6 |
| Accumulative Efficiency (%) | 99.97 | 99.96 | 99.87 | 99.95 |
| Dust Holding Capacity (g) | 1528 | 1359 | 1128 | 1583 |
| Grams of dust/inch$^2$ of media | .13 | .26 | .21 | .30 |
| Volumetric Dust Holding Capacity (g/inch$^3$) | 3.1 | 2.9 | 2.4 | 3.4 |

A substantial performance advantage above can be seen in that substantially less filtration media sheet in terms of area is necessitated while achieving a similar efficiency, restriction and dust holding capacity and performance. As such, substantially less filter media sheet may be required in some embodiments to achieve similar results and greater dust holding per square inch of media sheet was obtained. For example, the above demonstrates that filter media packs can be formed having an initial efficiency of at least 99%, and a dust holding capability of at least 0.15 grams of dust/inch$^2$ of media, more typically at least 0.2 grams of dust/inch$^2$ of media and in some embodiments at least 0.25 grams of dust/inch$^2$ of media.

For the flat and embossed sheets tests above as in Table 1 (and for any patent claims appended hereto that recite an efficiency and/or dust holding capacity for sheet performance), the testing was and can be conducted with a Palas MFP 3000 test stand with the following conditions in Table 3:

TABLE 3

| | |
|---|---|
| filter area: | 100.000 cm² |
| face velocity: | 5.8 cm/s |
| dust mass concentration: | 150.0 mg/m³ |
| dust/aerosol: | SAE fine A² |
| total volume flow: | 35.0 l/min |
| Dust load termination at | 1000 Pa increase. |

For the filter pack volumetric performance testing such as the cuboid filter media pack performance and tests for Table 2 above (and for any patent claims appended hereto that recite an efficiency and/or dust holding capacity for pack performance), the testing is pursuant to ISO 5011:2014 (i.e. the ISO test standard for Inlet air cleaning equipment for internal combustion engines and compressors—Performance testing), utilizing ISO fine test dust, at an air flow of 500 CFM, and dust load/test termination at a pressure drop or restriction of 30 inches of water.

Additionally, while the above embodiments are described as useful with advantages for pleated filter media packs, it will be understood that the press and methods disclosed herein may be used with other types of media packs beside pleated such stacked fluted media panels as those described in the background section (e.g. such as in U.S. Pub. No. 2014/0260139 entitled Rectangular Stacked Fluted Filter Cartridge to Merritt) and as such certain broader claims (for example claims that do not explicitly require pleats or pleated) that are appended hereto are meant to encompass such possibilities.

Figure 99:
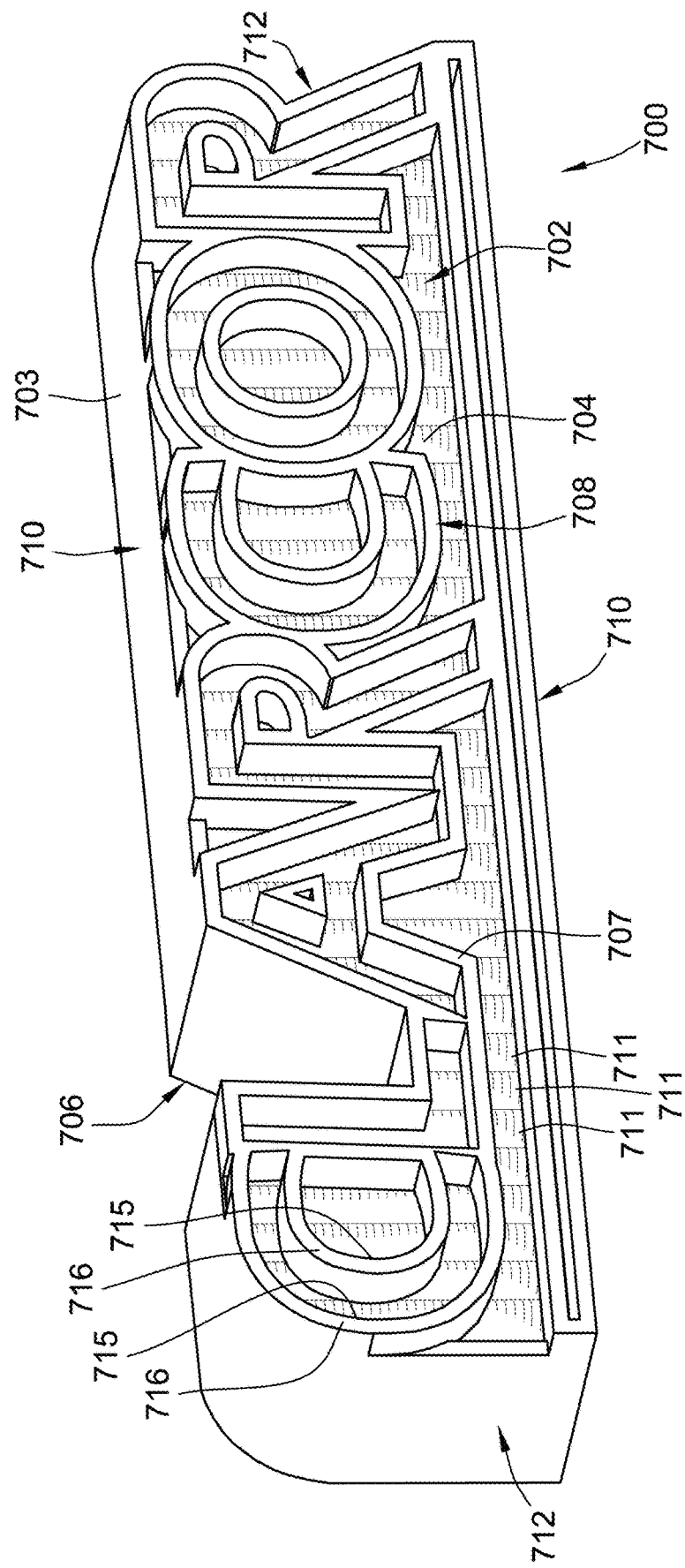
FIG. 99 is a perspective illustration of an embossed pleated filter media pack and frame, wherein the media pack is formed via the press of FIG. 1 or other press embodiments and together forms a brand to provide information to the consumer.

Additionally, another embodiment of filter 700 is illustrated in FIG. 99 in the form of an irregular shape to define a brand that provides at least one of brand identification, flow direction, installation information, filter media parameters, and part number. The filter 700 comprises a filter media pack 702 with an inlet face 704 and an outlet face generally indicate in the area of 706 (although the flow faces may be reversed with the inlet the outlet and the outlet the inlet as in other embodiments). The filter media pack is also preferably of the irregular shape to define a brand that provides at least one of brand identification, flow direction, installation information, filter media parameters, and part number.

Preferably, the filter 700 further comprises a frame 708 over the filter media pack 702 and supporting the filter media pack 720, the frame including alphanumeric letter characters to form said brand, which in this case spells the brand name CLARCOR as seen in FIG. 99.

The frame 708 may take the form of and thereby include a grate 707 forming the alphanumeric letter characters, with the grate 707 over one of the inlet face 704 or outlet face 706 of the filter media pack.

Preferably, the frame 708 also includes a surrounding sidewall 703 projecting from the grate 707 toward the outlet face or inlet face in surrounding relation of the filter media pack.

Typically, the filter media pack will comprise a plurality of filter media panels 711 having a depth projecting between the inlet face and the outlet face. The filter media panels 711 also have a width extending between opposed sides (see sides 710) of the filter. As can bet seen, the filter width between opposed sides 710 is variable and not constant. Further, the filter media panels 711 are in an array (one panel disposed over the next panel in a linear array in this instance) between opposed ends 712 of the filter. It is seen that the opposed sides 710 extend transversely and preferably perpendicularly between ends 712. To accommodate the shape variance of the branding, the filter media panels 711 have different widths between opposed sides to form at least part of a shape of the brand.

Additionally, it also may be that as shown that the adjacent the first and second ends 712, the filter media panels 711 are of different widths such that a span of the filter between opposed ends 712 varies as the ends 712 project from a first of the opposed sides 710 to a second of the opposed sides 710.

As is the case in earlier embodiments, the filter media panels 711 are pleated and form a pleated filter media pack with trimmed edges form the different widths between opposed sides, such as via use of the trimming tools shown in FIG. 1 or FIG. 86.

Another aspect of this embodiment is that a filter frame providing brand identification. The frame 708 may be in the form of and may therefore include grate 707 disposed over the filter media pack having voids 715 to allow airflow and members 716 around the voids and in the form of at least one alphanumeric character to provide a brand that provides at least one of brand identification, flow direction, installation information, filter media parameters, and part number.

As per above, the span of the filter media pack is preferably variable and helps form the shape of at least one alphanumeric character.

Also preferably, a plurality of alphanumeric characters are provided (e.g. to spell CLARCOR) and a span of the filter media pack is trimmed to help form the shape of at least 2 of the alphanumeric characters.

Finally, while not shown, it is contemplated that a gasket or seal projecting from the outline of the frame at the inlet or outlet face may be provide and extend in cantilever fashion to form a radial or axial seal, or alternative a seal may be provide in surrounding relation of sidewall 703 and supported thereby to provide for an axial pinch gasket or a radial seal.

Returning with reference to Table 1, it is noted that the embossed panels of the sheet are much stiffer than the flat or unembossed panels of the sheet as the "Stiffness Flat" and "Stiffness Embossed" are provided for different sections of the sheet. It is noted these stiffness measurements herein are measured using standard "bending resistance of paper (Gurley-type tester)" protocols and standards established under TAPPI 2011 published standard T 543 om-11. A length of 63.5 mm (2.5 inches) and width of 50.8 (2 inches) was used (e.g. cutting portions from the respective different pressed sections and different panels for testing) and therefore should be used. Using a standard Gurley-type tester (in this instance a Gurley Bending Resistance Tester, specifically Model 4171E, made by Gurley Precision Instruments of Troy, NY), a stiffness reading was thereby generated and reported in Table 1, which provides for reading comparison of relative stiffness.

From Table 1, it can be observed that one panel can be configured to be much stiffer than the other panel in a pleated sheet configuration to provide different sections of the pleated sheet with different strength characteristics. More specifically, the embossed sheet can provide bridge strength and maintain the integrity of the pleated filter pack and thereby better prevent collapsing or reduce distortion or blinding off of media during operation thereby maintaining high capacity for filtration and dust removal while reducing pressure drop.

Accordingly, preferably, one panel (such as a portion of the embossed panel) includes a first stiffness that is at least 2 times as great, more preferably at least 3 times as great as another panel (such as a portion of the flat or otherwise unembossed panel adjacent the embossed panel in a pleated sheet configuration embodiment).

By controlling the depth of the embossments, greater or lesser stiffness variance between different portions provided by different panels can be realized. For example, deeper embossments than those used for the medias in Table 1 will provide even greater stiffness and thereby bridge strength, while shallower embossments than those used for the medias in Table 1 will provide less strength. While the upper limit may not be critical, generally for the range of embossment depths, the stiffness of the first panel (e.g. the embossed panel or a portion thereof) will be between 1.5 and 10 times the stiffness of the second panel (e.g. the unembossed or flat panel, or a portion thereof). In some instances all panels may be embossed, but the embossing panels may be different from one panel to the next, and/or one panel may be more deeply embossed or differently embossed or patterned than the other that may be realized by the press techniques herein.

Further, preferably the first pleat panels are entirely embossed over the entire panel (e.g. covering, at least 90%), wherein the second pleat panels may either be only partially embossed, or flat or not embossed at all). This provides notably different strength characteristics among adjacent panels while different filtration characteristics also may be provided in different panels.

Accordingly, any of the embodiments may include a feature whereby multiple pressed sections include a first pressed section with a first portion with a first stiffness that is at least 2 times as great as a second stillness of a second portion of a different second pressed section.

Any of the embodiments that have a pleated sheet arrangement with pleat panels may therefore include pleat panels including first pleat panels and second pleat panels, the first pleat panels including a first portion having a first stiffness that is at least 2 times as great as a second stiffness of a second portion of the second pleat panels.

Optionally, in such embodiments with different stiffness regions among different portions, the first portion is embossed and the second portion is unembossed.

Further, in embodiments, the first pleat panels may entirely be embossed, and wherein the second portion of second pleat panels may be entirely unembossed.

Most preferably, in many of the embodiments, the first stiffness is at least 3 times as great as the second stiffness.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to.") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method of forming a filter media pack with a filter media sheet, comprising:
   pressing at least one feature into the filter media sheet repeatedly with a stamping press, the stamping press comprising stamping dies, the stamping dies being in a non-roll form;
   conveying the filter media sheet forwardly along a travel path while the stamping press is pressing the filter media sheet and engaged with the filter media sheet such that the stamping dies move along forwardly the travel path;
   assembling multiple pressed sections of the filter media sheet into the filter media pack; and
   reciprocating the stamping dies into and out of engagement for repeatedly pressing the at least one feature with a ram.

2. The method of claim 1, further comprising driving the filter media sheet along the travel path using stamping dies, wherein the stamping dies also convey the filter media sheet.

3. The method of claim 1, further comprising moving the stamping press along an endless loop, wherein part of the endless loop extends over the travel path when the stamping press is moving forwardly along the travel path and pressing the filter media sheet, and wherein the stamping press is disengaged and releases from the filter media sheet to move rearwardly relative to the travel path along part of the endless loop.

4. The method of claim 1 further comprising pressing the filter media sheet with multiple presses at different locations along the filter media sheet, the stamping press being one of the multiple presses.

5. The method of claim 4, wherein different embossment patterns are provided by the multiple presses which form different emboss patterns into different panels of the multiple pressed sections of the filter media sheet.

6. The method of claim 1, wherein the at least one feature comprises score lines or embossments, or a combination thereof.

7. The method of claim 1, further comprising creasing the filter media sheet at spaced intervals to form a plurality of pleat tips, the filter media sheet being a continuous sheet extending through the pleat tips that is gathered subsequent to said creasing to form a pleated filter media pack.

8. The method of claim 1, wherein the at least one feature comprises a plurality of embossments extending in a region between adjacent creases of at least some of the multiple pressed sections to form pleat panels of a pleated filter media pack, wherein the stamping dies comprise mating female and male embossment features that form the embossments.

9. The method of claim 8, wherein the at least one feature further comprises a score lines formed by the stamping dies at the same time as the embossments, the score lines facilitating creasing of the filter media sheet to form the pleated filter media pack.

10. The method of claim 8, wherein some pleat panels are embossed with embossments and some of the pleat panels are free of embossments.

11. The method of claim 8, wherein each of the pleat panels are embossed with embossments, and forming a first pattern of embossments into first pleat panels, and a second pattern of embossments into second pleat panels that are different than the first pattern.

12. The method of claim 1, wherein the at least one feature comprises embossments, wherein the embossments are pressed over a length of at least 6 centimeters and each multiple pressed section extends over a length of at least 6 centimeters.

13. A method of forming a pleated filter media pack with a filter media sheet, comprising:
    pressing embossments into the filter media sheet repeatedly with stamping dies, the stamping dies being in a non-roll form;
    creasing the filter media sheet at spaced intervals for forming a plurality of pleat tips, the embossments disposed at least partially between pleat tips;
    pleating and gathering the filter media sheet to provide the pleated filter media pack;
    advancing the filter media sheet along a travel path, extending the creasing in a direction that is transverse to the travel path and extending the embossments between adjacent creases by pressing a first pattern of embossments into first pleat panels of the filter media sheet and skipping the pressing of the first pattern of embossments on second pleat panels of the filter media sheet, each first pleat panel being connected to the second pleat panel by the creasing, such that the first and second pleat panels mismatch; and
    reciprocating the stamping dies into and out of engagement for repeatedly pressing the embossments with a ram.

14. The method of claim 13, further comprising conducting the creasing by said stamping dies, the stamping dies comprising mating female and male embossment features that form the embossments and a crease feature comprising a male score extension forming the creasing.

15. The method of claim 13, wherein the second pleat panels are flat and free of embossments.

16. The method of claim 13, wherein the second pleat panels are formed with a second pattern of embossments that are different than the first pattern of embossments.

17. The method of claim 16, further comprising: pressing different embossments into the filter media sheet with downstream stamping dies to provide the second pattern of embossments, the downstream stamping dies being in a non-roll form.

18. The method of claim 13, further comprising conveying the filter media sheet along the travel path while the stamping dies are pressing the filter media and engaged with the filter media sheet such that the stamping dies move along the travel path.

19. The method of claim 18, further comprising utilizing different pairs of stamping dies, each pair moving forwardly along the travel path while engaged and pressing the filter media sheet and moving rearwardly relative to the travel path while disengaged and released from the filter media sheet.

20. The method of claim 13, further comprising pressing the filter media sheet with different pairs of press plates at different locations along the filter media sheet.

21. The method of claim 13, wherein said pleating creates pleats having a pleat depth of greater than 6 centimeters, and said pressing forms embossments with a length of greater than 5 centimeters, and width of at least 2 millimeters and a depth of a least 2 millimeter.

22. A method of forming a filter media pack with a filter media sheet, comprising:
    pressing at least one feature into the filter media sheet repeatedly with a stamping press, the stamping press comprising stamping dies, the stamping dies being in a non-roll form;
    conveying the filter media sheet forwardly along a travel path while the stamping press is pressing the filter media sheet and engaged with the filter media sheet such that the stamping dies move along forwardly the travel path;
    assembling multiple pressed sections of the filter media sheet into the filter media pack; and
    reciprocating the stamping press back and forth along the travel path, wherein the stamping press is moving forwardly along the travel path while pressing the filter media sheet, and wherein the stamping press is disengaged and released from the filter media sheet while moving rearwardly along the travel path.

23. A method of forming a pleated filter media pack with a filter media sheet, comprising:
    pressing embossments into the filter media sheet repeatedly with stamping dies, the stamping dies being in a non-roll form;
    creasing the filter media sheet at spaced intervals for forming a plurality of pleat tips, the embossments disposed at least partially between pleat tips;
    pleating and gathering the filter media sheet to provide the pleated filter media pack;
    advancing the filter media sheet along a travel path, extending the creasing in a direction that is transverse to the travel path and extending the embossments between adjacent creases by pressing a first pattern of embossments into first pleat panels of the filter media sheet and skipping the pressing of the first pattern of embossments on second pleat panels of the filter media sheet, each first pleat panel being connected to the second pleat panel by the creasing, such that the first and second pleat panels mismatch; and
    intermittently and successively advancing and stopping the filter media sheet along the travel path, wherein while the filter media sheet is stopped said pressing is conducted and wherein while the filter media sheet is advancing the filter media sheet passes freely through the stamping dies.

* * * * *